US007127616B2

(12) United States Patent
Kaneko

(10) Patent No.: US 7,127,616 B2
(45) Date of Patent: Oct. 24, 2006

(54) SEMICONDUCTOR INTEGRATED CIRCUITS, DATA TRANSFER SYSTEMS, AND THE METHOD FOR DATA TRANSFER

(75) Inventor: Yoshio Kaneko, Chiba-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/391,562

(22) Filed: Mar. 20, 2003

(65) Prior Publication Data

US 2003/0229799 A1    Dec. 11, 2003

(30) Foreign Application Priority Data

Mar. 13, 2002    (JP)    ............................ P2003-068392
Mar. 22, 2002    (JP)    ............................ P2002-080073

(51) Int. Cl.
*G06F 11/30*    (2006.01)
*G06F 12/14*    (2006.01)
*G06F 7/04*    (2006.01)
*G06F 17/30*    (2006.01)
*H04L 9/32*    (2006.01)
*H04L 9/00*    (2006.01)

(52) U.S. Cl. ........................ 713/191; 713/193; 726/26
(58) Field of Classification Search ................ 713/191, 713/189, 193; 716/16; 380/28; 726/35, 726/26
See application file for complete search history.

(56) References Cited

U.S. PATENT DOCUMENTS

| 4,786,613 | A | * | 11/1988 | Gould et al. ................. 438/129 |
| 5,369,772 | A | * | 11/1994 | Tubbs ........................... 326/39 |
| 5,388,157 | A | * | 2/1995 | Austin ........................ 713/191 |
| 5,768,372 | A | * | 6/1998 | Sung et al. .................. 713/193 |
| 5,970,142 | A | * | 10/1999 | Erickson ..................... 713/189 |
| 6,118,869 | A | * | 9/2000 | Kelem et al. ................. 380/44 |
| 6,141,756 | A | * | 10/2000 | Bright et al. ................ 713/200 |
| 6,278,289 | B1 | * | 8/2001 | Guccione et al. ............. 326/40 |
| 6,351,814 | B1 | | 2/2002 | Batinic et al. |
| 6,356,637 | B1 | * | 3/2002 | Garnett ........................ 380/265 |
| 6,366,117 | B1 | * | 4/2002 | Pang et al. ................... 326/38 |
| 6,425,126 | B1 | * | 7/2002 | Branson et al. ............. 717/168 |
| 6,654,889 | B1 | * | 11/2003 | Trimberger .................. 713/191 |
| 2001/0015919 | A1 | * | 8/2001 | Kean ........................... 365/200 |
| 2001/0037457 | A1 | * | 11/2001 | Inada ........................... 713/189 |
| 2002/0199110 | A1 | * | 12/2002 | Kean ........................... 713/189 |

FOREIGN PATENT DOCUMENTS

| JP | 02-155034 | 6/1990 |
| JP | 10-055135 | 2/1998 |

(Continued)

OTHER PUBLICATIONS

Altera. "Configuring FLEX 10K Devices: Application Note 59", 1995.*

(Continued)

*Primary Examiner*—Jacques Louis-Jacques
*Assistant Examiner*—Michael J. Simitoski
(74) *Attorney, Agent, or Firm*—Finnegan, Henderson, Farabow, Garrett & Dunner, L.L.P.

(57) ABSTRACT

A semiconductor integrated circuit configured for connection to an external ROM includes a decryption code block storing a decryption code; a decoder circuit connected to the decryption code block and decrypting encrypted data such that the encrypted data can be stored in the external ROM, by utilizing the decryption code; a configuration circuit connected to the decoder circuit; an FPGA circuit connected to the configuration circuit, the circuit structure of the FPGA circuit determined by the configuration circuit; and an internal circuit connected to the FPGA circuit, the circuit operation of which is determined by the FPGA circuit.

15 Claims, 35 Drawing Sheets

FOREIGN PATENT DOCUMENTS

| | | |
|---|---|---|
| JP | 2000-076144 | 3/2000 |
| JP | 2001-325153 | 11/2001 |
| JP | 2002-50956 | 2/2002 |
| JP | 2002-334019 | 11/2002 |
| JP | 2004-515001 | 5/2004 |
| JP | 2004-515180 | 5/2004 |
| JP | 2005-518691 | 6/2005 |
| WO | WO 00/49717 A2 | 8/2000 |
| WO | WO 01/08411 A1 | 2/2001 |
| WO | WO 01/46810 A1 | 6/2001 |

OTHER PUBLICATIONS

Atmel "FPGA Configuration E2PROM", 1997.*
ClearLogic. "LIBERATOR System Configuration and Intialization: Clear Logic CL10K Family, Application Note AN-15", Jun. 2003.*
Cowen. "How to load a Xilinx FPGA", 1995.*
Fidanci, Osman Devrim et al. "Performance and Overhead in a Hybrid Reconfigurable Computer", 2003 IEEE.*
FOLDOC. Definitions of "ASIC" and "FPGA" from "Free On-Line Dictionary Of Computing", 1995 & 1997.*
GoAhead Software. "Field Upgradeable Hardware and Software Systems: Enabling Technology from GoAhead Software and Xilinx", 2000.*
Gray, Jan. "Why FPGA CPUs?", 1998.*
Hauser, John R. et al. "Garp: A MIPS Processor with a Reconfigurable Coprocessor", IEEE 1997.*
Microsoft Press. "Microsoft Computer Dictionary, Third Edition", 1997.*
Virtual Computer Corporation (VCC). "Field Programmable Gate Arrays (FPGAs) and Enabling Technology", 2000.*
Xilinx. "FPGA Configuration", 1999.*
Xilinx. "Virtex 2.5V Field Programmable Gate Arrays", 2001.*
Xilinx. "Configuring FPGAs Over a Processor Bus", 1995.*
Yamaguchi, Teruyoshi et al. "A Study on Reconfigurable Computing System for Cryptography", 2000 IEEE.*
Yip, Kun-Wah et al. "Partial-Encryption Technique for Intellectual Property Protection of FPGA-Based Products", 2000 IEEE.*
Zhu, Xiaohan et al. "Hardware Compilation for FPGA-based Configurable Computing Machines", 1999 ACM.*
Copy of U.S. Appl. No. 10/106,103, filed Mar. 27, 2002, to Kaneko et al.
Notice of Grounds for Rejection Issued in counterpart Japanese application 2003-068392 on Feb. 7, 2006.

* cited by examiner

SEMICONDUCTOR INTEGRATED CIRCUITS, DATA TRANSFER SYSTEMS, AND THE METHOD FOR DATA TRANSFER

CROSS REFERENCE TO RELATED APPLICATIONS

This application is based upon and claims the benefit of priority from prior Japanese Patent Applications P2002-S0073 filed on Mar. 22, 2002 and P2003-68392 filed on Mar. 13, 2003; the entire contents of which are incorporated herein by reference.

BACKGROUND OF THE INVENTION

1. Field of the Invention

The present invention relates to semiconductor integrated circuits, in particular, it relates to semiconductor integrated circuits that have data input is from an external ROM, data transfer systems utilizing the semiconductor integrated circuits, and a method for data transfer for the semiconductor integrated circuit.

2. Description of the Related Art

There are semiconductor integrated circuits that have been developed with an embedded field programmable gate array (FPGA). An FPGA is a programmable logic device that allows user-design and operation. Lately, increases in integration, and as a result, increased appeal, have led to widespread usage of RAM FPGA circuits. RAM FPGA circuits allow reset of the circuit configuration each time the user turns on the power, as well as dynamic changes in the circuit configuration. Nevertheless, static random access memory (SRAM) is normally used with the RAM FPGA circuit, and because of the characteristics of volatile memory, the circuit data is erased each time the power supply is turned off. As a result, configuration, which is an operation that promptly writes circuit data from an external read only memory (ROM), must be performed each time the power supply is switched on. In this case, configuration is an operation that includes inputting circuit-specific programming data into one or a plurality of FPGA, and connecting logic modules to surrounding internal connection path transistors to regulate functions. Immediately following configuration, the semiconductor integrated circuit is initialized, and then normal operation of the semiconductor integrated circuit begins.

With the conventional semiconductor integrated circuits and the data transfer systems such as those described above, the following problems occur: In an FPGA circuit where non-volatile memory (ROM) is used instead of RAM, design data written in the non-volatile memory can be easily read out externally. Accordingly, in the case of a ROM FPGA circuit, design data can be read out and parsed. Recent technology for FPGA circuits using ROM type non-volatile memory includes a technique where output buffer characteristics at the design data read-out terminal are changed after design data has been written to prevent the content of the internal non-volatile memory (ROM) from being externally read out. While this design data read out prevention using non-volatile memory (ROM) which can be used for IC products embedded with a non-volatile memory (ROM) FPGA circuit, it cannot be used for semiconductor integrated circuit products embedded with a RAM FPGA circuit. This is because circuit data must be input from the external ROM when the power supply is switched on, since the circuit data stored in the volatile memory (RAM) disappears when the power supply is cut off.

However, therein lies a problem where, since the FPGA circuit is all-purpose, analysis of the data stored in the external ROM allows for easy reading as to what kind of circuit should be formed and how the FPGA circuit should function. Thus, if a RAM FPGA circuit is used, since design data is stored on an external ROM and both the FPGA circuit and the external ROM are mounted on the same board, the confidential information contained in the design data can be easily revealed through analysis of the external ROM data. Among other things, this situation makes so-called "dead" copies possible. Accordingly, a semiconductor integrated circuit embedded with an FPGA circuit capable of protecting the secrecy of design data is also desired for a semiconductor integrated circuit embedded with a RAM FPGA circuit.

Similarly, in a semiconductor integrated circuit or system which has an internal CPU and operates by reading software in or from an external ROM, confidential software design data can be easily revealed through analysis of external ROM data. Since CPU instructions are generally published, the software program codes can easily be interpreted by analyzing ROM data. Accordingly, a high-security semiconductor integrated circuit that does not permit either design data or software read out is desired.

SUMMARY OF THE INVENTION

A first aspect of the present invention provides a semiconductor integrated circuit configured for connection to an external ROM which comprises a decryption code block storing a decryption code; a decoder circuit connected to the decryption code block and decrypting encrypted data such (hat the encrypted data can be stored in the external ROM, by utilizing the decryption code; a configuration circuit connected to the decoder circuit; an FPGA circuit connected to the configuration circuit, the circuit structure of the FPGA circuit determined by the configuration circuit; kind an internal circuit connected to the FPGA circuit and the circuit operation of which is determined by the FPGA circuit.

A second aspect of the present invention provides a semiconductor integrated circuit configured for connection to an external ROM which comprises a decryption code block storing a decryption code; a decoder circuit connected to the decryption code block and decrypting encrypted software data such that the encrypted software data can be stored in the external ROM, by utilizing the decryption code; a CPU connected to the decoder circuit; and an internal circuit connected to the CPU and the circuit operation of the internal circuit determined by the CPU.

A third aspect of the present invention provides a data transfer system configured for connection to an external ROM which comprises a first integrated semiconductor chip integrating the fist external ROM storing encrypted FPGA circuit design information; and a second integrated semiconductor chip comprising a first decryption code block storing a decryption code; a first decoder circuit connected to the first decryption code block and decrypting encrypted data from the first external ROM by utilizing the decryption code; a configuration circuit connected to the first decoder circuit; an FPGA circuit connected to the configuration circuit, the circuit structure of the FPGA circuit determined by the configuration circuit; and an internal circuit connected to the FPGA circuit, the circuit operation of the internal circuit determined by the FPGA circuit.

A fourth aspect of the present invention provides a data transfer system which comprises a first integrated semiconductor chip integrating a first external ROM storing encrypted CPU software design information; and a second integrated semiconductor chip comprising: a decryption code block storing a decryption code; a decoder circuit connected to the decryption code block and decrypting encrypted software data from the first external ROM by utilizing the decryption code; a CPU connected to the decoder circuit; and an internal circuit connected to the CPU, the circuit operation of the internal circuit determined by the CPU.

A fifth aspect of the present invention provides a method for data transfer and comprises storing a decryption code in a decryption code block of a semiconductor integrated circuit; writing encrypted ROM data to a first external ROM; receiving the encrypted ROM data from the first external ROM and decoding the encrypted ROM data in a decoder circuit in the semiconductor integrated circuit; determining whether all of the encrypted ROM data stored in the external ROM has been transferred to and received in the decoder circuit or not; repeating the determining operation, when all of the encrypted ROM data has not yet been transferred to and received in the decoder circuit; and shifting the FPGA circuit to a user mode and starting operation of the semiconductor integrated circuit, when all of the encrypted ROM data has been transferred to and received in the decoder circuit.

A sixth aspect of the present invention provides a method for data transfer and comprises storing a decryption code in a decryption code block in a semiconductor integrated circuit; writing encrypted ROM data to a first external ROM; requesting and determining a ROM address in the first external ROM by operation of a CPU in the semiconductor integrated circuit; decoding the encrypted ROM data in a decoder circuit in the semiconductor integrated circuit; and operating the CPU in response to a decrypted ROM data.

DETAILED DESCRIPTION OF THE EMBODIMENTS

Figure 1:
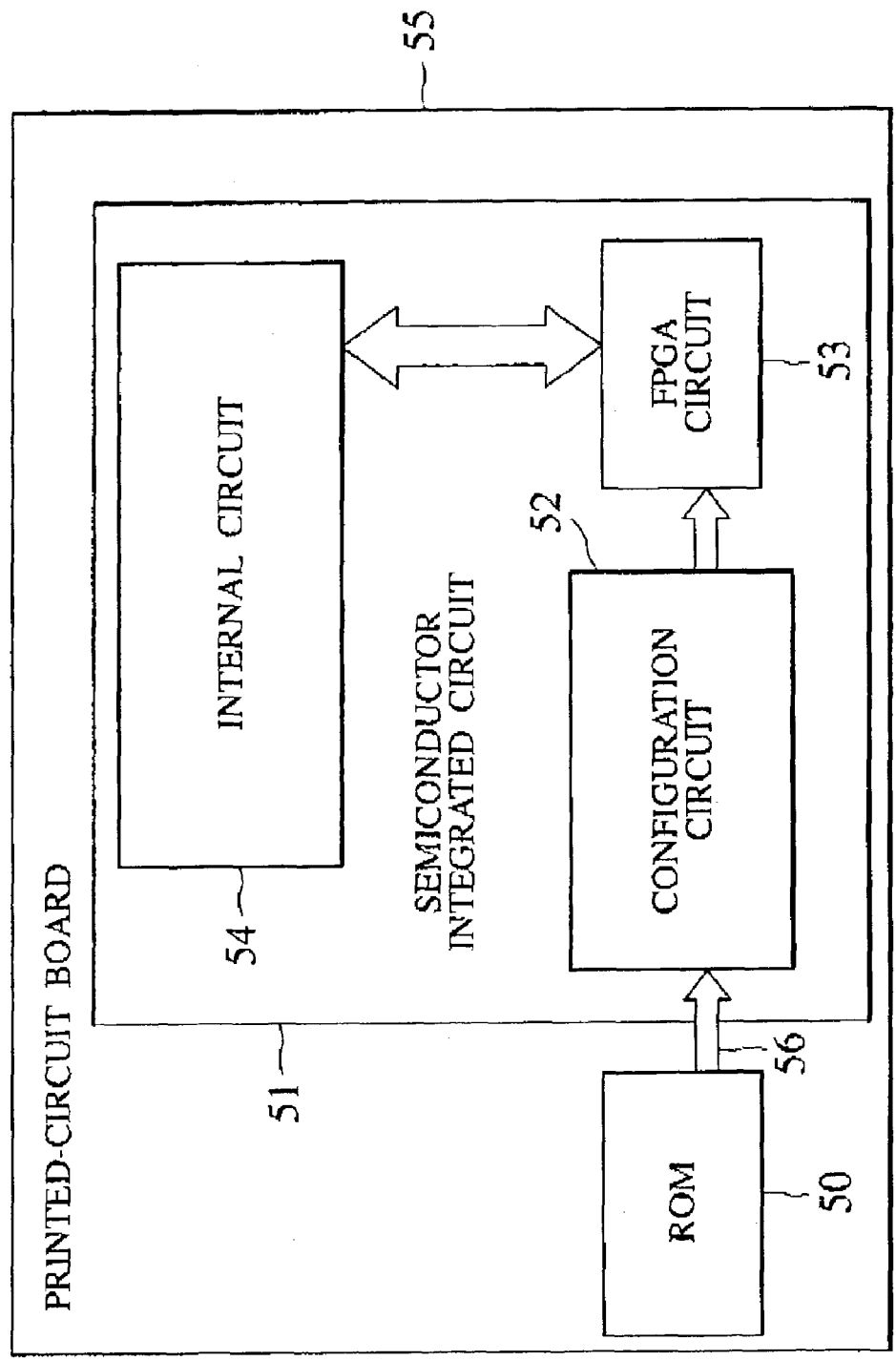
FIG. 1 is a block diagram showing the configuration of an FPGA embedded semiconductor integrated circuit and data transfer system according to a comparative example of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Generally and as is conventional in the representation of circuit blocks, it will be appreciated that the various drawings are not drawn to scale from one figure to another nor inside a given figure, and in particular that the circuit diagrams are arbitrarily drawn for facilitating the reading of the drawings.

In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

At first, before beginning a detailed description of the first to the thirteenth embodiments of the present invention, comparative example 1 and 2 are examined as process as for explaining the present invention are presented.

The present invention relates to a semiconductor integrated circuit, data transfer system, and a method for data transfer. In the following embodiments, the first embodiment describes a semiconductor integrated circuit and a data transfer system embedded with an FPGA circuit. The second embodiment describes a semiconductor integrated circuit and a data transfer system embedded with a CPU. The third embodiment describes an application specific integrated circuit (ASIC) and an ASIC system embedded with an encryption object circuit. The fourth embodiment describes an ASIC and an ASIC system embedded with an FPGA circuit. The fifth embodiment describes an ASIC and an ASIC system embedded with a CPU. The sixth and seventh embodiments each describe an ASIC and an ASIC system embedded with an FPGA circuit and a CPU. The eighth embodiment describes an example where the ASIC, the FPGA circuit, etc., are mounted on separate chips in an FPGA embedded data transfer system. The ninth embodiment describes an example where plural external ROMs are provided, and the ASIC, the FPGA circuit, etc., are mounted on separate chips in a CPU embedded data transfer system. The tenth through thirteenth embodiments describe examples where a plurality of external ROMs are provided, and the ASIC, FPGA circuit, CPU, etc., are mounted on separate chips in an FPGA embedded data transfer system.

COMPARATIVE EXAMPLE 1

A RAM FPGA embedded semiconductor integrated circuit to be used as a comparative example of the present invention, as shown in FIG. 1, is a hybrid integrated circuit configured with an external ROM 50 and a semiconductor integrated circuit 51 respectively mounted on a printed circuit board 55. The external ROM 50 is connected to the semiconductor integrated circuit 51, which comprises a monolithic integrated circuit embedded with an FPGA circuit 53. The external ROM 50 outputs data, in parallel, to the semiconductor integrated circuit 51. The semiconductor integrated circuit 51 is configured with a configuration circuit 52, which is connected to the external ROM 50 via a data bus line 56, and an FPGA circuit 53, which is connected to the configuration circuit 52, and an internal circuit 54.

RAM FPGA circuit 53 design data is stored in the external ROM 50. A configuration circuit 52 which receives design data from the external ROM 50 is arranged in the semiconductor integrated circuit 51. Circuit data from this configuration circuit 52 is received by the FPGA circuit 53 to configure the circuit within the FPGA circuit 53. The FPGA circuit 53 is then able to implement a functional circuit that corresponds to the user's requirements.

Following formation of this functional circuit, the FPGA circuit 53 executes a circuit operation between it and an internal circuit 54 which is integrated within semiconductor integrated circuit 51. Internally of this internal circuit 54 are circuits selected from a general purpose microprocessor, DSP core, memory, interface circuit, etc., which are determined in line with the intended purpose. Moreover, a data bus 56 having wiring connectors is provided of the integrated circuit, and the number of connectors is equal to the number of bits of FPGA design data transmitted from the external ROM 50, on the printed circuit board 55 so as to connect the external ROM 50 and the semiconductor integrated circuit 51.

COMPARATIVE EXAMPLE 2

Figure 2:
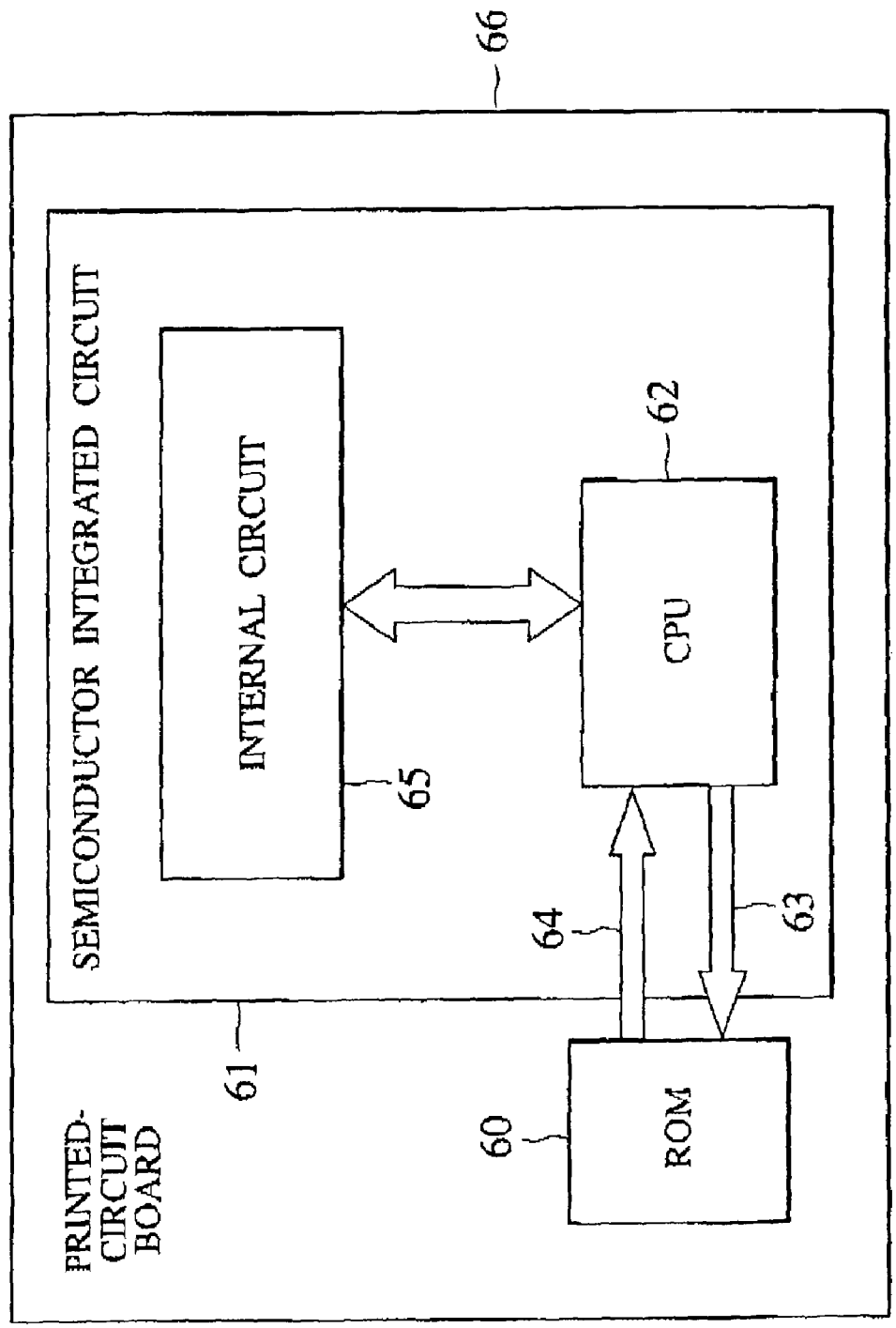
FIG. 2 is a block diagram showing the configuration of a CPU embedded semiconductor integrated circuit and data transfer system according to another comparative example of the present invention.

A CPU core embedded data transfer system to be used as another comparative example, as shown in FIG. 2, is a hybrid integrated circuit configured with an external ROM 60 and a semiconductor integrated circuit 61, respectively, mounted on a printed circuit board 66. The external ROM 60 is connected to the semiconductor integrated circuit 61, which comprises a monolithic integrated circuit having a CPU 62-embedded structure. The external ROM 60, which is semiconductor memory, has ports having one-to-one correspondence with the I/O ports of the semiconductor integrated circuit 61, and outputs data in parallel to the semiconductor integrated Circuit 61. The main structural elements of the semiconductor integrated circuit 61 include a CPU 62, which is connected to the external ROM via an address bus data line 63 and a data bus line 64, and an internal circuit 65 as components thereof.

Software data for the CPU 62 is stored in the external ROM 60. The software data output from the external ROM 60 is input to the CPU 62. Moreover, the CPU 62 and the external ROM 60 are directly connected via the address bus data line 63, wherein the CPU 62 requests data from the external ROM 60 by specifying an address. The external ROM 60 transmits the specified address to the CPU 62 via the data bus line 64.

Following the start of CPU 62 operation, circuit operation takes place with the internal circuit 65 internal to the semiconductor integrated circuit 61. This internal circuit 65 has elements, which are selected from a general purpose microprocessor, DSP core, memory, interface circuit, etc., determined in line with the intended purpose of the integrated circuit. Moreover, a data bus 64 having wiring connectors, the number of which is equal to the number of bits of encrypted CPU software data transmitted from the external ROM 60, and an address bus data line 63 is provided on the printed circuit board 66 so as to connect the external ROM 60 and the semiconductor integrated circuit 61.

(First Embodiment)

Figure 3:
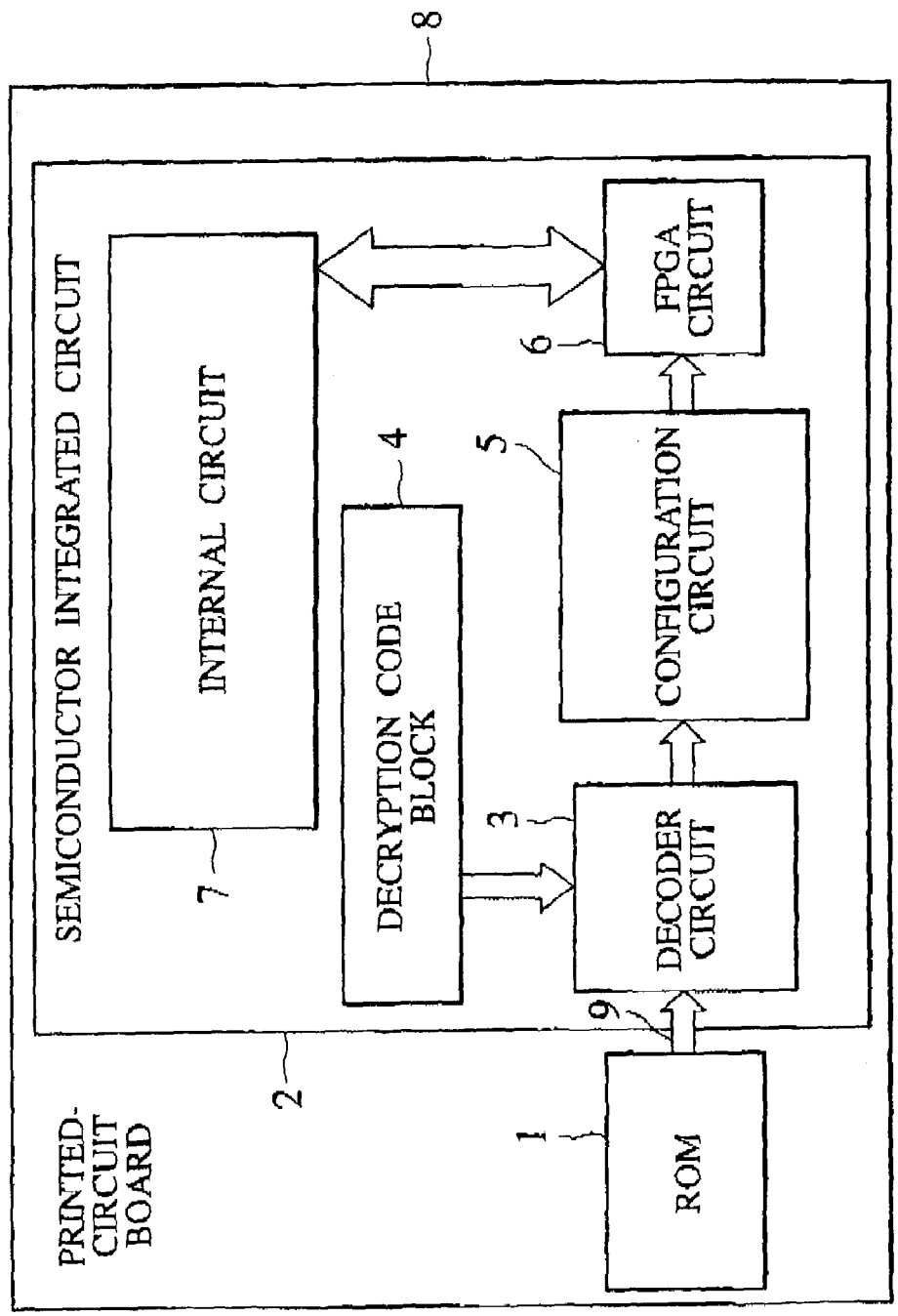
FIG. 3 is a block diagram showing the configuration of a semiconductor integrated circuit and data transfer system according to a first embodiment of the present invention.

A semiconductor integrated circuit and a data transfer system according to the first embodiment of the present invention, as shown in FIG. 3, is a hybrid integrated Circuit configured with an external ROM 1 integrated on the first semiconductor chip and a semiconductor integrated circuit 2 integrated on the second semiconductor chip, which is embedded with an FPGA circuit 6, respectively mounted on a printed circuit board 8. Moreover, the semiconductor integrated circuit 2 is a monolithic integrated circuit integrated on the same semiconductor chip configured with a decoder circuit 3, which is connected to the external ROM 1 via a bus data line 9; a decryption code block 4, which is connected to the decoder circuit 3; a configuration circuit 5, which is also connected to the decoder circuit 3; the FPGA circuit 6, which is connected to the configuration circuit 5; and an internal circuit 7, which is connected to the FPGA circuit 6. The external ROM 1, which is integrated on a different semiconductor chip from the semiconductor chip of the semiconductor integrated circuit 2, is a semiconductor memory device having ports with one-to-one correspondence to the I/O ports of the semiconductor integrated circuit 2, and outputs data in parallel to the semiconductor integrated circuit 2. In addition, the example in which the first semiconductor chip and the second semiconductor chip are implemented on the printed circuit board 8 together is shown in FIG. 1, but, it is clear that the first semiconductor chip and the second semiconductor chip may be implemented as a multi-layer structure via a soldered metal layer.

Encrypted design data to be used for the RAM FPGA circuit 6 is stored in the external ROM 1. Accordingly, encrypted design data from the external ROM 1 is input to the decoder circuit 3 internal to the semiconductor integrated circuit 2 via the bus data line 9. The decryption code is decided when designing the semiconductor integrated circuit 2, and then stored and implanted inside the decryption code block 4 in the semiconductor integrated circuit 2.

The decryption code is input to the decoder circuit 3 from the decryption code block (memory unit) 4. Using this decryption code, the decoder circuit 3 decodes the encrypted design data input from the external ROM 1, and then outputs the design data to the configuration circuit 5 provided in the semiconductor integrated circuit 2. In the first embodiment of the present invention, a decoder circuit 3 is provided between the external ROM 1 and the configuration circuit 5. With this decoder circuit 3, design data from the external ROM 1 is received and then sent to the configuration circuit 5. Circuit data from the configuration circuit 5 is received by the FPGA circuit 6 to configure the internal circuit thereof.

Following the formation of the FPGA circuit 6, circuit operation takes place with the internal circuit 7 inside the semiconductor integrated circuit 2. Inside this internal circuit 7 are circuits selected from a general purpose microprocessor, DSP core, interface circuit, etc., which are determined in line with the intended purpose of the integrated circuit. The semiconductor integrated circuit 2 is formed having the FPGA circuit 6 and the internal circuit 7 in an embedded structure. As a result, this structure may be used for a wide range of purposes. The external ROM 1 and the semiconductor integrated circuit 2 are mounted on the same printed circuit board 8 and configure or make up a data transfer system. Moreover, a data bus line 9 having wiring connectors, is provided on the printed circuit board 8, in which a number of connectors is equal to the number of bits of encrypted FPGA design data transmitted from the external ROM 1, and connects the external ROM 1 and the semiconductor integrated circuit 2.

Figure 4:
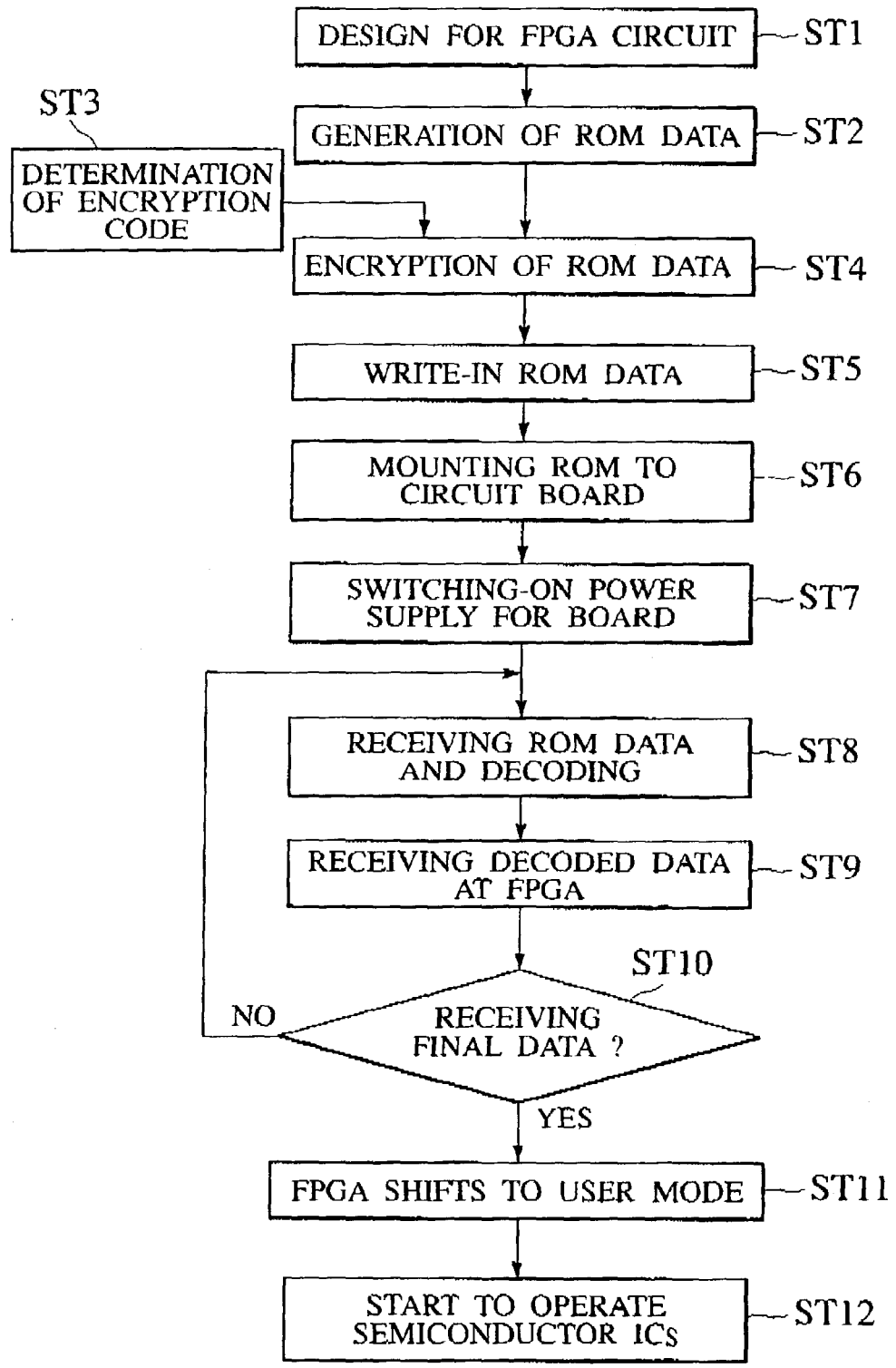
FIG. 4 is a flowchart showing how a semiconductor integrated circuit and data transfer system according to the first embodiment of the present invention operate.

A method of operating a semiconductor integrated circuit and a data transfer system according to the first embodiment of the present invention is described below using FIG. 4.

(a) To begin with, in a first step ST1, a designer will design the FPGA circuit 6 which is internal to the semiconductor integrated circuit 2.

(b) Next, in a second step ST2, the designed FPGA circuit 6 is generated as ROM data.

(c) Next, in a third step SO, the encryption code to be adopted, which is submitted by the manufacturer of the semiconductor integrated circuit 2, is determined.

(d) Next, in a fourth step ST4, the ROM data is encrypted based on the encryption code.

(e) Next, in a fifth step ST5, encrypted ROM data is written in the external ROM 1.

(f) Next, in a sixth step ST6, the external ROM is mounted on the printed circuit board 8.

(g) Next, in a seventh step ST7, the power supply for the printed circuit board 8 is switched on.

(h) Next, in an eighth step ST8, the encrypted ROM data is acquired from the external ROM by the decoder circuit 3 in the semiconductor integrated circuit 2. Using the decoder circuit 3, the encrypted ROM data is decrypted into circuit design information data and output to the configuration circuit 5. The configuration circuit 5 outputs instructions for circuit preparation of the FPGA circuit 6.

(i) Next, in a ninth step ST9, the decrypted data is received by the FPGA circuit 6.

(j) Next, in a tenth step ST10, it is determined whether or not the final piece of decrypted data has been received by the FPGA circuit 6. If yes, then processing proceeds to an eleventh step ST11; if no, then processing returns to the eight step ST8.

(k) Next, in the eleventh step ST11, the FPGA circuit 6 is shifted into a user mode.

(l) Next, in a twelfth step ST12, operation of the semiconductor integrated circuit 2 starts.

(m) The above steps end when the power supply is turned off.

(n) Next, when the power supply is switched on again, the processing repeats starting from the writing of the ROM data to the decoder circuit 3.

Immediately after the power supply is switched on, when all of the external ROM 1 data has been imported via decoder circuit 3 and the configuration circuit 5, the semiconductor integrated circuit configures a RAM FPGA circuit. This circuit configuration can be performed immediately, and can be accomplished in the range of hundreds of milliseconds.

Figure 5:
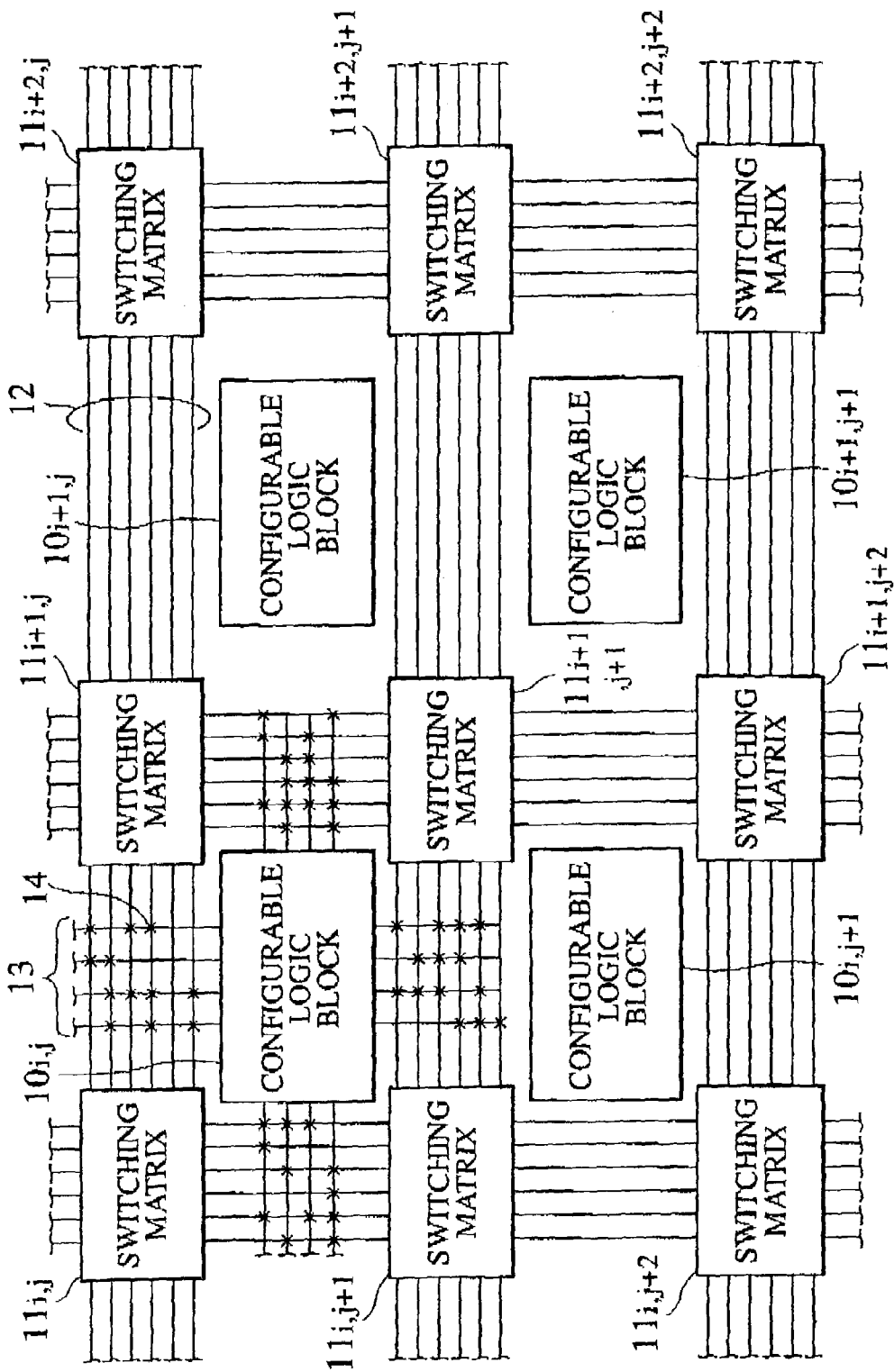
FIG. 5 is a block diagram showing the configuration of a RAM FPGA circuit according to the first embodiment of the present invention.

As shown in FIG. 5, the RPGA circuit 6 is a RAM type and is configured from configurable logic blocks 10, $10_{i,j}$, $10_{i,j+1}$, ..., $10_{i+1,j}$, $10_{i+1,j+1}$ ..., which configure various circuits; switching matrices 11, $11_{i,j}$, $11_{i,j+1}$, $11_{i,j+2}$, ..., $11_{i+1,j}$, $11_{i+1,j+1}$, $11_{i+1,j+2}$, ..., $11_{i+2,j}$, ..., $11_{i+2,j+1}$, $11_{i+2,j+2}$, ..., which perform line switching for the various circuits; main lines 12; connecting lines 13; and connection points 14. A functional circuit that meets the demands of the designer can be put into practice by modifying the RAM data loaded into the configurable logic blocks 10, $10_{i,j}$, $10_{i,j+1}$, ..., $10_{i+1,j}$, $10_{i+1,j}$ and so forth. That RAM data is stored in the external ROM 1. More specifically, SRAM elements are provided inside the configurable logic blocks 10. Surrounding the configurable logic blocks are main lines 12 which are connected to each other by the switching matrices 11. A few of the main lines 12 and the configurable logic blocks 10 are connected via correction lines 13 at connection points 14. In this manner, the connected/not connected states of the configurable logic block 10 and the main lines 12 are set for the FPGA circuit 6 and a circuit is configured based on the circuit design data.

Here, a decryption code determined when designing the semiconductor integrated circuit 2 is used for encryption. The decryption code is decided in advance, by the manufacturer of the semiconductor integrated circuit 2. The purchaser of the semiconductor integrated circuit 2 is then notified of the details and forms a desired semiconductor integrated circuit 2 by encrypting the circuit design information and inputting the circuit design information to the semiconductor integrated circuit 2.

Figure 6:
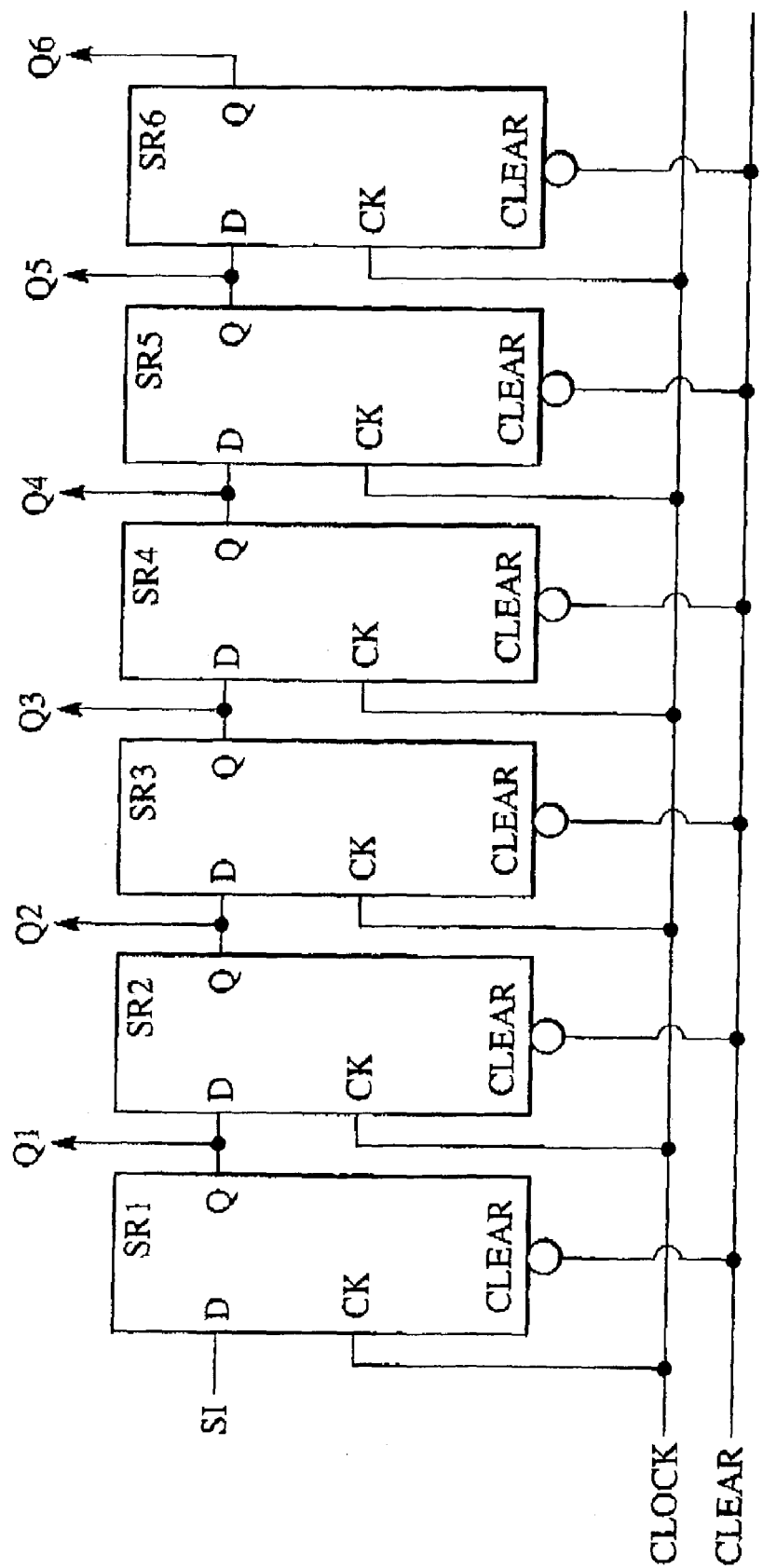
FIG. 6 is a block diagram showing the RAM configuration of the RAM FPGA circuit according to the first embodiment of the present invention.

The FPGA circuit RAM, as shown in FIG. 6, has a shift register configuration. The data sent from the configuration circuit 5, in FIG. 6, is input at a D input terminal of the first stage shift register SR1 as a shift register input signal S1, whereby new data is input one piece at a time, and each time one is stored in the shift register SR1, the old data is synchronized and shifts to the right. The output of each shift register SR1, SR2, SR3, ..., SR6, is in a format such as Q1 through Q6, and is distributed to a configurable logic block 10, a switching matrix 11 or an I/O register unit to act as data that either determines the function of the configurable logic block 10, determines the line connection method for the switch matrix 11, or determines the I/O function.

With an initialization operation in the semiconductor integrated circuit 2, data is sequentially written to shift registers SR1, SR2, SR3, ..., SR6 provided inside of the FPGA circuit 6 such as shown in FIG. 6, from the external ROM 1 via the configuration circuit 5. With the shift registers SR1, SR2, SR3, ..., SR6 of FIG. 6, since not only is data sent piece-by-piece from the configuration circuit 5 to the D input terminal of the shift register, but additionally a synchronized clock signal is also sent, a shift register input signal S1 that is input to the shift register D input terminal is brought into the shift register SR1 in sync with the rising edge of the clock signal. That data is then output to Q1. Since the clock signal is input in sync with the reading of the next piece of data, the Q1 signal is shifted to the second level shift register SR2 and output to Q2, and then shift register input signal S1 which is newly set in the shift register D input terminal is stored in Q1 and output. Upon each arrival of the clock signal, new data is imported to the initial stage shift register SR1, which is connected to the shift register D input terminal, and old data is sequentially shifted to the register on the right.

Figure 7:
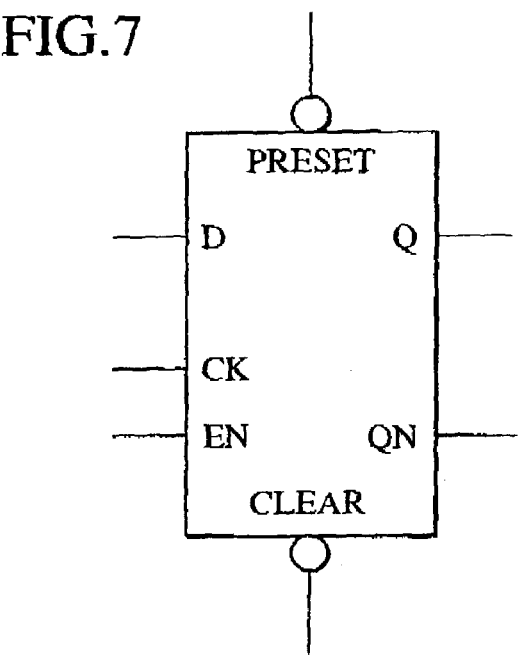
FIG. 7 is a block diagram showing an exemplary D-type flip/flop to be used as the fundamental unit of the shift register configuring the RAM for the RAM FPGA circuit according to the first embodiment of the present invention.

For instance, as shown in FIG. 7, a D-type flip/flop is often used as the fundamental unit configuring the shift register. There are various modified examples where some of the input terminals PRESET, CLEAR, EN, QN of this D-type flip/flop are omitted. The signal input from a D input terminal is latched and stored in sync with the rising edge of the signal input to the CK input terminal. The stored data is output to the Q output terminal and the inverted signal is output to the QN terminal. The CK input is allowed to be valid only when "1" is input to the EN input terminal. The CK input is allowed to be invalid when "0" is input to the EN input terminal. While the PRESET terminal is normally input with "1", when input with "0", the stored content is set to "1". The CLEAR terminal is normally input with "1", but when input with "0", the stored content is set to "0". When resetting the register, a "0" pulse is applied to the CLEAR terminal and the stored content is made "0".

Figure 8:
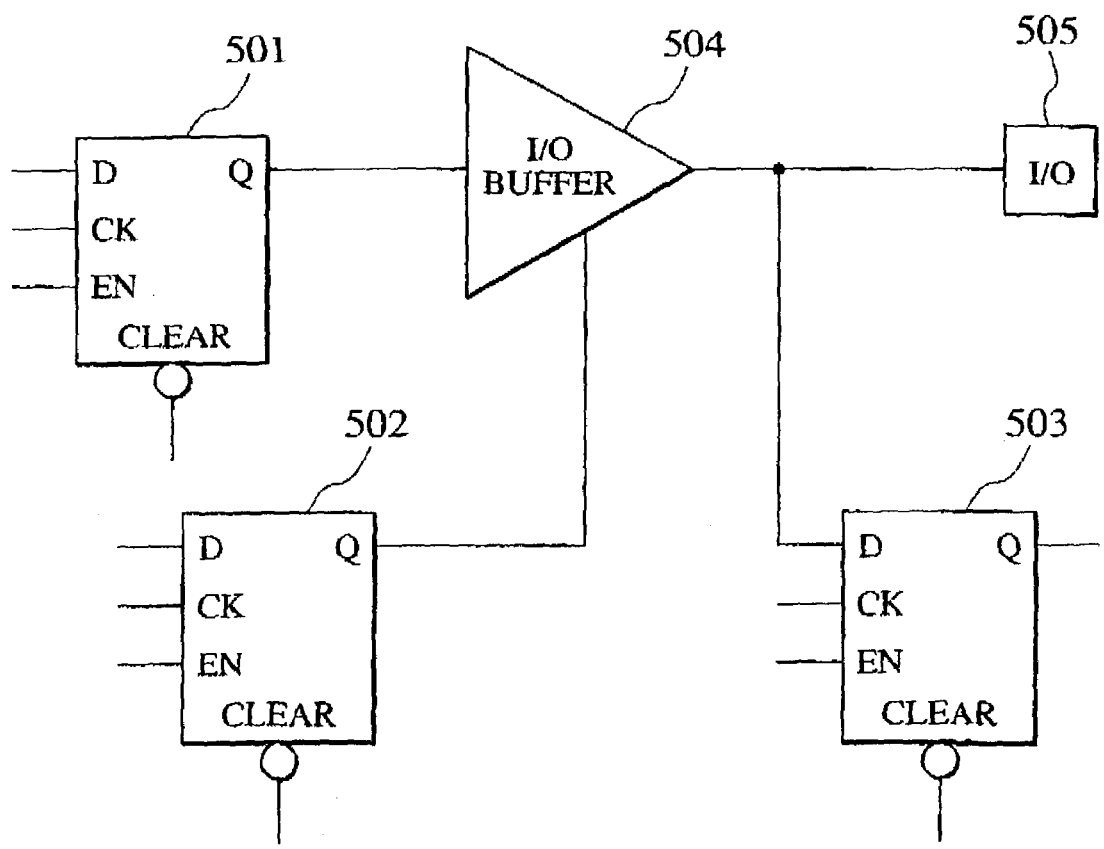
FIG. 8 is a block diagram showing the I/O register circuit configuration of the RAM FPGA circuit according to the first embodiment of the present invention.

As shown in FIG. 8, a typical example of an I/O register circuit for the FPGA circuit 6 is equipped with three registers surrounding the output buffer. An output register 501 determines whether the output is "0" or "1". An output enable register (OE register) 502 determines if the I/O buffer 504 will output. When the OE register 502 is "0", output is switched off to cause a high impedance state. An input register 503 stores the signal applied to a I/O terminal 505.

During configuration, the content stored in the OE register 502 is made "0" and is output to prevent an output from the I/O buffer 504. In addition, a "0" signal is applied to the enable (EN) terminal of the input register 503 to prevent the signal applied to the I/O terminal 505 from being brought into the integrated circuit. In other words, the FPGA circuit is left isolated from the external signal environment via the I/O terminal 505. Through the initialization operation, the contents of these three registers 501, 502, and 503 are changed to values agreeing with the set content programmed in the external ROM 1.

In addition, during the initialization operation, among the I/O register circuits shown in FIG. 8, a "0" signal is first applied to the EN terminals of the OE register 502 and the input register 503 to prevent an output from the I/O buffer 504 and also to prevent the signal applied to the I/O terminal 505 from being brought into the integrated circuit. In other words, the FPGA circuit is left isolated from the external signal environment via the I/O terminal 505. Following the importation of all of the ROM data, a "1" is applied at the end to the EN terminals of the output register 501, input register 503, and OE register 502 to switch the I/O buffer 504 to an active state. In this manner, operation as a logic device is achieved.

In the first embodiment of the present invention, the configuration operating state and the initialization state are referred to as Command Mode and the normal operating state is referred to as User Mode. Once the power supply of the semiconductor integrated circuit 2 has been switched on, circuit data is immediately transmitted to the configuration circuit 5, initialization is executed, and a circuit is newly configured in the FPGA circuit 6 based on the circuit data. Logic operation then starts.

A large number of logic elements are embedded within a SRAM-utilizing RAM FPGA circuit 6 which includes a small fan-in logic module and which has a small number of input terminals. Since operational testing of actual equipment is immediately available following circuit design by the designer using a RAM FPGA circuit 6 configured in this manner, it is possible to implement efficient circuit design. In addition, since it is possible to produce semiconductor integrated circuit products having the same fundamental structure as the FPGA circuit 6 itself, and since it is unnecessary to make modifications for each user when producing the FPGA circuit 6, favorable manufacturing efficiency for the FPGA circuit is achieved. Specifically, mass production with favorable manufacturing efficiency is possible because the FPGA circuit 6 can be produced as an all-purpose product.

It is also possible for the semiconductor integrated circuit 2 including an FPGA circuit 6 to be configured with internal circuit elements such as an all-purpose microprocessor core, DSP core, and interface circuit. The embedded format allows a wider range of applications.

Figure 9:
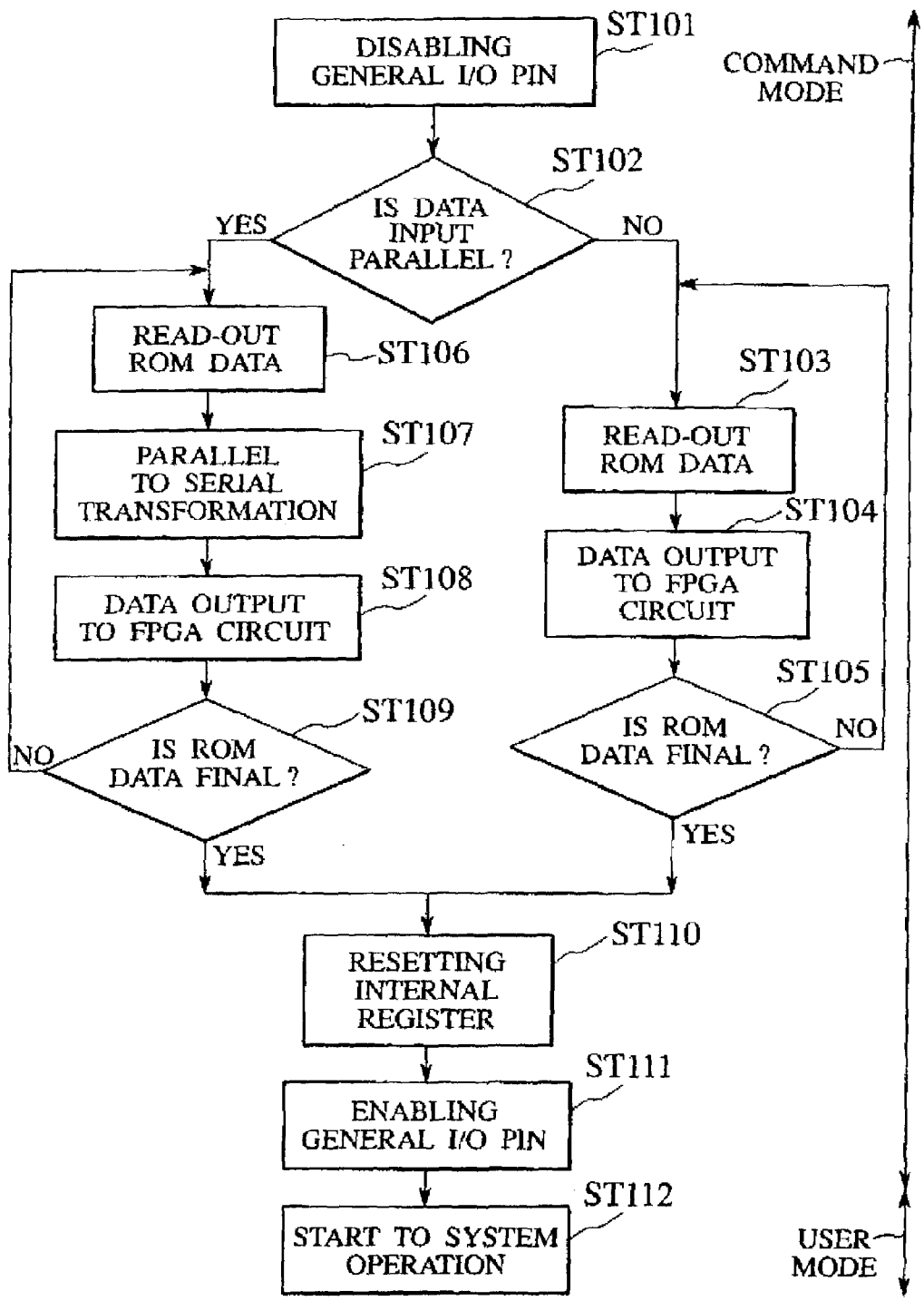
FIG. 9 is a flowchart describing a configuration method according to the first embodiment of the present invention.

A configuration method is now described using the flow-chart shown in FIG. 9.

(a) Although configuration automatically starts as the power supply is switched on; first, in step ST101, general I/O register circuits are disabled.

(b) Next, in step ST102, it is determined whether data input is parallel or serial. ROM data is received by the decoder circuit 3, with the process differs depending on whether parallel data or serial data is received.

(c) In the case where parallel data is received, after receiving the data from the ROM 1 in step ST106, the parallel data is convened to serial data in step ST107, and then in step ST108 data is sent to the FPGA circuit 6. Next, in step ST109, it is determined whether the ROM data received is the final piece of data or not. If yes, then processing proceeds to step ST110; if no, then processing returns to step ST106.

(d) In the case where serial data is received, after receiving the data from the ROM 1 in step ST103, the data is transmitted as is to the FPGA circuit 6 in step ST104. Next, in step ST105, it is determined whether the ROM data received is the final piece of data or not. If yes, then processing proceeds to step ST110; if no, then processing returns to step ST103.

(e) Once all of the ROM data has been received, the configuration state ends and the initialization state is entered. In step ST110, the internal registers are reset. Next, in step ST111, the general I/O register circuits are enabled. Then in step ST112, system operation begins.

Steps ST101 through ST111 correspond to command mode; and steps ST112 forward correspond to user mode.

Figure 10:
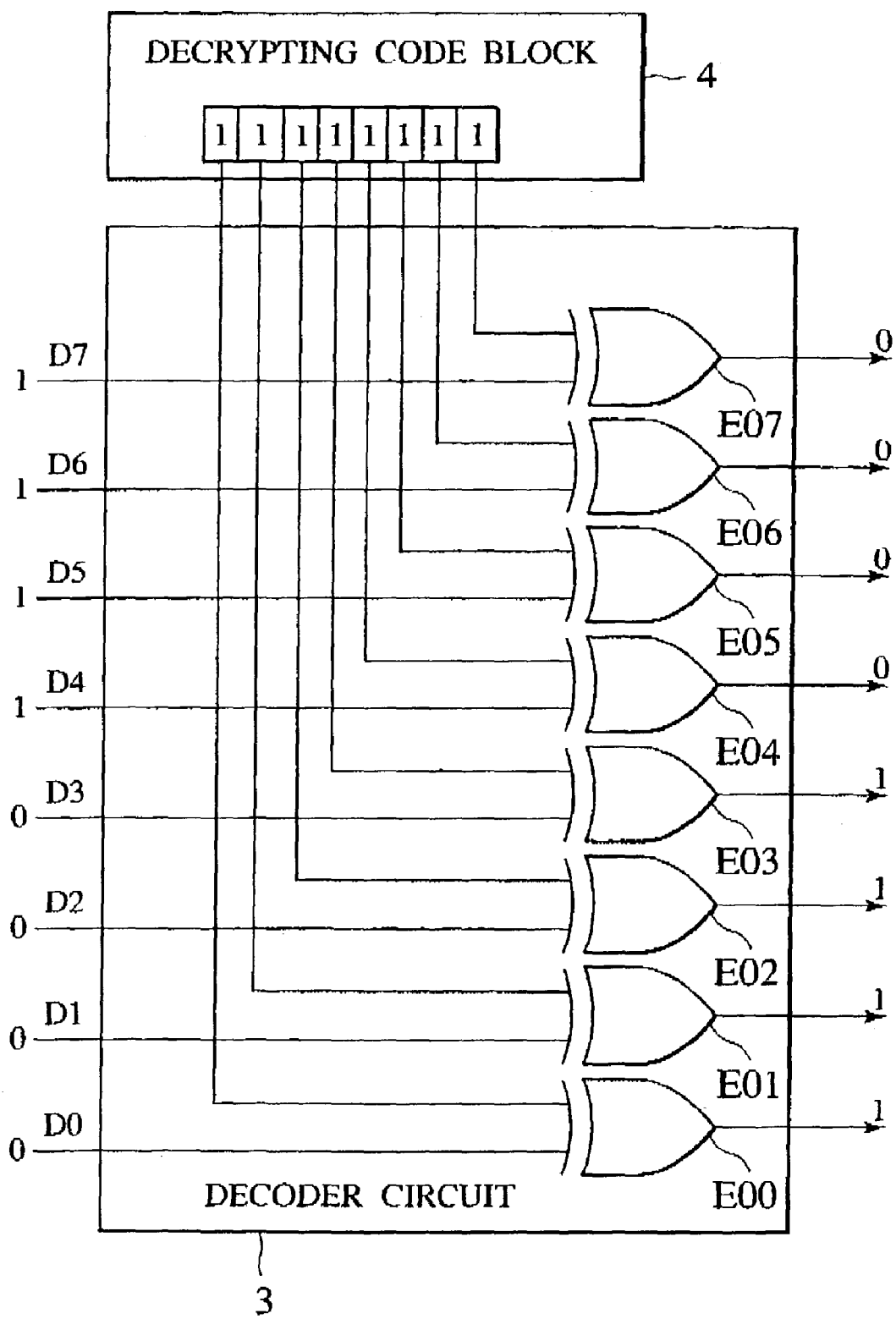
FIG. 10 is a logic circuit diagram representing the configuration of a decoder circuit and decryption code block according to the first embodiment of the present invention.

Next, the configuration of a decoder circuit 3 and decryption code block 4 are described using FIG. 10. To facilitate description, a simple example of a decoder circuit 3 is shown in FIG. 10. The decoder circuit 3 includes eight exclusive OR circuits EO0, EO1, . . . , EO7 and is input with one bit of data from the external ROM 1 and one bit of code from the decryption code block via the respective input terminals. The output of the exclusive OR circuits EO0, EO1, . . . , EO7, which heads towards the light side of FIG. 10, is connected to the configuration circuit 5 shown in FIG. 3.

In this embodiment, it is assumed that 8-bit parallel data enters the decoder circuit 3 from the external ROM 1, for example. It is assumed that the encryption method used encrypts by inverting all of the "1"s and "0"s in the data. Naturally, when decrypting, all of the "1"s must be reverted to "0"s and likewise all of the "0"s to "1"s.

The exclusive OR circuits act to output a "1" when the two input signals are different, and conversely, output a "0" when the two input signals are "0". Accordingly, with a decryption code given as "1", when the signal input from ROM 1 is "1", output is "0", and when the input is "0", output is "1". Namely, the signal from the ROM 1 is inverted. In the opposite case, if the decryption code is given as "0", when the signal input from ROM 1 is "1", output is "1", and when the input is "0", output is "0", In other words, the signal from the ROM 1 is output without change.

8-bit data D0, D1, D2, . . . , D7 from the external ROM 1 enters from the left, as shown in the figure. Since all of the 8 bits being input are inversed, the decryption code should be all "1"s. In the case of non-inversed input bits, the decryption code must be made "0"s.

Therefore, if the four bits of data D0, D1, D2, and D3 enter from the external ROM 1 as "0" signals, "1" signals are passed to the configuration circuit 5. Conversely, if the four bits of data D4, D5, D6, and D7 enter from the external ROM 1 as "1" signals, "0" signals are passed to the configuration circuit 5.

The semiconductor integrated circuit, the data transfer system and the method for the data transfer, according to the first embodiment of the present invention, provide an FPGA circuit embedded semiconductor integrated circuit which functions to encrypt external ROM 1 data, and then using a decryption code implanted beforehand in a decryption code block 4 inside the semiconductor integrated circuit 2, decrypts the encrypted data and writes the decrypted data in the FPGA circuit 6. Since this implanted code differs for each semiconductor integrated circuit 2 designed, each product should have a different code. Naturally, even if a circuit is configured using cipher, operation on the printed circuit board 8 immediately following circuit formation is possible to verify whether the desired data transfer system, mounted with both a semiconductor integrated circuit 2 and an external ROM 1, has been formed.

With the data transfer system according to the first embodiment of the present invention, when data is transferred between the semiconductor integrated circuit 2 and the external ROM 1, encryption is used to protect data content from being deciphered by a third party. In the case where the encryption processing of the semiconductor integrated circuit according to the first embodiment of the present invention is not used, secrecy may not be protected unless the FPGA circuit 6 is separately redesigned. In contrast, with the semiconductor integrated circuit according to the first embodiment of the present invention, by encrypting the data in the external ROM 1, circuit design data secrecy can be protected and furthermore, since it merely involves encryption of conventional FPGA design data, there is little imposition on the designer because the encryption can be automated. Compared to designing a completely new FPGA circuit 6, design time and labor can be drastically reduced and the operational efficiency of the user design process is improved. The fact that the FPGA circuit embedded semiconductor integrated circuit is able to protect circuit design data secrecy and also improve circuit design efficiency makes it attractive for users.

In the case of parallel data input from the external ROM 1, since data can be brought into the semiconductor integrated circuit 2 at a high speed, high speed configuring of the FPGA circuit 6 is made possible.

This embodiment, which uses a RAM FPGA circuit can provide an FPGA embedded semiconductor integrated circuit and data transfer system which allows easy manufacturing, a high level of secrecy, and also a more compact FPGA region than an FPGA using non-volatile memory (ROM).

With the semiconductor integrated circuit according to the test embodiment of the present invention, it is possible to provide an external ROM-applicable, FPGA circuit-loaded semiconductor integrated circuit having encrypted design data with a high level of secrecy. Moreover, with the data transfer system according to the first embodiment of the present invention, it is possible to provide an external ROM-type data transfer system having encrypted design data with a high level of secrecy. By utilizing encrypted data for transfers between the external ROM 1 and the semiconductor integrated circuit 2, it is possible to improve software secrecy.

(Modified Example of the First Embodiment)

Figure 11:
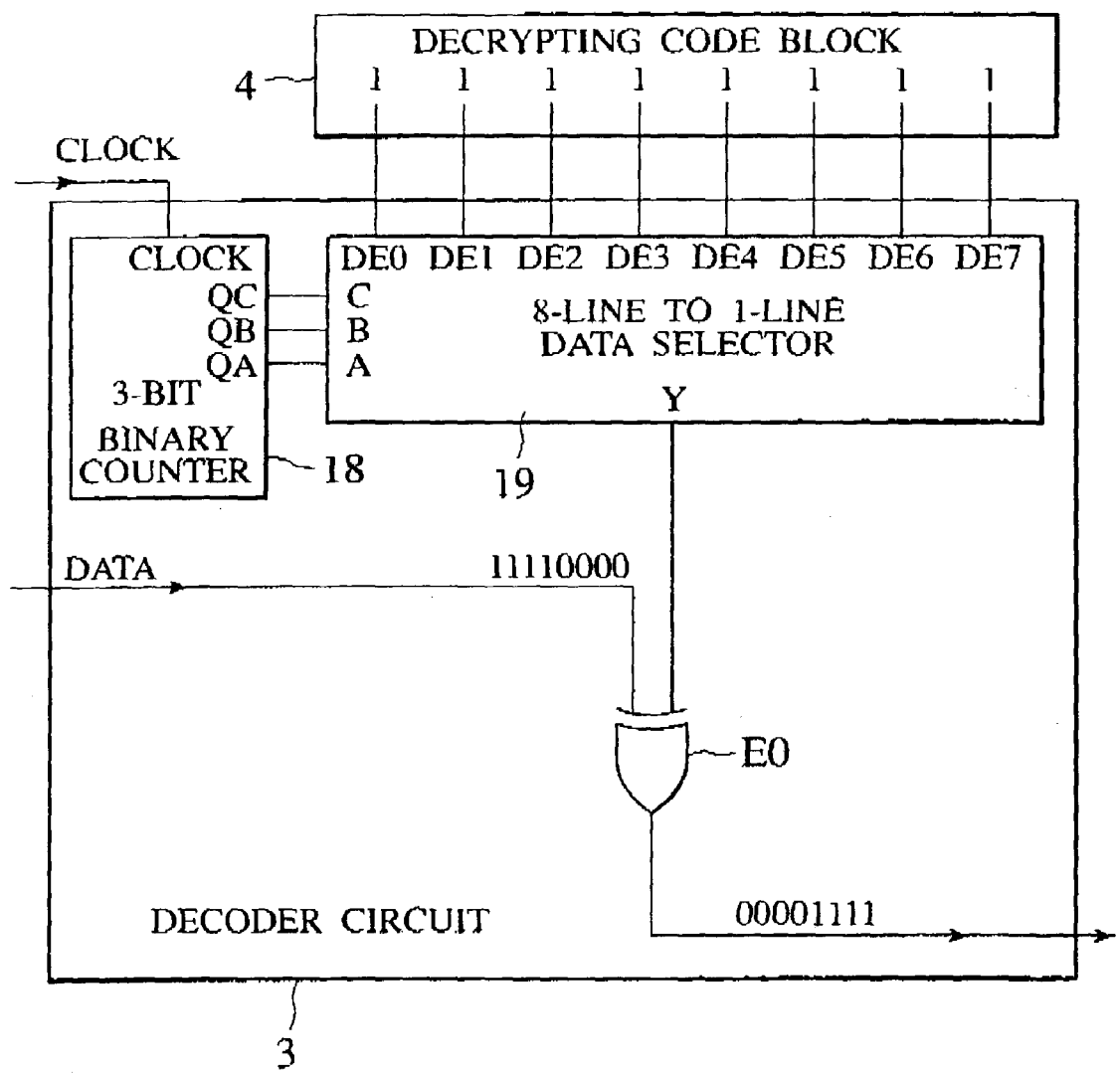
FIG. 11 is a logic circuit diagram representing the configuration of a decoder circuit and decryption code block according to a modified example of the first embodiment of the present invention.

The modified example of the first embodiment of the present invention has a configuration which uses one data line 9 between the external ROM 1 and the FPGA circuit embedded semiconductor integrated circuit 2, to perform serial instead of parallel data transfer from the external ROM 1 to the semiconductor integrated circuit 2. The configuration of a decoder circuit 3 and a decryption code block 4 according to the modified example of the first embodiment of the present invention is now described using FIG. 11. To facilitate description, a simple example of a decoder circuit 3 is shown in FIG. 11. The external ROM 1, which is a semiconductor memory device, has ports having one-to-one correspondence with the I/O ports of the semiconductor integrated circuit 2. The external ROM 1 outputs serial data to the semiconductor integrated circuit 2, This modified example illustrates an example of processing in the case where serial data from the external ROM 1 enters the semiconductor integrated circuit 2. As with the parallel data, this case also illustrates the case of setting the encryption method in 8-bit units. A clock signal CLOCK, which is input to the external ROM 1 to control the timing of data output, is also input to this decoder circuit 3 to synchronize data acquisition with the external ROM 1. This clock signal CLOCK is input to the clock signal input terminal CLOCK of the 3-bit binary counter 18.

From this binary counter 18, a 3-bit select signal is output from the output terminals QA, QB, and QC. This 3-bit select signal is input to the select signal input terminals A, B, and C of a data selector circuit (8-line to 1-line data selector) 19. The 8-bit decryption code from the decryption code block 4 is input to the decryption code input terminals DE0, DE1, DE2, DE3, DE4, DE5, DE6, and DE7 of the data selector circuit 19.

The decoder circuit 3 further includes a single exclusive OR circuit EO and, to the input terminal thereof, one-bit data from the external ROM 1 and one bit of code from an output terminal Y of the data selector 19 is input. The output of the exclusive OR circuit EO, which heads towards the right side of FIG. 11, is coupled to the configuration circuit 5 shown in FIG. 3.

Next, a data acquisition method from the external ROM 1 is described. The order in which 8-bit units of serial data enters is given as D0, D1, D2, D3, D4, D5, D6, and D7, and whether to respectively invert each from "0" to "1" or vice-versa is determined and made into an decryption code, which is implanted beforehand into the decryption code block 4 of the semiconductor integrated circuit 2. Once the serial data has reached D7, the decryption code returns to the beginning and repeats. As with the method shown in FIG. 10, this modified example illustrates the case where all of the bits are inverted. When encrypted data from the external ROM 1 enters, in order, as 0, 0, 0, 0, 1, 1, 1, 1, the data output from this decoder circuit 3 leaves, in order, as 1, 1, 1, 1, 0, 0, 0, 0.

The clock signal CLOCK external to the semiconductor integrated circuit 2 enters the 3-bit binary counter 18, counting from 0 to 7 is performed inside of the binary counter 18, and the current count is displayed at output terminals QC, QB, and QA in binary code. Here, QC is the most significant bit, and QA is the least significant bit. This signal is sent to the data selector circuit 19, the data DE0, DE1, DE2, . . . , DE7 is selected in conformity with the count and output to the Y output terminal. Since the data DE0, DE1, DE2, . . . , DE7 is coupled to the decryption code block 4 embedded in the semiconductor integrated circuit 2, each piece of data is sequentially selected and output to the Y terminal. The Y output signal is input to the exclusive OR circuit EO together with the data DATA from the external ROM 1. This exclusive OR circuit EO functions to output "0" when the two input levels are equal, and output "1" when the two input signals differ. Accordingly, when one of the two is fixed at "1", the exclusive OR circuit EO functions as an inversion circuit for the rest of the input; conversely, when one is fixed at "0", it functions to output the rest of the values without change.

In this manner, the serial data is sequentially decrypted and sent to the configuration circuit 5, which is the circuit of the next stage. In the case where data is acquired serially as described above, since the external ROM 1 and the semiconductor integrated circuit 2 may be connected with a less number of paths than with the first embodiment, it is possible to reduce the number of wires on the printed circuit board 8. As a result, configuration of the modified example of the first embodiment of the present invention is also possible on a printed circuit board 8 where wiring density is high and the wiring layout is tight. Other configurations similar to those of the first embodiment are also possible in addition to that described above. As with the first embodiment, the modified example of the first embodiment of the present invention results in preservation of data secrecy.

With the modified example of the first embodiment of the present invention, a high security FPGA circuit embedded semiconductor integrated circuit, data transfer system, and semiconductor integrated circuit data transfer method, which prevents the reading of design data and software, can be provided.

(Second Embodiment)

Figure 12:
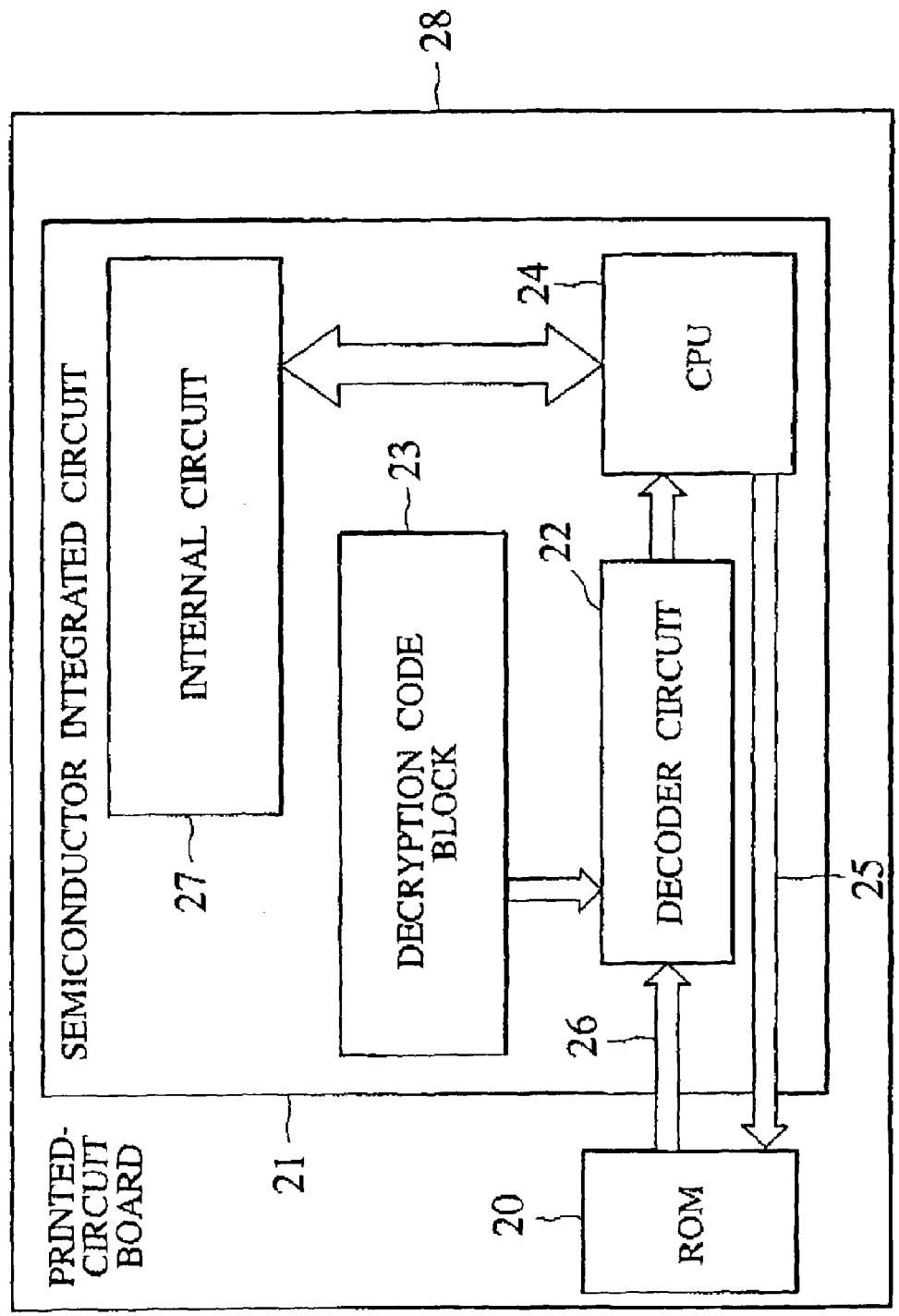
FIG. 12 is a block diagram showing the configuration of a semiconductor integrated circuit and data transfer system according to a second embodiment of the present invention.

A semiconductor integrated circuit and a data transfer system according to the second embodiment of the present invention, as shown in FIG. 12, is a hybrid integrated circuit configured with an external ROM 20 integrated on the first semiconductor chip and a semiconductor integrated circuit 21 integrated on the second semiconductor chip, which is embedded with a CPU 24, respectively mounted on a printed circuit board 28. Moreover, the semiconductor integrated circuit 21 is a monolithic integrated circuit configured with a decoder circuit 22, which is connected to the external ROM 20 via a data line 26; a decryption code block 23, which is connected to the decoder circuit 22; a CPU 24, which is also connected to the decoder circuit 22; and an internal circuit 27, which is connected to the CPU 24. The external ROM 20, which is a semiconductor memory device having ports with one-to-one correspondence to the I/O ports of the semiconductor integrated circuit 21, outputs data in parallel to the semiconductor integrated circuit 21.

In addition, the example shows that the first semiconductor chip and the second semiconductor chip are implemented on the printed circuit board 28 in FIG. 12, but, it is clear that the first semiconductor chip and the second semiconductor chip may be implemented as a multi-layer structure via a soldered metal layer.

Encrypted software data for the CPU 24 is stored in the external ROM 20. Accordingly, encrypted software data from the external ROM 20 is input to the decoder circuit 22 inside the semiconductor integrated circuit 21 via the data line 26, The decryption code is decided when designing the semiconductor integrated circuit 21, and is stored and implanted in the decryption code block 23 inside the semiconductor integrated circuit 21.

The decryption code is input to the decoder circuit 22 from the decryption code block (memory unit) 23. Using this decryption code, the decoder circuit 22 decodes the encrypted design data input from the external ROM 20, and then outputs the design data to the CPU 24 provided in the semiconductor integrated circuit 21. In the second embodiment of the present invention, a decoder circuit 22 is provided between the external ROM 20 and the CPU 24. This decoder circuit 22 receives design data from the external ROM 20 and then sends it out to the CPU 24.

In addition, in this embodiment, the CPU 24 and the external ROM 20 are directly connected via the address bus line 25, wherein the CPU 24 requests data from the external ROM 20 by specifying an address The external ROM 20 transmits the specified data to the decoder circuit 22 via the data line 26. The decoder 22 submits the specified data to the CPU 24.

With the semiconductor integrated circuit according to the second embodiment of the present invention, as shown in FIG. 12, a decoder circuit 22 is disposed between the external ROM 20 and the CPU 24, wherein decryption code data is transmitted to the decoder 22.

An encryption code is first determined when designing the semiconductor integrated circuit 21, and is recorded and implanted in the decryption code block 23 in the semiconductor integrated circuit 21. Accordingly, the encrypted design data relating to the encrypted software data is encrypted into a unique code that differs for each semiconductor integrated circuit 21.

The encrypted data procured from the external ROM 20, is decrypted in the decoder circuit 22, and then transmitted to the CPU 24 where it functions like a normal software program. Following the start of CPU 24 operation, circuit operation takes place with the internal circuit 27 inside of the semiconductor integrated circuit 21. Included inside this internal circuit 27 are circuits selected from a general purpose microprocessor, DSP core, interface circuit, etc. which are determined in accordance with the intended purpose of the integrated circuit. The semiconductor integrated circuit 21 is thus formed having the CPU 24 and the internal circuit, etc., in an embedded structure. As a result, it may be used for a wide range of purposes. This external ROM 20 and the semiconductor integrated circuit 21 are mounted on the same printed circuit board 28 and configure a data transfer system. A bus data line 26 having wiring connectors, the number of connectors being equal to the number of bits of encrypted CPU software data transmitted from the external ROM 20, and an address bus line 25 is further provided on the printed circuit board 28 so as to connect the external ROM 1 and the semiconductor integrated circuit.

Figure 13:
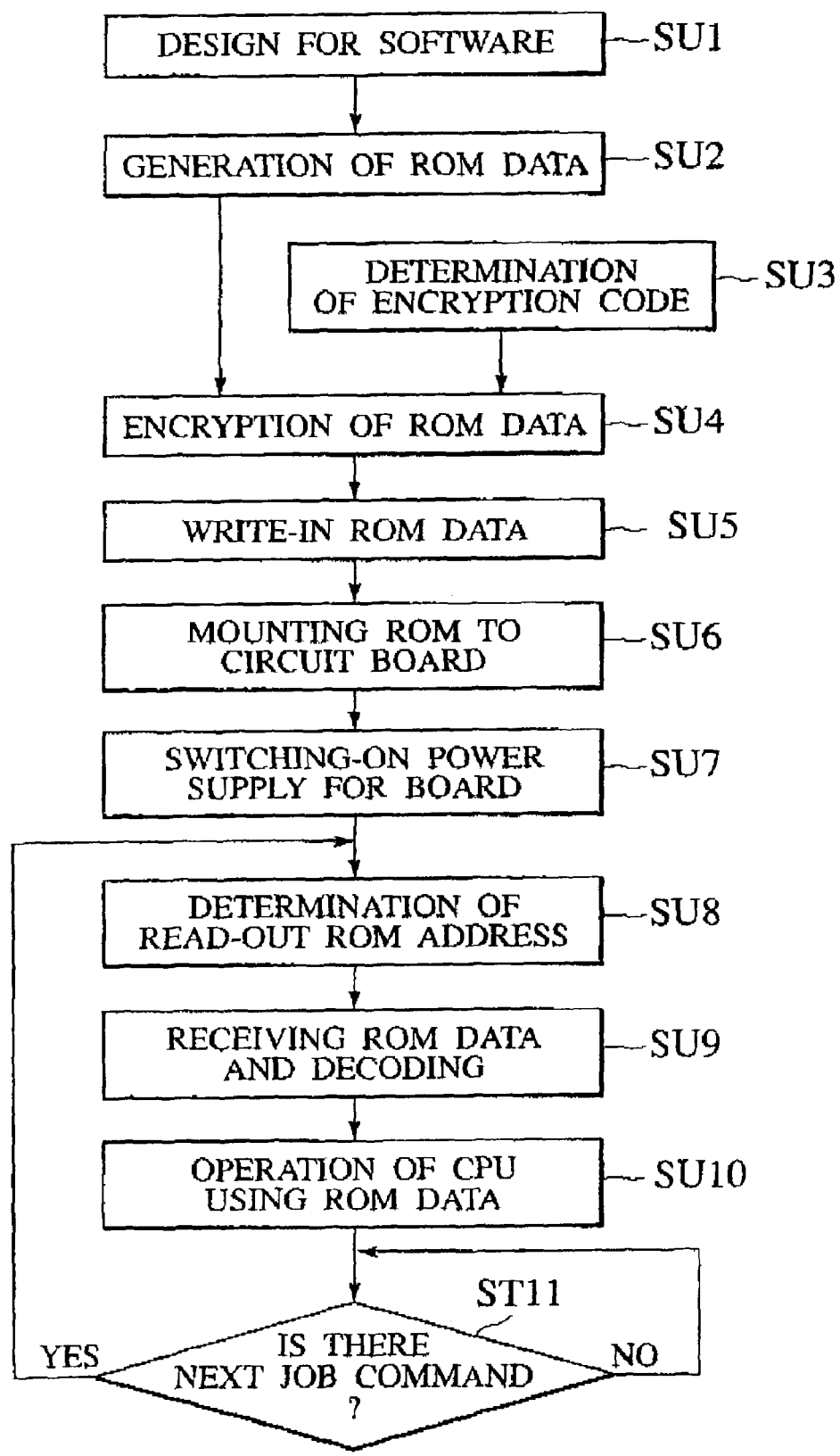
FIG. 13 is a flowchart showing how a semiconductor integrated circuit and data transfer system according to the second embodiment of the present invention operate.

A method of operating a semiconductor device and a data transfer system according to the second embodiment of the present invention is now described using FIG. 13.

(a) To begin with, in a first step SU1, the software designer for the CPU 24 inside the semiconductor integrated circuit 21 will design the software.

(b) Next, in a second step SU2, the designed software is generated as ROM data.

(c) Next, in a third step SU3, the encryption code to be adopted, which is submitted by the manufacturer of the semiconductor integrated circuit 21 is determined.

(d) Next, in a fourth step SU4, the ROM data is encrypted based on the encryption code.

(e) Next, in a fifth step SU5, encrypted ROM data is written into the external ROM 20.

(f) Next, in a sixth step SU6, the external ROM 20 is mounted on the printed circuit board 28.

(g) Next, in a seventh step SU7, the power supply for the printed circuit board 28 is switched on.

(h) Next, in an eight step SU8, a ROM address in the external ROM 20 is requested and determined by an operation of a CPU 24 in the semiconductor integrated circuit 21.

(i) Next, in a ninth step SU9, the encrypted ROM data corresponding to the specified address is acquired from the external ROM 20 by the decoder circuit in the semiconductor integrated circuit 21. In the decoder circuit 22, using the decryption code input from the decryption code block 23, encrypted ROM data is decrypted as software data and output to the CPU 24

(j) Next, in a tenth step SU10, the CPU 24 is operated using the input software data.

(k) Next, in an eleventh step SU11, it is determined whether or not there is a next job command. If NO, then processing returns to the eleventh step SU11. If YES, then the processing returns to the eighth step SU8.

(l) The above steps end when the power supply is turned off.

(m) Next, when the power supply is switched on again, the processing repeats starting from the request of an address from the CPU 24 to the ROM 20.

The decoder 22 has substantially the same configuration a that described using FIG. 10 in the first embodiment, and therefore description is omitted.

In the case of parallel data input from the external ROM 20, since data can be brought into the semiconductor integrated circuit 21 at a high speed, high speed data transmission to the CPU is possible. Parallel data input allows the software to be taken in at high speed and the CPU to operate at high speed. Depending on circumstances, as described in the modified example of the first embodiment of the present invention, the configuration of the decoder circuit 3 and the decryption code block 4 in FIG. 11 can be used for the configuration of the decoder circuit 22 and the decryption code block 23 to perform serial data input. In the case of serial data input, since the external ROM 20 and the semiconductor integrated circuit 21 may be connected with a small number of paths, it is possible to reduce the number of wires on the printed circuit board 28, thus it can be used on a printed circuit board 8 where wiring density is high and wiring layout is tight.

Software design secrecy can be improved if the data for the external ROM 20 is encrypted and input to the decoder circuit 22, and then the encrypted data in the decoder circuit 22 is decoded in the decoder circuit using the decryption code recorded/implanted in the decryption code block 23 inside the CPU 24-embedded integrated circuit 21 and used to drive the CPU 24. In the case of a CPU 24 where the CPU instruction code has been determined, even if software design is carried out based on this instruction code, and the software data is stored in the external ROM 20, there is no possibility that the software design content will be revealed even if the external ROM 20 data is analyzed.

With the semiconductor integrated circuit according to the second embodiment of the present invention, it is possible to provide an external ROM-applicable, CPU-loaded semiconductor integrated circuit having software design data with a high level of secrecy. Moreover; with the data transfer system according to the second embodiment of the present invention, it is possible to provide an external ROM-type data transfer system having software design data with a high level of secrecy. By utilizing encrypted data for transfers between the external ROM 20 and the semiconductor integrated circuit 21, it is possible to improve software secrecy.

With the second embodiment of the present invention, a high security CPU-embedded semiconductor integrated circuit, data transfer system, and semiconductor integrated circuit data transfer method, which prevent the reading of design data and software, can be provided.

(Third Embodiment)

Figure 14:
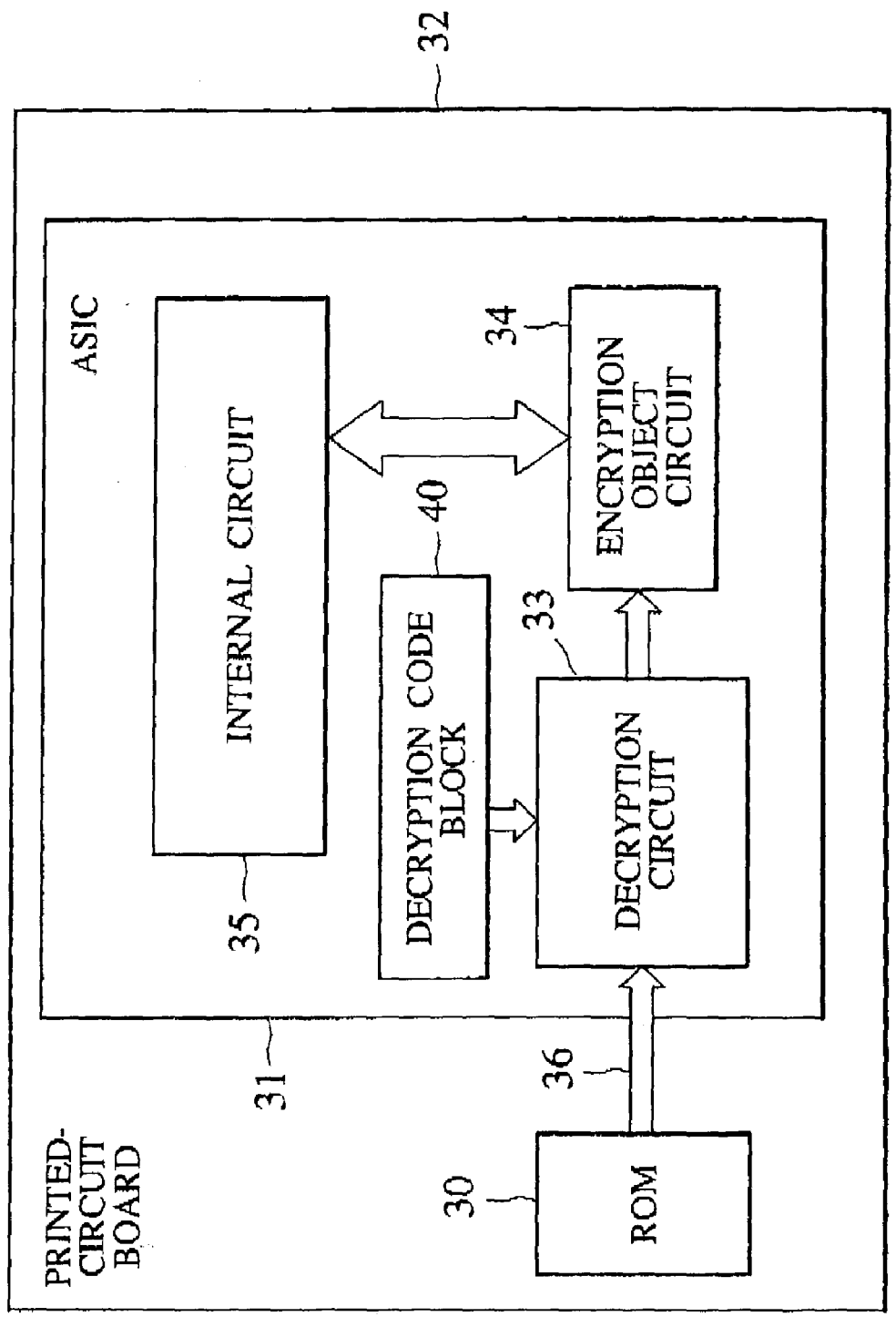
FIG. 14 is a block diagram showing the configuration of an ASIC and an ASIC system according to a third embodiment of the present invention.

A semiconductor integrated circuit and a data transfer system according to the third embodiment of the present invention, as shown in FIG. 14, is a hybrid integrated circuit configured with an external ROM 30 integrated on the first semiconductor chip and an application specific integrated circuit (ASIC) 31 integrated-on the second semiconductor chip, respectively mounted on a printed circuit board 32. Moreover, the ASIC 31 is configured with a decryption circuit 33, which is connected to the external ROM 30 via a data bus 36; a decryption code block 40, which is connected to the decryption circuit 33; an encryption object circuit 34, which is also connected to the decryption circuit 33; and an internal circuit 35, which is connected to the encryption object circuit 34. In this embodiment, the encryption object circuit 34 is stores confidential data and can define a circuit which executes a fixed circuit operation between it and the internal circuit 35. It is mainly configured with a CPU or an FPGA circuit. Naturally, it may include other types of circuits as long as it is a circuit for the purpose of encryption.

The third embodiment of the present invention gives improved results by incorporating the automated design technology of ASIC. Specifically, even if a fundamental circuit for a general purpose FPGA circuit or CPU is stored in an ASIC database, cracking the stored data by a third party is impossible. Thus, simplification of the automated design process including: simplification of the automated design process through standardization of the FPGA circuit and the CPU, and standardization of decoder circuits such as the decryption circuit 33; and simplification of the automated design process through standardization of the procedures for encryption code determination and decryption code design and standardization of the encryption process for the ROM is possible. Moreover, it is possible to improve the level of design secrecy in the final FPGA-embedded semiconductor integrated circuit and CPU-embedded semiconductor integrated circuit products.

Non-encrypted data for the FPGA circuit core and the CPU core is registered. Moreover, since decoder circuits such as the decryption process circuit 33 may be registered, their design data may be combined when downloading to allow utilization during LSI design.

Design process simplification is now described.

When automating design, it is necessary to first standardize the target circuit. This standardization emanates from the fact that it becomes easier to generate the software program for design automation if equivalent circuits or equivalent design processes can be used without modification and/or the correction process becomes more simplified. In the case of the third embodiment of the present invention, as the design data for the FPGA circuit and the CPU circuit can be used without modification, they avoid complexity of the design automation software program.

Moreover, by standardizing the encryption process and the decoding process, and/or the decryption Circuit, it becomes possible to utilize the design data for the decryption circuit without modification.

Moreover, by setting the encryption process, it becomes possible to develop a software program to automatically encrypt data to be written in the external ROM 30. In addition, it is also possible to develop a software program for determining the encryption code, which implants automatically calculates the decryption code for that encryption, and then implanting the decryption code in the ASIC 31.

Since a variety of circuits are registered in a database in order to allow automated design of an ASIC product circuit requested from a client, and the characteristics of those individual circuits are also registered, it is possible to retrieve design data for the requested circuit from the client and combine it so as to construct the ASIC 31, and moreover, automatic calculation of a decrypted code for that determined encryption is possible. This allows for pre-determination of whether the performance expected by the client may reach a satisfactory level. Accordingly, with the third embodiment of the present invention, encrypting design data and automating the design of a decoding circuit, such as the decryption circuit 33, is possible without any problems using an extended ASIC automated design technique. In addition, since the burden on the designer decreases, design efficiency is increased when used in combination with the ASIC technique.

(Fourth Embodiment)

Figure 15:
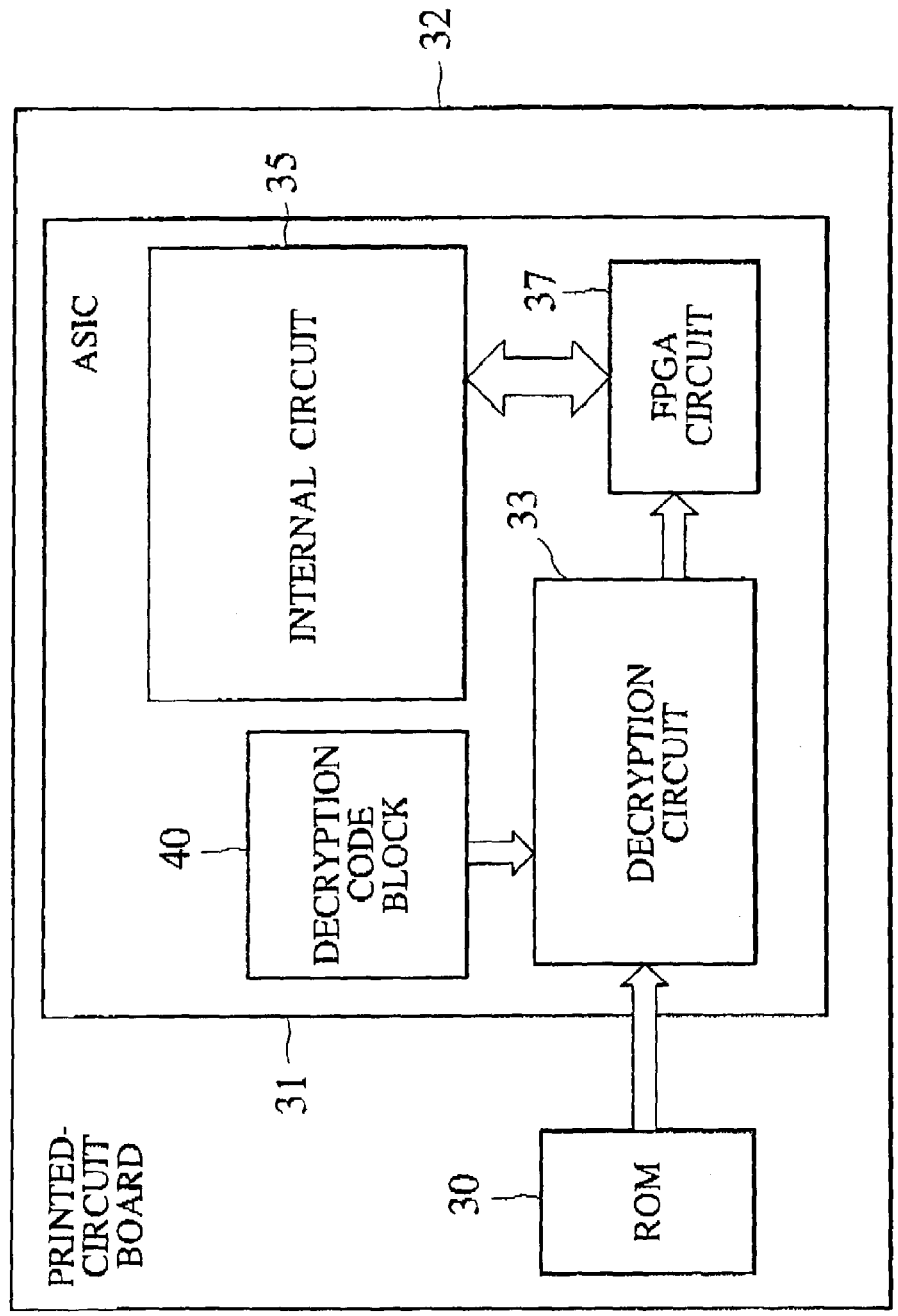
FIG. 15 is a block diagram showing the configuration of an ASIC and an ASIC system according to a fourth embodiment of the present invention.

A semiconductor integrated circuit and a data transfer system according to the fourth embodiment of the present invention, as shown in FIG. 15, is a hybrid integrated circuit configured with an external ROM 30 integrated on the first semiconductor chip and an ASIC 31 integrated on the second semiconductor chip, respectively mounted on a printed circuit board 32. Moreover, the ASIC 31 is configured with a decryption circuit 33, which is connected to the external ROM 30 via a bus data line 36; a decryption code block 40, which is connected to the decryption circuit 33; an FPGA circuit 37, which is also connected to the decryption circuit 33; and an internal circuit 35, which is connected to the FPGA circuit 37. In this embodiment, the FPGA circuit 37 is also the encryption object circuit 34 for encryption for illustrative purposes.

(Fifth Embodiment)

Figure 16:
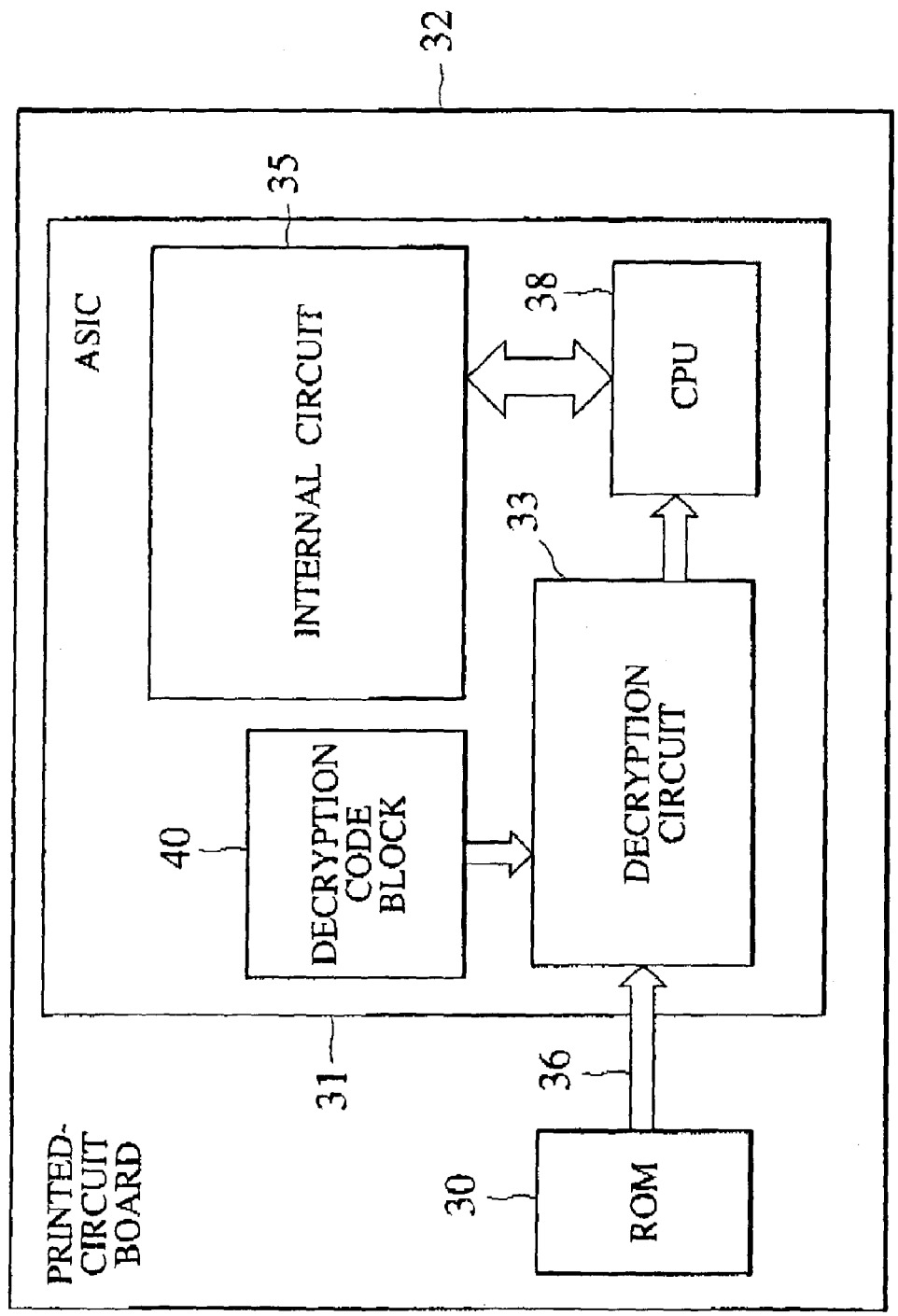
FIG. 16 is a block diagram showing the configuration of an ASIC and an ASIC system according to a fifth embodiment of the present invention.

A semiconductor integrated circuit and a data transfer system according to the fifth embodiment of the present invention, as shown in FIG. 16, is a hybrid integrated circuit configured with an external ROM 30 integrated on the first semiconductor chip and an ASIC 31 integrated on the second semiconductor chip, respectively mounted on a printed circuit board 32. Moreover, the ASIC 31 is a monolithic integrated circuit configured with a decryption circuit 33, which is connected to the external ROM 30 via a bus data line 36; a decryption code block 40, which is connected to the decryption circuit 33; a CPU 38, which is also connected to the decryption circuit 33; and an internal circuit 35, which is connected to the CPU 38. In this embodiment, the CPU 38 also functions as the encryption object circuit 34 for encryption for illustrative purposes.

(Sixth Embodiment)

Figure 17:
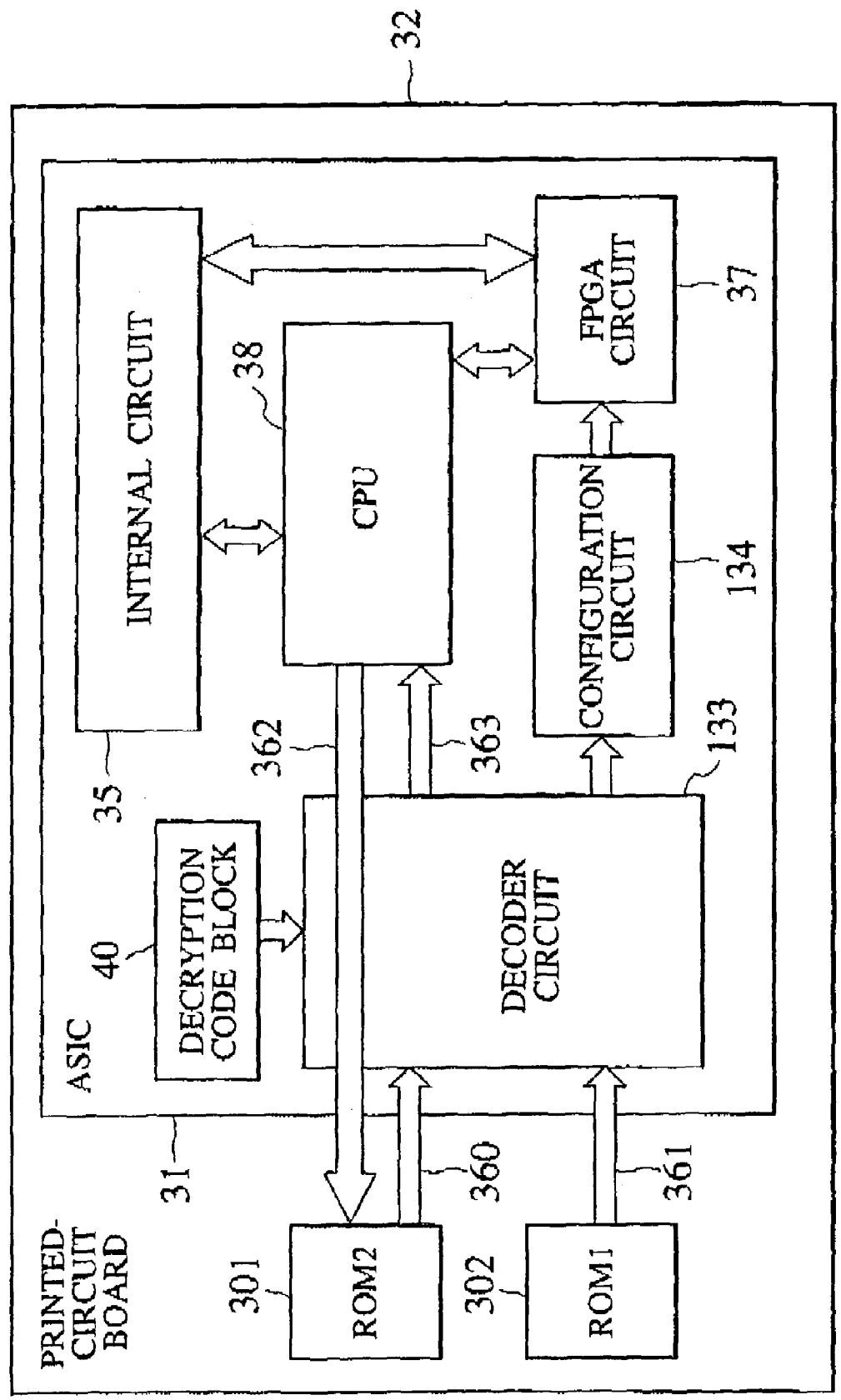
FIG. 17 is a block diagram showing the configuration of an ASIC and an ASIC system according to a sixth embodiment of the present invention.

A semiconductor integrated circuit and a data transfer system according to the sixth embodiment of the present invention, as shown in FIG. 17, is a hybrid integrated circuit configured with the second external ROM 301 and the first external ROM 302, and an ASIC 31 integrated on the second semiconductor chip, respectively mounted on a printed circuit board 32. The first external ROM 302 is integrated on the first semiconductor chip. The second external ROM 301 is integrated on a semiconductor chip different from the second semiconductor chip. The second external ROM 301 may be integrated on the same semiconductor chip with the first semiconductor chip. Moreover, the ASIC 31 integrated on the second semiconductor chip is a monolithic integrated circuit configured with a decoder circuit 133, which is connected to the external ROMs 301 and 302 via buses 360 and 361, respectively; a decryption code block 40, which is connected to the decoder circuit 133; a configuration circuit 134, which is also connected to the decoder circuit 133; the FPGA circuit 37, which is connected to the configuration circuit 134; an internal circuit 35, which is connected to the FPGA circuit 37, and a CPU 38 which is connected to the decoder circuit 133. In addition, the CPU 38 is further connected to the FPGA circuit 37, the internal circuit 35, and the external ROM 301. The CPU 38 specifies an address to request data from the external ROM 301 via the address bus line 362. As a result, the ROM data decrypted in the decoder circuit 133 is output to the CPU 38 via the data bus line 363. With the sixth embodiment of the present invention, two external ROMs are provided, wherein encrypted data for driving the CPU 38 is stored in the second external ROM 301 and the encrypted data for driving the FPGA circuit 37 is stored in the fist external ROM 302. A significant feature of the sixth embodiment of the present invention is the embedded structure of the FPGA circuit 37 and CPU 38 in the ASIC 31.

In addition, the example wherein the first semiconductor chip and the second semiconductor chip are implemented together on the printed circuit board 32 is shown in FIG. 17, but, it is clear that the first semiconductor chip and the second semiconductor chip may be implemented as a multi-layer structure via a soldered metal layer.

Figure 18:
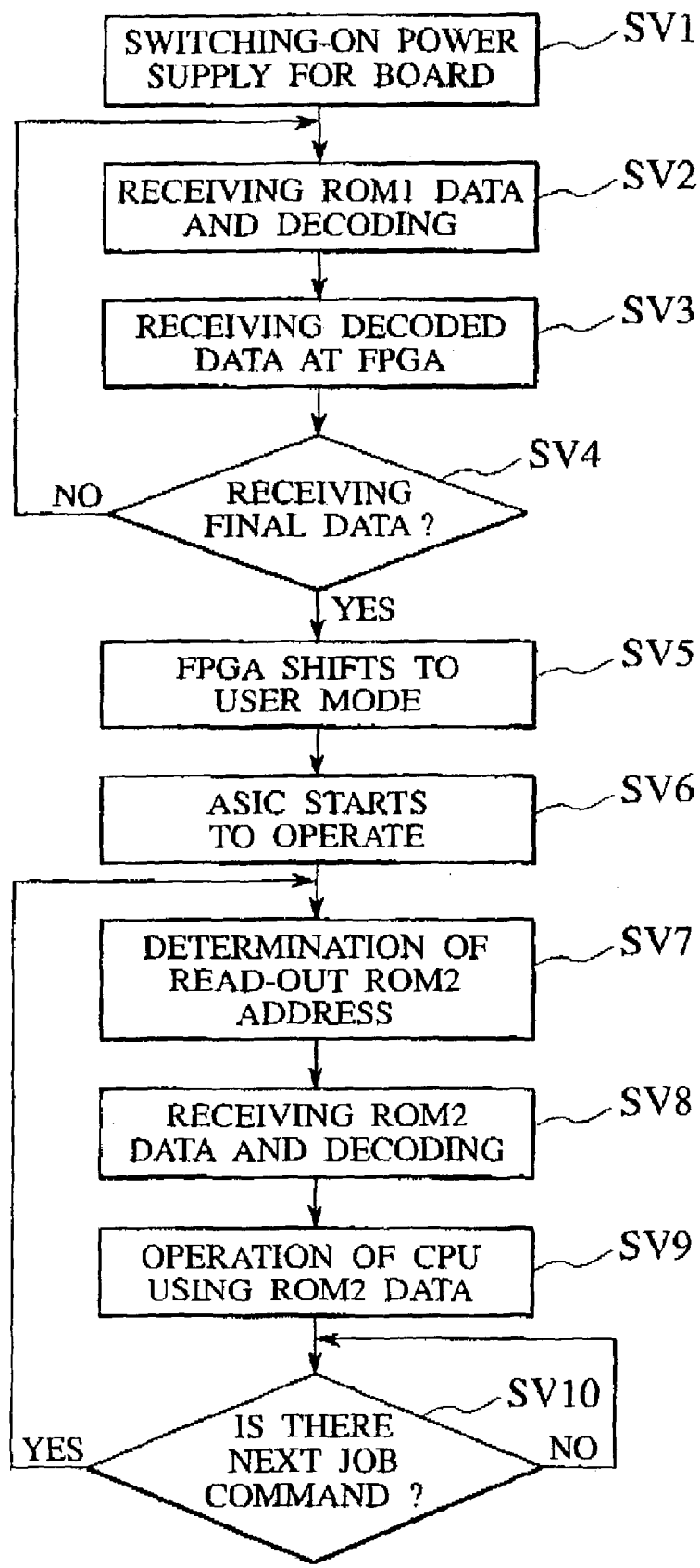
FIG. 18 is a flowchart showing how an ASIC and an ASIC system according to a sixth embodiment of the present invention operate.

A method of operating a semiconductor integrated circuit and a data transfer system according to the sixth embodiment of the present invention is now described using FIG. 18. FIG. 18 shows the operational flow between switching on the power supply and activation of the CPU 38. The data writing flow for the first external ROM 302, which stores the encrypted data corresponding to the FPGA 37, is substantially the same as that in FIG. 4 between the step ST1, designing the FPGA circuit 37, and the step ST6, mounting ROM to the circuit board, and is therefore omitted here. In addition, the data writing flow for the second external ROM 301, which stores the encrypted data corresponding to the CPU 38, is substantially the same as that in FIG. 13 between the step SU1, software design, and the step SU6, mounting ROM to the circuit board, and is therefore omitted here.

Data for the function to be established for the FPGA circuit 37 is written in the first external ROM 302. In addition, it is assumed that software data to be operated by the CPU 38 is stored in the second external ROM 301. It is also assumed that both ROM 301 and ROM 302 are written with encrypted data.

(a) In step SV1, the power supply for the printed circuit board on which the ASIC 31 and the two ROMs are mounted is first switched on.

(b) Next, in step SV2, the decoder circuit 133 receives and decodes the encrypted data of the ROM 302. Since the keyword for decoding is already embedded in the decryption code block 40 as the decryption code, that data is used.

(c) Next, in step SV3, the decoded data is sent to the configuration circuit 134, that data is converted into an FPGA circuit 37 readable form, and this decoded data is received by the FPGA circuit 37. The FPGA circuit is thus structured as a circuit satisfying the programmed function.

(d) Next, in step SV4, it is determined whether the final piece of data has been received. If YES, then processing proceeds to step SV5. If NO, then processing returns to step SV2.

(e) Next, in step SV5, once all of the data has been brought into the FPGA circuit 37, the FPGA circuit 37 shifts to user mode.

(f) Then in step SV6, operation of the ASIC 31 begins.

The CPU in the ASIC similarly begins operation, (g) Next, in step SV7, a start address set during CPU 38 design is requested from the CPU 38 to the second external ROM 301 to specify an address in the second external ROM 301.

(h) Next, in step SV8, the encrypted software data from the ROM 301 is received and decoded by the decoder circuit 133, and sent to the CPU 38.

(i) Next, in step SV9, job commands are executed in the CPU based on the decrypted data.

(j) Next, in step SV10, it is determined whether or not there is a next job command. If YES, then processing returns to step SV7. If NO, then step SV10 is repeated.

In this manner, even if data is read out from the ROM 301 or ROM 302, secrecy is preserved for both the FPGA circuit 37 function and the software operating on the CPU 38.

(Seventh Embodiment)

Figure 19:
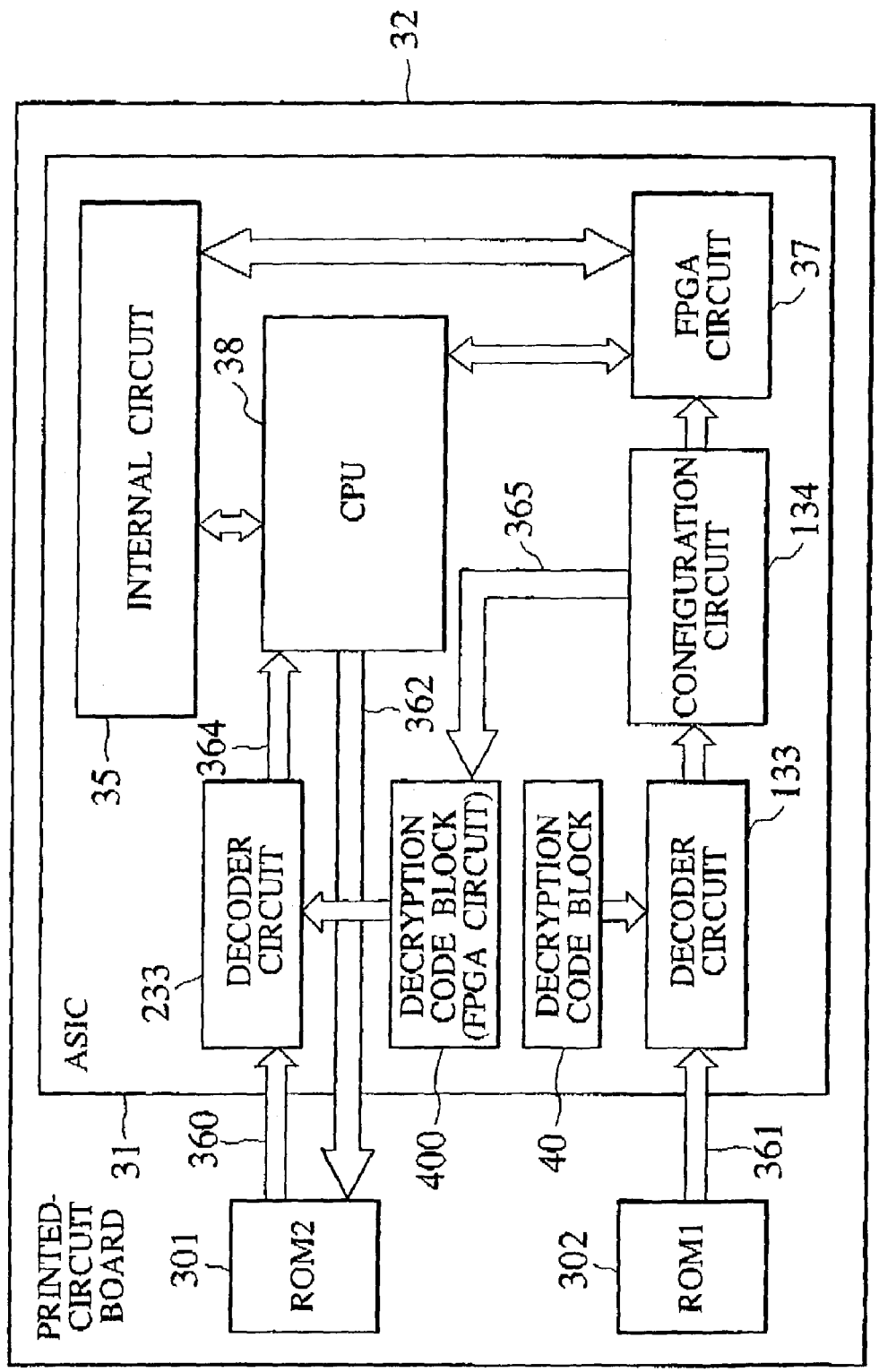
FIG. 19 is a block diagram showing the configuration of an ASIC and an ASIC system according to a seventh embodiment of the present invention.

A semiconductor integrated circuit and data transfer system according to the seventh embodiment of the present invention, as shown in FIG. 19, is characterized by further including a decryption code block 400, which is connected to a configuration circuit 134, and a second decoder circuit 233, which is connected to the decryption code block 400. More specifically, the decryption code block 401 is configured with an FPGA circuit. Accordingly, the circuit structure thereof is defined by the configuration circuit 134. The CPU 38 specifies an address to request data from the second external ROM 301 via the address bus line 362. As a result, the ROM data decrypted in the second decoder circuit 233 is output to the CPU 38 via the data bus line 364. With the seventh embodiment of the present invention, two external ROMs are provided, wherein encrypted data for driving the CPU 38 is stored in the second external ROM 301 and the encrypted data for driving the FPGA circuit 37 is stored in the first external ROM 302. The embedded structure of the FPGA circuit 37 and CPU 38 in the ASIC 31 integrated on the second semiconductor chip, as shown in FIG. 19, is a significant feature for the seventh embodiment of the present invention. The configuration of the modified example shown in FIG. 19 is substantially the same as the configuration shown in FIG. 17, except that the decryption code for the CPU 38 is structured in the decryption code block 400, which is configured from an FPGA circuit.

The encrypted data used as the function data for building the FPGA circuit 37 is written in the ROM 302 integrated on the first semiconductor chip, and in addition, the decryption code for the CPU 38 is also written in the first external ROM 302 as data. The FPGA circuit 37 is structured before operation of the ASIC 31 starts. In addition, before operation of the CPU 38 starts, the decryption code for the CPU is established in the decryption code block 400. Through this, in addition to the benefits of the semiconductor integrated circuit and data transfer system according to the sixth embodiment of the present invention shown in FIG. 17, there is the significant feature of being able to change the CPU 38 decryption code whenever necessary by changing the ROM 302 data. In other words, the seventh embodiment of the present invention is effective for cases when there is a desire to modify externally the encrypted data of the CPU 38. If, for whatever reason, the encrypted data stored in the second external ROM 301 should be cracked, it is possible to modify the FPGA circuit configured in the decryption code block 400 in conformity with the content of the first external ROM 302. At the same time, the content of the second external ROM 301 can also be modified to match the modified contents of the first external ROM 302. Therefore, it is possible to arbitrarily change the content of encrypted data for a CPU 38 that has had its secrets revealed.

The first external ROM 302 is integrated on the first semiconductor chip. The second external ROM 301 is integrated on a semiconductor chip different from the second semiconductor chip. The second external ROM 301 may be integrated on the same semiconductor chip with the first semiconductor chip.

In addition, the example that the first semiconductor chip and the second semiconductor chip are implemented together on the printed circuit board 32 is shown in the example of FIG. 19, but, it is clear that the first semiconductor chip and the second semiconductor chip may be implemented as a multi-layer structure via a soldered metal layer.

Figure 20A:
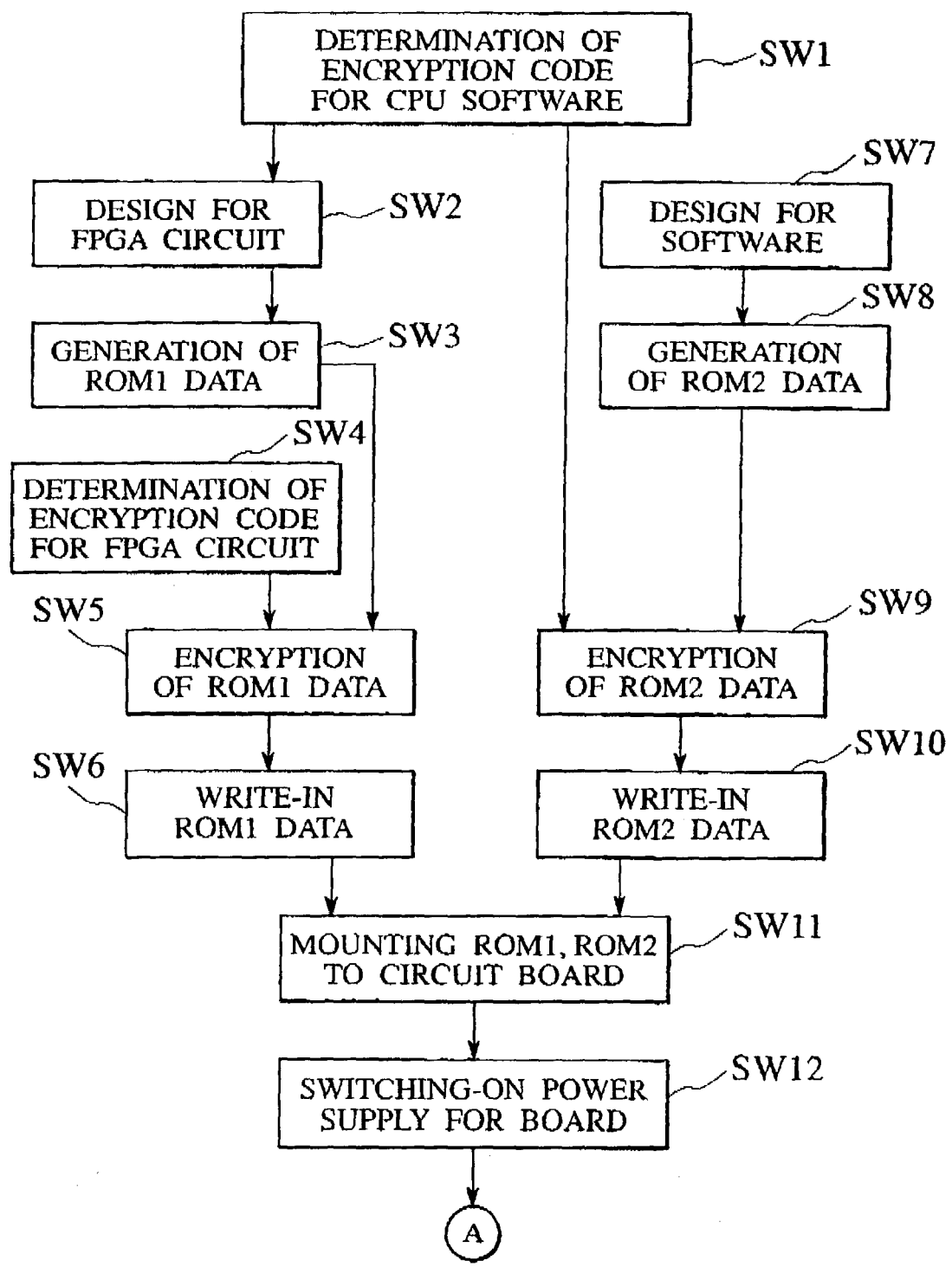
FIGS. 20A and 20B are a flowchart showing how an ASIC and an ASIC system according to a seventh embodiment of the present invention operate between CPU software encryption code determination and CPU operation.
Figure 20B:
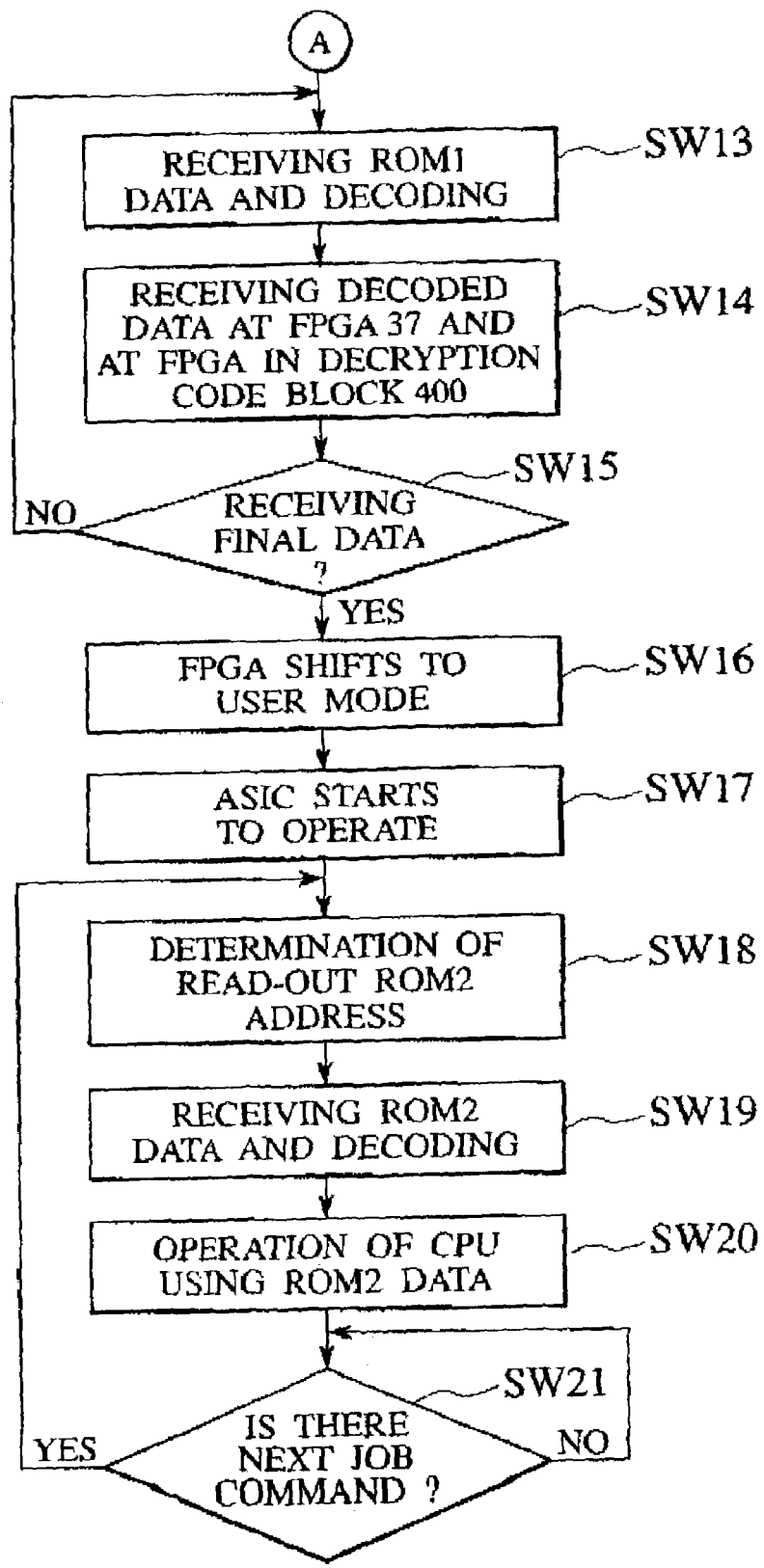
Figure 21:
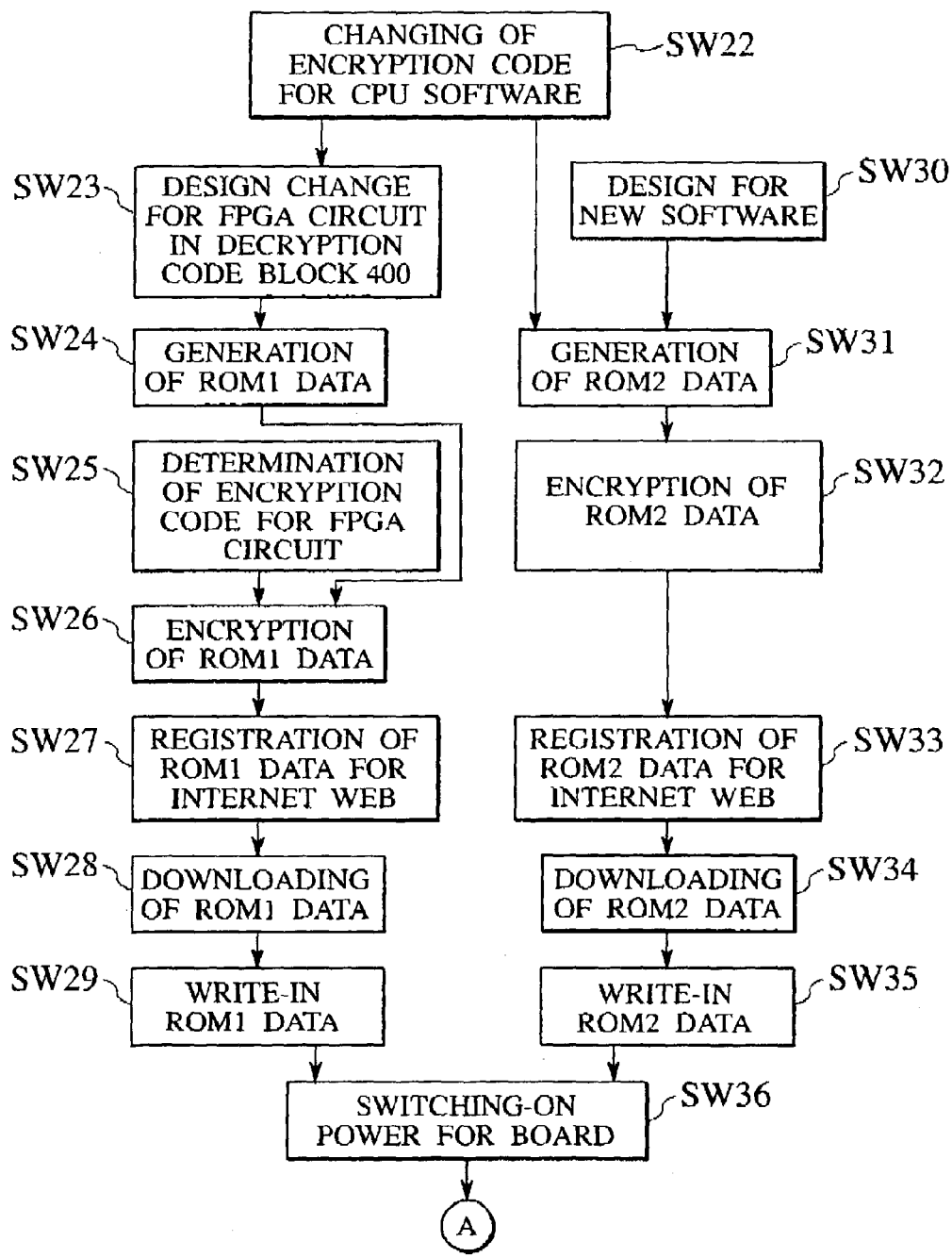
FIG. 21 is a flowchart showing how an ASIC and an ASIC system according to a seventh embodiment of the present invention operate between changing of the CPU software decryption code and CPU operation.

A method of operating a semiconductor integrated circuit and a data transfer system according to the seventh embodiment of the present invention is now described using FIG. 20 and FIG. 21. The operational flow between CPU software encryption code determination and CPU operation is shown in FIG. 20; the operational flow between CPU operation and changing the CPU software encryption code is shown in FIG. 21.

(a) In step SW1, the CPU software encryption code is first determined.

(b) Next, in step SW2, circuit design for the decryption code block 400 and design of the function to be configured in the FPGA circuit 37 is performed based on the CPU software encryption code.

(c) Next, in step SW3, data for the ROM (1) 302 is generated based on that design data.

(d) Next, in step SW4, the FPGA encryption code determined when designing the ASIC is used.

(e) Next, in step SW5, data for the first external ROM (1) 302 is encrypted.

(f) Next, in step SW6, the encrypted data is written in the first external ROM (1) 302.

The following steps SW7 through SW10 are carried out in parallel with the above steps SW2 through SW6.

(g) In step SW7, the software to be operated by the CPU 38 is designed.

(h) Next, in step SW8, data for the second external ROM (2) 301 is generated based on that design data.

(i) Next, in step SW9, since the decryption code for the second external ROM (2) 301 data has already been set, encryption of the first external ROM (2) 301 data is performed using that data.

(j) Next, in step SW10, the encrypted data is written in the second external ROM (2) 301.

(k) Next, in step SW11, the second external ROM 301, the first external ROM 302 and ASIC 31 are mounted on the printed circuit board 32.

(l) Next, in step SW12, the power supply for the printed circuit board 32 is switched on. The FPGA unit configuration operation then starts automatically.

(m) In step SW13, the first external ROM (1) 302 data is received by the ASIC 31, and then while referencing the data in the decryption code block 40, the data read in is decoded in the first decoder circuit 133.

(n) Next, in step SW14, the decoded data is transformed into data appropriate for the FPGA circuit in the configuration circuit 134, output, and received by the FPGA circuit 37. At the same time, this data is received by the FPGA circuit in the decryption code block 400.

(o) Next, in step SW15, it is determined whether all of the data in the first external ROM 302 has been read. If YES, then processing proceeds to step SW16; if NO, then processing returns to step SW13.

(p) Next, in step SW16, the FPGA circuit 37 and the FPGA circuit inside the decryption code block 400 shift to user mode. The FPGA functions as designed and also configures the decryption code block 400.

(q) Then in step SW17, operation of the ASIC 31 begins. The CPU 38 is also activated.

(r) Next, in step SW18, data is requested by procuring a start address set when designing the CPU 38 to the second external ROM (2) 301. In other words, the ROM (2) 301 read address is determined by requesting information received from the CPU 38. The ROM (2) 301 sends out the data of the specified address to the ASIC 31, (s) Next, in step SW19, in the second decoder circuit 233, decoding of is the received data is performed in the second decoder circuit 233 based on the decryption code in the decryption code block 400 configured during configuration.

(t) Next, in step SW20, the decoded data is transmitted to the CPU 38, where it is interpreted by the CPU, the designated task is performed, and the configuration waits for the next instruction.

(u) Next, in step SW21, it is determined whether or not the next specified job is waiting. If YES, then processing returns to step SW18. If NO, then step SW21 is repeated.

As a result, with the semiconductor integrated circuit and the data transfer system according to the seventh embodiment of the present invention shown in FIG. 19, in addition to the benefits of the semiconductor integrated circuit and data transfer system according to the sixth embodiment of the present invention shown in FIG. 17, there is the significant feature of being able to generate a plurality of CPU 38 decryption codes by changing the first external ROM (1) 302 data.

In the case of simultaneously designing multiple equipment models, it is possible to design a single ASIC for use in all of the equipment models. Moreover, it is possible to have CPU software decryption codes which differ for each model. Accordingly, any damage resulting from secret codes being broken can be minimized.

EEPROM, flash PROM, EPROM, OTPROM (one time PROM), NTPROM (n time PROM: rewritable many times), fuse ROM, mask ROM or the like can be used as the ROM for either of the external ROMs 301 and 302.

Of these, in the case where EEPROM, flash PROM, or NTPROM is used, there is the additional benefit which allows the CPU software encryption code to be changed on the user side when the time comes to release a new version of the application software, after the equipment has infused the market.

FIG. 21 shows the flow of decryption code change in such cases.

(a2) In step SW22, a new encryption code for changing the CPU software encryption code is first determined.

(b2) Next, in step SW23, circuit design for the decryption code block 400 and design of the function to be configured in the FPGA circuit 37 is performed based on the changed CPU software encryption code.

(c2) Next, in step SW24, data for the first external ROM (1) 302 is generated based on that design.

(d2) Then in step SW25, the FPGA encryption code is determined.

(e2) Next, in step SW26, encryption of the first external ROM (1) 302 data is performed.

(f2) Then in step SW27, the encrypted data is registered in a web page on the Internet, (g2) Next, in step SW28, data for the first external ROM (1) 302 that has been registered in a web page on the Internet is downloaded.

(h2) Next, in step SW29, the encrypted data downloaded is written in the first external ROM (1) 302.

The following steps SW30 through SW35 are carried out in parallel with the above steps SW23 through SW29.

(i2) In step SW30, the new software to be operated on the CPU 38 is designed.

(j2) Next, in step SWS1, data for the second external ROM (2) 301 is generated based on that design data.

(k2) Next, in step SW32, encryption of second external ROM (2) 301 data is performed.

(l2) Then in step SW33, the encrypted data is registered in a web page on the Internet.

(m2) Next, in step SW34, the encrypted data for the second external ROM (2) 301 that has been registered in a web page on the Internet is downloaded.

(m2) Next, in step SW35, the encrypted data downloaded is written in the second external ROM (2) 301.

(o2) Next, in step SW36, the power supply for the printed circuit board 32 is switched on. The FPGA unit configuration operation then starts automatically.

Hereafter, steps substantially similar to steps SW13 through SW21 shown in FIG. 20 are executed.

There are also cases where the first external ROM (1) 302 data and the second external ROM (2) 301 data is widely distributed through means other than Internet registration, for example on CD-ROMs. Therefore, being able to change the encryption code as needed gives the benefit of eliminating the effect of secrets being leaked in new software even if the secret code of the old version has been broken.

(Eighth Embodiment)

Figure 22:
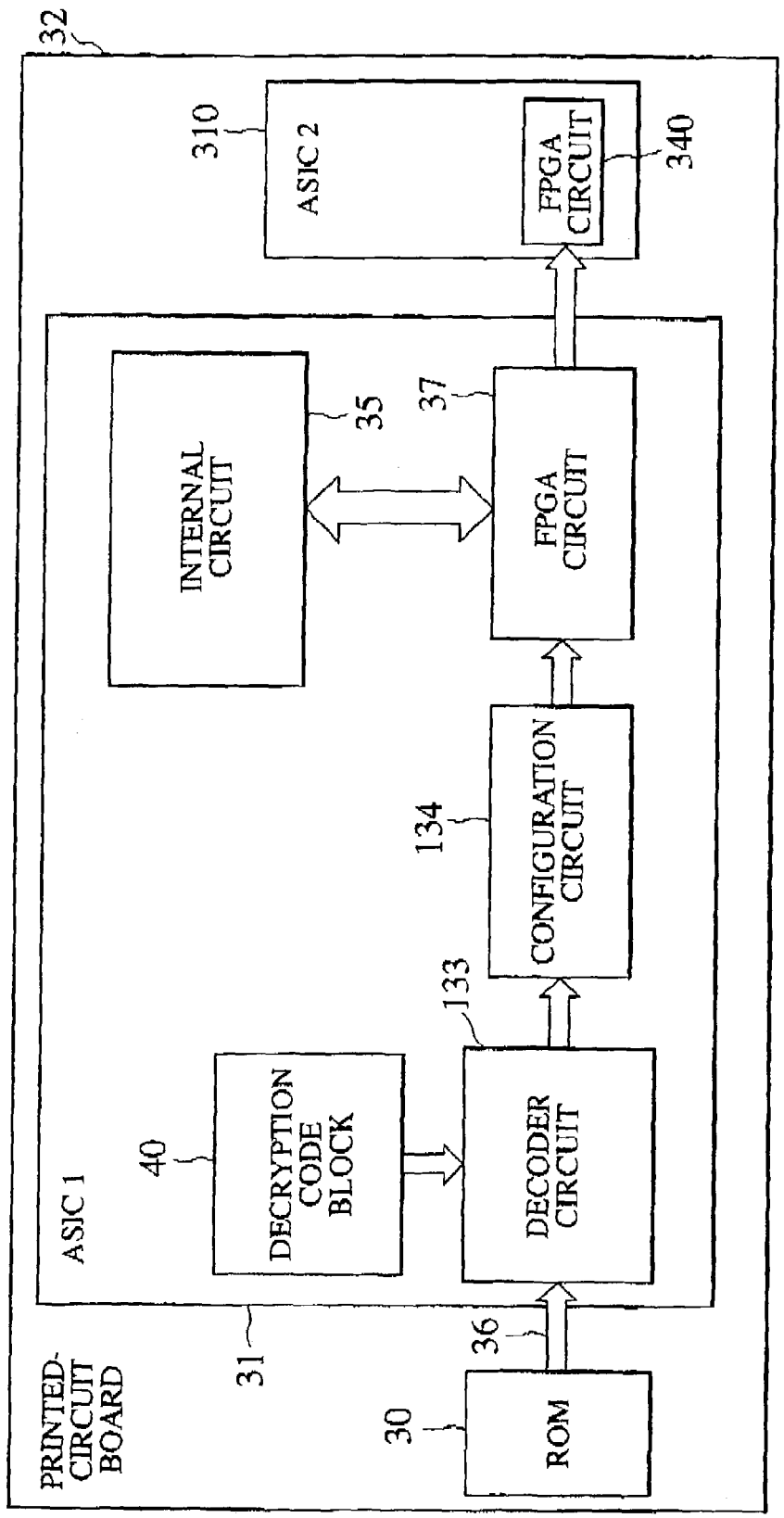
FIG. 22 is a block diagram showing the configuration of an ASIC and an ASIC system according to an eighth embodiment of the present invention.

A semiconductor integrated circuit and a data transfer system according to the eighth embodiment of the present invention, as shown in FIG. 22, is a hybrid integrated circuit configured with an external ROM 30 integrated on the first semiconductor chip, an ASIC 31 integrated on the second semiconductor chip, and an ASIC 310 integrated on the third semiconductor chip, respectively mounted on a printed circuit board 32. Moreover, the ASIC 31 is a monolithic integrated circuit configured with a decoder circuit 133, which is connected to the external ROM 30 via a bus data line 36; a configuration circuit 134, which is connected to the decoder circuit 133; an FPGA circuit 37, which is connected to the configuration circuit 134; a decryption code block 40, which is also connected to the decoder block 133, and an internal circuit 35, which is connected to the FPGA circuit 37. The FPGA circuit 37 is further connected to an FPGA circuit 340 inside of another ASIC 310.

In addition, the example that the first semiconductor chip, the second semiconductor chip and the third semiconductor chip are implemented on the printed circuit board 32 together is shown in an example of FIG. 22, but, it is clear that the first semiconductor chip, the second semiconductor chip, and the third semiconductor chip may be implemented as a multi-layer structure via a soldered metal layer.

The semiconductor integrated circuit and data transfer system according to the eight embodiment of the present invention, as shown in FIG. 22, can also be viewed as a modified example of the first embodiment of the present invention. A configuration circuit (not shown in the figure) and an FPGA circuit 340 are embedded in the ASIC 310.

In addition, the two FPGA circuits 37 and 340 are coupled serially. Encrypted data from the external ROM 1 is received and decoded by the decoder circuit 133, and the function data is stored in the FPGA circuit 37. The RAM which stores the data for determining the function of the FPGA Circuit 37, as shown in FIG. 15, is configured with the shift register, which has as the basic unit, for instance, D-type flip/flops coupled serially. Accordingly, in the case where two FPGA circuits 37 and 340 are coupled serially, merely the number of serially coupled stages changes, but the fundamental writing operation does not change. When the power supply to the printed circuit board 32 mounted with these LSI circuits is switched on, the encrypted ROM data is transferred to the decoder circuit 133, decoded, and then transmitted to the configuration circuit 134. The configuration circuit 134 converts the data into a format suitable for the FPGA circuit, and transfers the data to the FPGA circuit 37. Data is brought to the entrance of the serially coupled shift register in the FPGA circuit 37, and then when the next piece of data is brought in, all of the received data is transferred forward one step at a time. Data arriving at the final stage of the serially connected states in the FPGA circuit 37 in the ASIC 31, is then received in the FPGA circuit 340 of the ASIC 310.

When the last of the ROM data has been received, the two FPGA circuits 37 and 340 switch over to user mode and operation of the ASIC 31 and the ASIC 310 starts.

As clearly seen from the configuration of the semiconductor integrated circuit and the data transfer system according to the eighth embodiment of the present invention, even in the case where a plurality of ASICs are included, the function data of each ASIC-embedded FPGA circuit can be managed by using only a single decoder circuit connected to a single external ROM 30. This gives the benefit of allowing security to be improved for the function data to be configured in a plurality of ASIC-embedded FPGA circuits by using only one decoder circuit 133.

(Modified Example 1 of the Eighth Embodiment)

Figure 23:
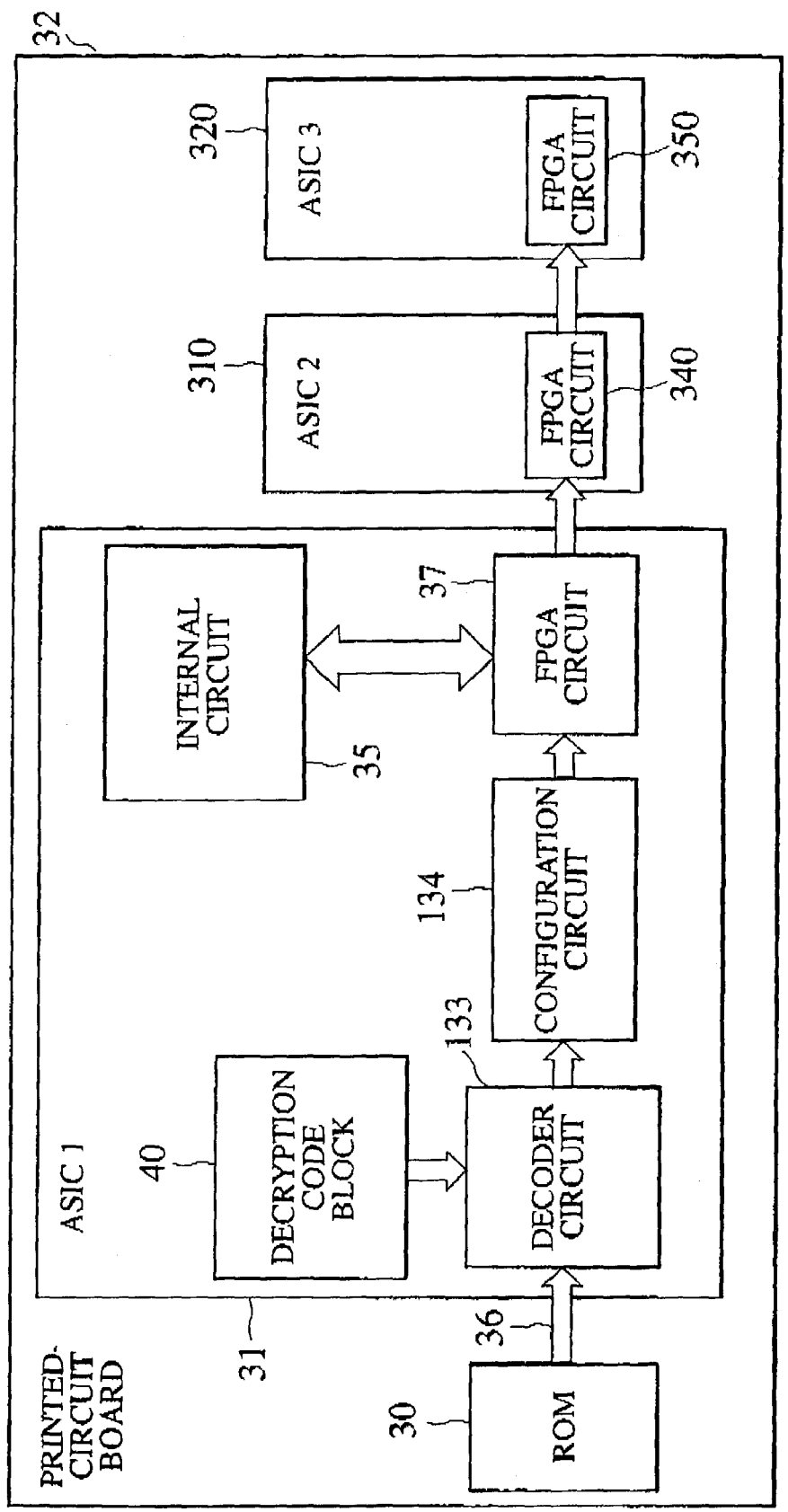
FIG. 23 is a block diagram showing the configuration of an ASIC and an ASIC system according to a modified example 1 of the eighth embodiment of the present invention.

A semiconductor integrated circuit and a data transfer system according to a modified example 1 of the eighth embodiment of the present invention, as shown in FIG. 23, has a configuration where the output of an FPGA circuit embedded in an ASIC 310 is coupled to an FPGA circuit 350 embedded in another, separate ASIC 340. As clearly seen with the seventh embodiment, even in the case where a plurality of ASICs are included, the function data of each ASIC-embedded FPGA Circuit can be managed by using only a single decoder circuit 133 connected to a single external ROM 30. It is possible to improve security for the function data to be configured in a plurality of ASIC-embedded FPGA circuits by using only one decoder circuit 133. Moreover, embedding an FPGA circuit in a separate ASIC, and serially coupling the separate ASIC to the output of the FPGA circuit 350 is also possible using a similar method.

(Modified Example 2 of the Eighth Embodiment)

Figure 24:
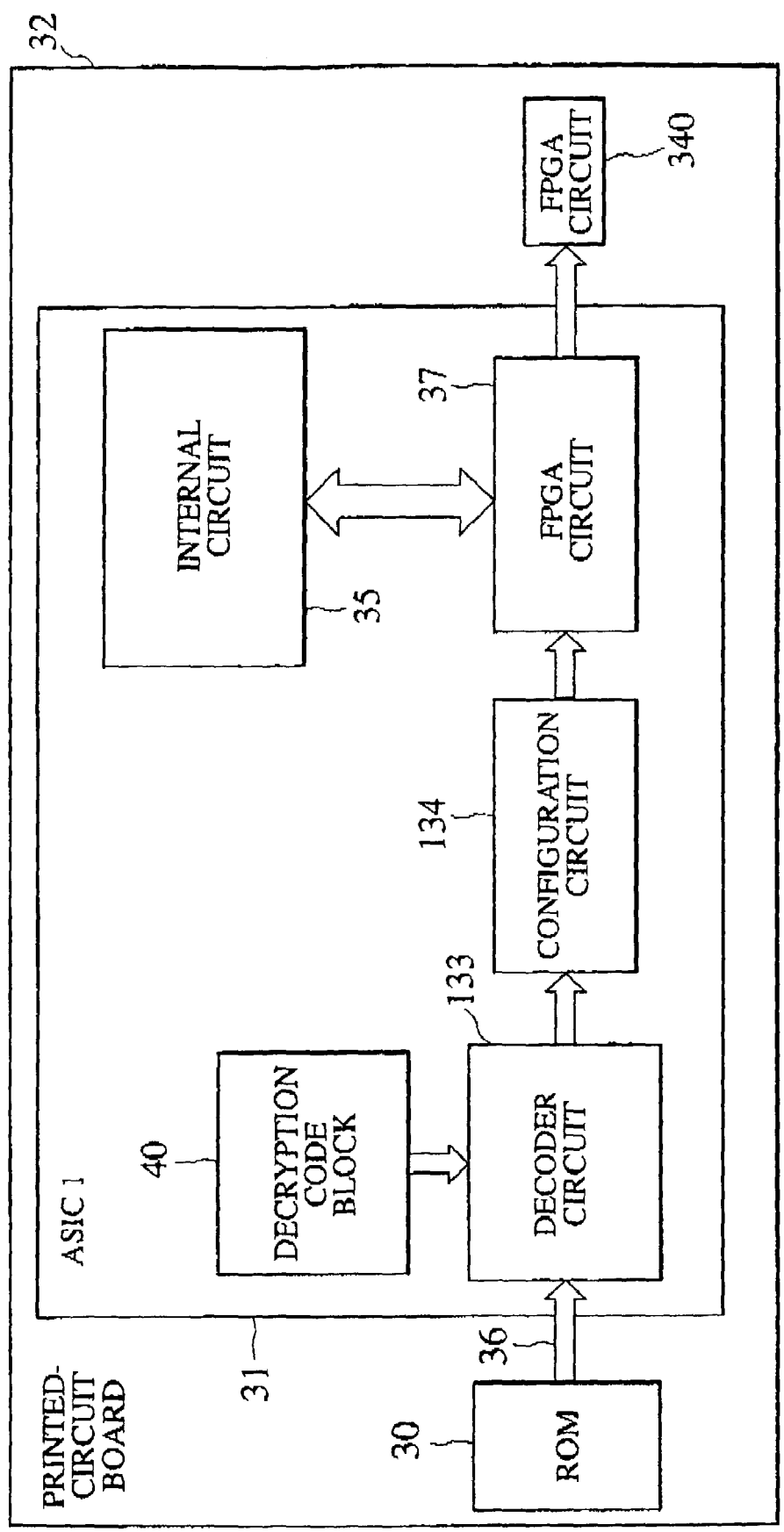
FIG. 24 is a block diagram showing the configuration of an ASIC and an ASIC system according to a modified example 2 of the eighth embodiment of the present invention.

A semiconductor integrated circuit and a data transfer system according to a modified example 2 of the eighth embodiment of the present invention, as shown in FIG. 24, has a configuration where an ASIC 31 embedded with an FPGA circuit 37, and an FPGA circuit 340 are serially connected. In this case, as with the eighth embodiment shown in FIG. 22, after the ROM data of the external ROM 30 is decoded and written in the FPGA circuit 37 and the FPGA circuit 340, the FPGA circuit 37 and the FPGA circuit 340 shift to user mode and operation of the ASIC 31 starts. Through this, not only is it possible to improve data security for the single FPGA circuit 37 embedded in the ASIC 31, but it is also possible to improve data security for the externally connected FPGA circuit 340.

(Modified Example 3 of the Eighth Embodiment)

Figure 25:
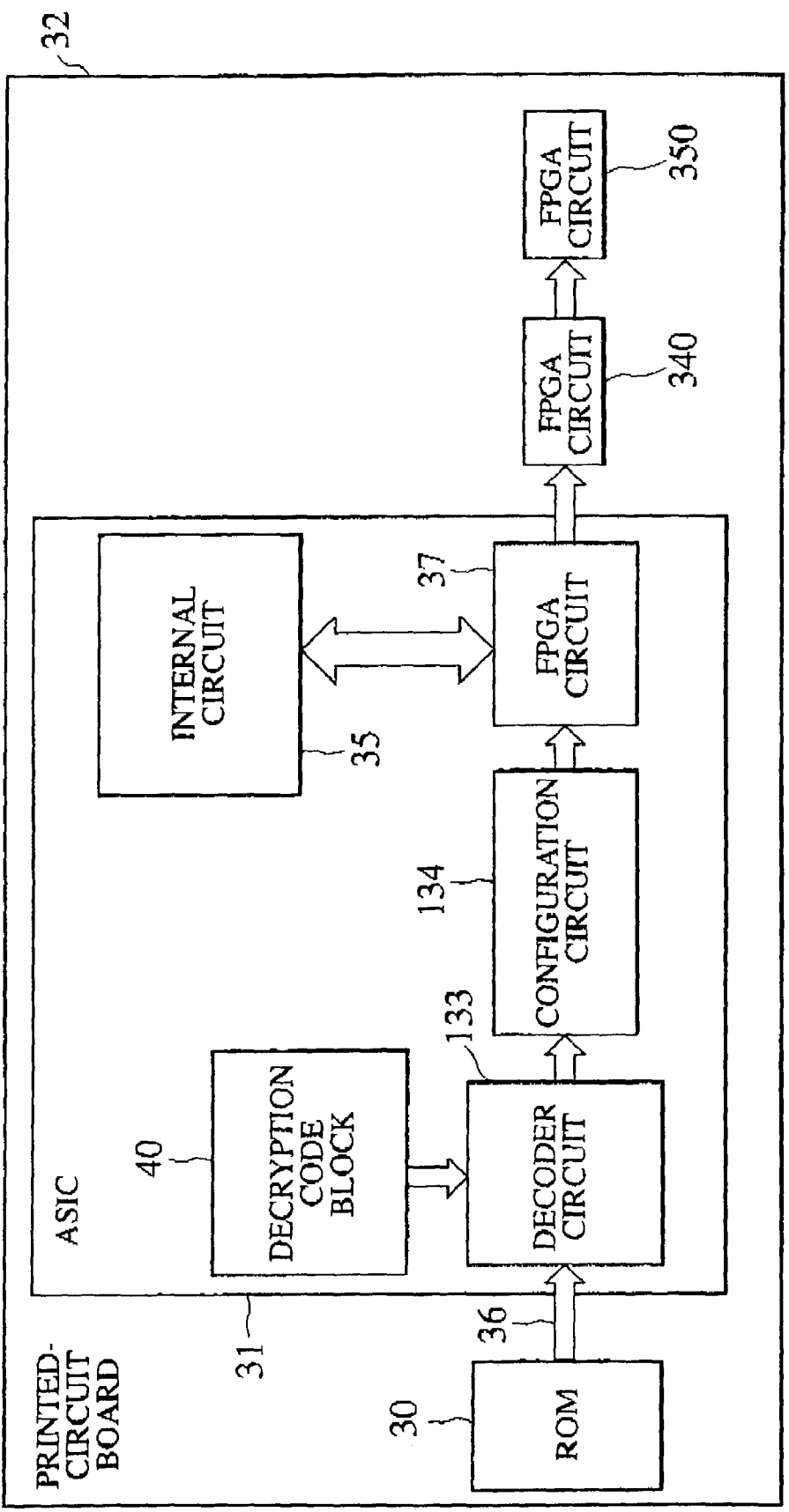
FIG. 25 is a block diagram showing the configuration of an ASIC and an ASIC system according to a modified example 3 of the eighth embodiment of the present invention.

A semiconductor integrated circuit and a data transfer system according to a modified example 3 of the eighth embodiment of the present invention, as shown in FIG. 25, has a configuration where an FPGA circuit 37 embedded ASIC 31 is coupled with an FPGA circuit 340 serially, and the FPGA circuit 340 is further coupled with an FPGA circuit 350 serially. In this case, as with the eighth embodiment shown in FIG. 22, after the ROM data of the external ROM 30 is decoded and written in the FPGA circuits 37, 340, and 350, the FPGA circuits 37, 340, and 350 shift to user mode and operation of the ASIC 31 starts. Through this, not only is it possible to improve data security for the single FPGA circuit 37 embedded in the ASIC 31, but it is also possible to improve data security for the externally connected FPGA circuits 340 and 350. Even in the case where a plurality of ASICs are included, the function data of each FPGA circuit can be managed by using only a single decoder circuit 133 connected to a single external ROM 30. It is possible to improve security for the function data to be configured in an FPGA circuit by using only one decoder circuit 133. Moreover, serially connecting a separate FPGA device to the FPGA circuit 350 to expand the system is also possible using a similar method.

(Ninth Embodiment)

Figure 26:
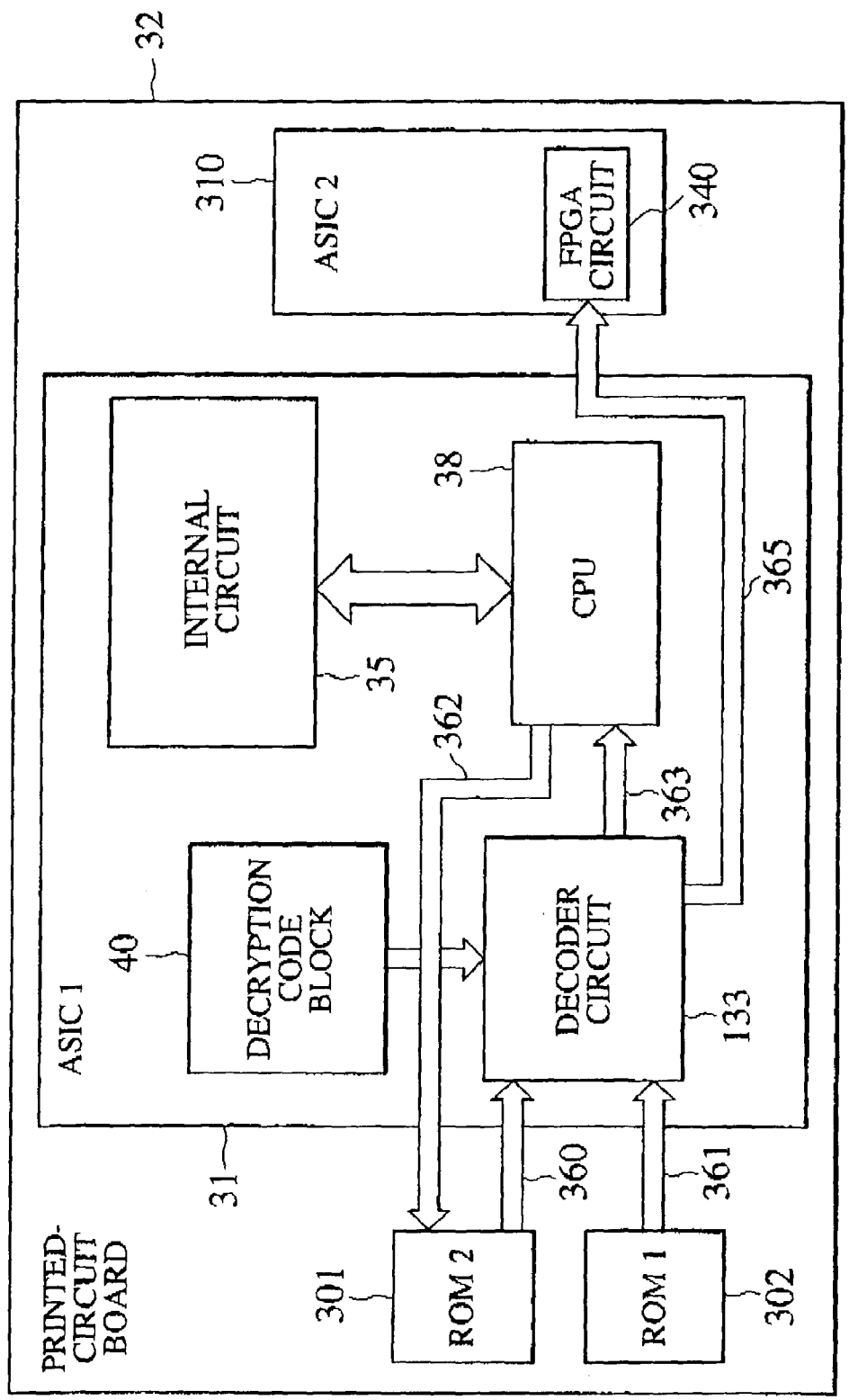
FIG. 26 is a block diagram showing the configuration of an ASIC and an ASIC system according to a ninth embodiment of the present invention.

A semiconductor integrated circuit and a data transfer system according to the ninth embodiment of the present invention, as shown in FIG. 26, is a hybrid integrated circuit configured with the second external ROM 301 and the first external ROM 302 and an ASIC 31 integrated on the second semiconductor chip and an ASIC 310, respectively mounted on a printed circuit board 32. The first external ROM 302 is integrated on the first semiconductor chip. The second external ROM 301 is integrated on a semiconductor chip different from the second semiconductor chip. The second external ROM 301 may be integrated on the same semiconductor chip with the first semiconductor chip.

In addition, the ASIC 31 is a monolithic integrated circuit configured with a decoder circuit 133, which is connected to the second external ROMs 301 and 302 via buses 360 and 361, respectively; a decryption code block 40, which is connected to the decoder circuit 133; a CPU 38, which is also connected to the decoder circuit 133; and an internal circuit 35, which is connected to the CPU 38. A configuration circuit (not shown in the figure) and an FPGA circuit 340 are embedded in the ASIC 310. The decoder circuit 133 is further connected to an FPGA circuit 340 inside of the ASIC 310. At this point, in the case of the eighth embodiment of the present invention, there are two external ROMs, each of which store encryption codes suited for their respective operations. Namely, encrypted circuit design information data to be used for the FPGA circuit 340 is stored in the first external ROM 302. In addition, encrypted software data to be used in the CPU 38 is stored in the second external ROM 301. In addition, all of the semiconductor chips are implemented together on the printed circuit board 32 as shown in FIG. 26, but, it is clear that all of the semiconductor chips may be implemented as a multi-layer structure via a soldered metal layer.

When the power supply for the printed circuit board mounted with these LSI circuits is first switched on, the encrypted data for the first external ROM 302 is received in the ASIC 31, decoded in the decoder circuit 133, and then output to the ASIC 310 via a bus data line 365. The data received in the ASIC 310 is also received in the FPGA circuit 340 via the configuration circuit. When all of the ROM data has been received, the FPGA circuit 340 shifts to user mode and operation of the ASIC 31 and the ASIC 310 starts.

When the operation of the ASIC 31 starts, the operation of the embedded CPU 38 also starts, whereupon a start address set during CPU 38 design is output to the ROM 301 and data is requested from the ROM 310. The ROM 301 outputs the data of the specified address to the ASIC 31 via the data bus 360. The data received by the ASIC 31 is decoded by the decoder circuit 133 and transferred to the CPU 38. The data received by the CPU 38 is interpreted, tasks are executed, and the CPU 38 then waits for the next task to be designated.

In the case where an FPGA circuit 340 and a CPU 38 are embedded on separate ASICs, this makes it possible to improve data secrecy for both, with a single decoder circuit 133.

(Modified Example of the Ninth Embodiment)

Figure 27:
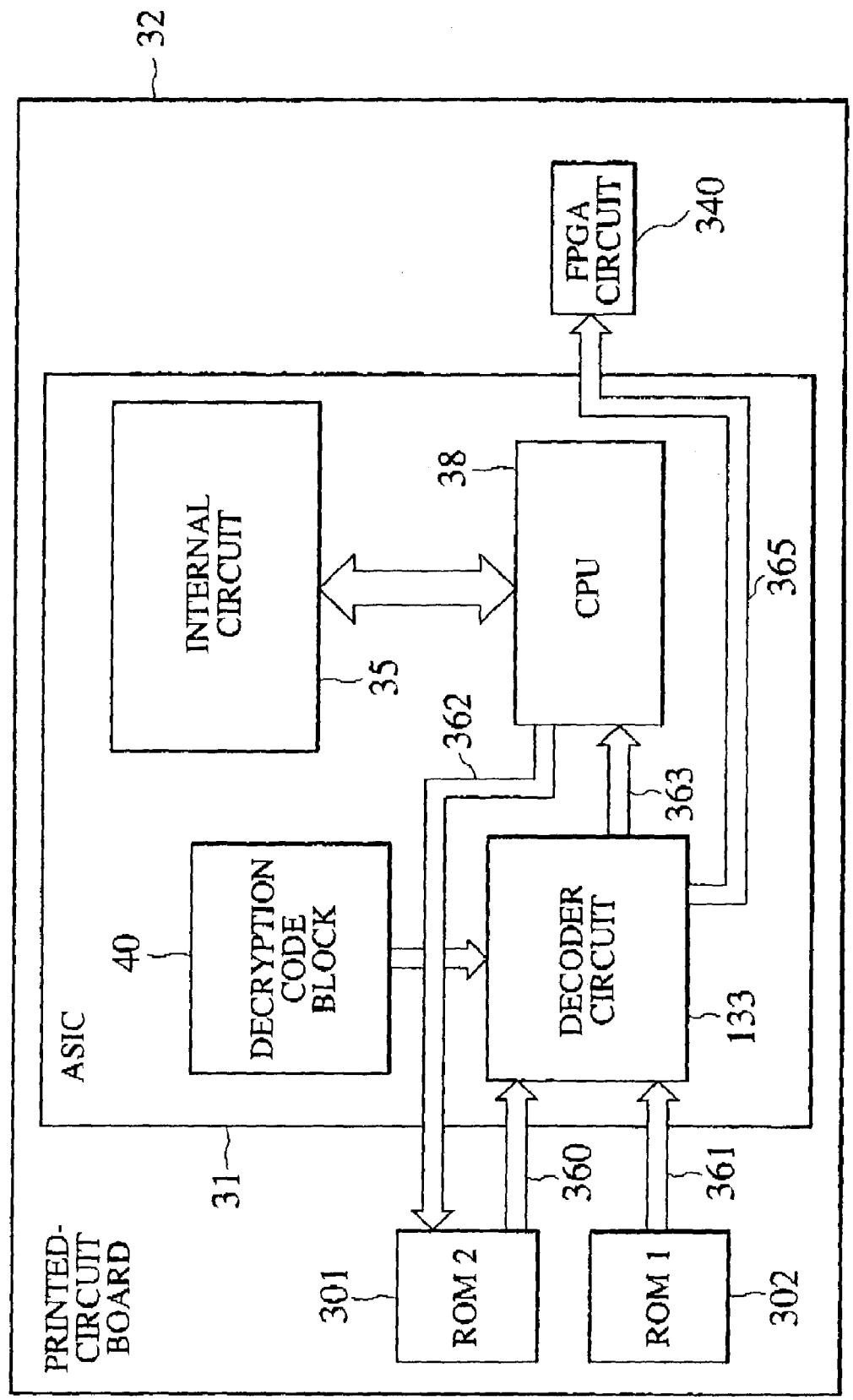
FIG. 27 is a block diagram showing the configuration of an ASIC and an ASIC system according to a modified example of the ninth embodiment of the present invention.

A semiconductor integrated circuit and a data transfer system according to a modified example of the ninth embodiment of the present invention, as shown in FIG. 27, has a configuration where an ASIC 31 embedded with a CPU 38, and an FPGA circuit 340 are serially coupled. This illustrates a working example where a CPU 38 is loaded on an ASIC 31, and data security for both the ASIC 31 and the externally connected FPGA circuit 340 is improved. As with the operation of the ninth embodiment shown in FIG. 26, after all of the data of the first external ROM 302 is written in the FPGA circuit 340, the FPGA circuit 340, shifts to user mode and operation of the ASIC 31 starts. The operation of the CPU 38 then also starts, and after data from the ROM 301 is received and decoded, the CPU interprets the data and tasks are executed. This not only allows software security to be improved for the ASIC 38 loaded with the CPU 38, but data security can also be improved for the externally connected FPGA circuit 340.

As with the semiconductor integrated circuit and data transfer system according to a modified example 3 of the eighth embodiment of the present invention shown in FIG. 25, for example as shown in FIG. 26, there is a configuration where an FPGA circuit 38 embedded ASIC 31 is serially coupled with an FPGA circuit 340, and the FPGA circuit 340 is further serially coupled with an FPGA circuit 350.

Even in the case where a plurality of ASICs are included, the function data of each FPGA circuit can be managed by using only a single decoder circuit 133 connected to the first external ROM 302. It is possible to improve security for the function data to be configured in an FPGA circuit by using only one decoder circuit 133. Moreover, serially connecting a separate FPGA device to the FPGA circuit 350 to expand the system is also possible using a similar method.

(Tenth Embodiment)

Figure 28:
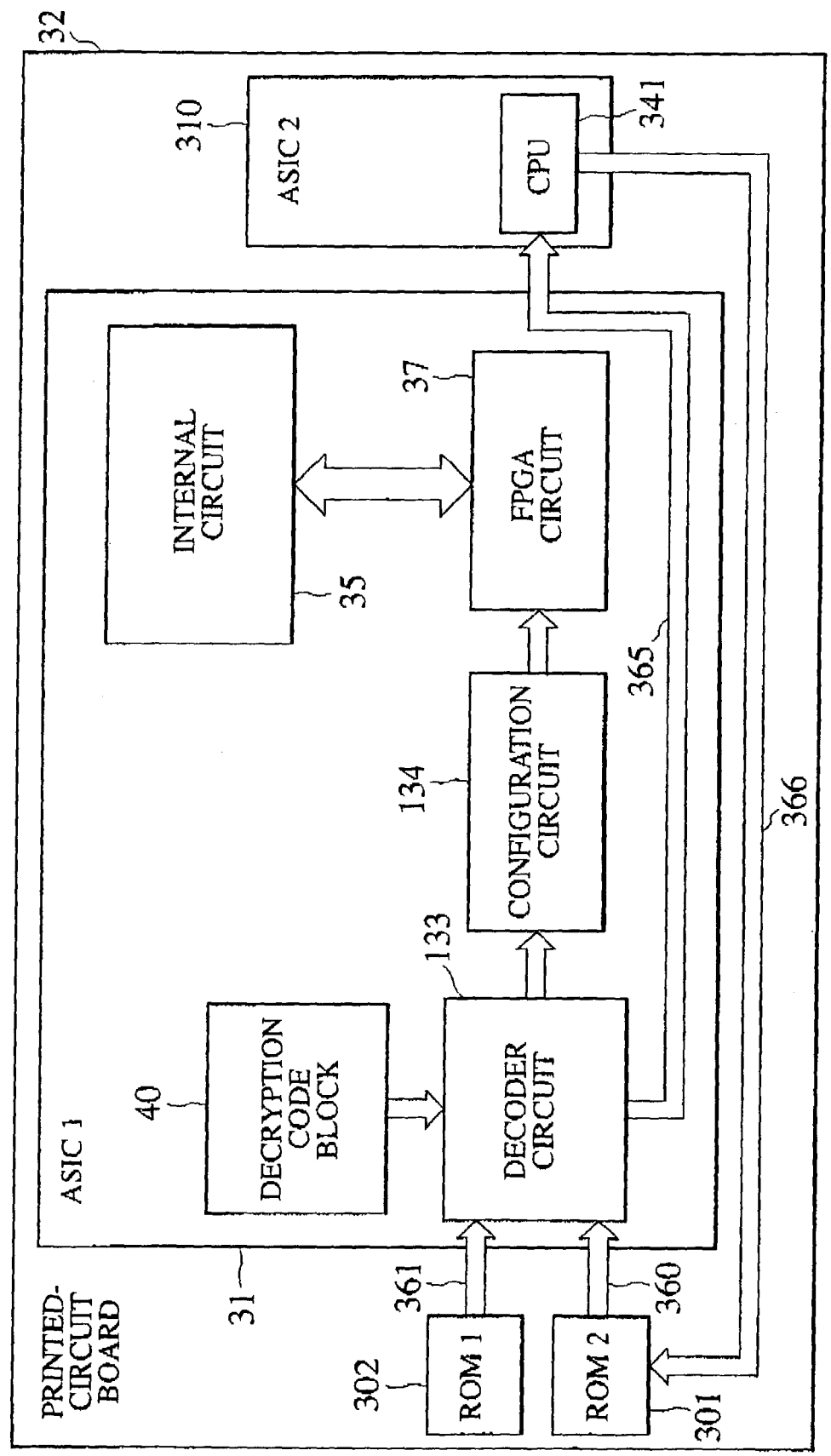
FIG. 28 is a block diagram showing the configuration of an ASIC and an ASIC system according to a tenth embodiment of the present invention.

A semiconductor integrated circuit and a data transfer system according to the tenth embodiment of the present invention, as shown in FIG. 28, is a hybrid integrated circuit configured with external ROMs 301 and 302 and ASICs 31 and 310, respectively mounted on a printed circuit board 32. In addition, the ASIC 31 is a monolithic integrated circuit configured with a decoder circuit 133, which is connected to the external ROMs 301 and 302 via buses 360 and 361, respectively; a decryption code block 40, which is connected to the decoder Circuit 133; an FPGA circuit 37, which is also connected to the decoder circuit 133; and an internal circuit 35, which is connected to the FPGA circuit 37. In addition a CPU 341 is loaded on the ASIC 310. The decoder Circuit 133 in the ASIC 31 is further connected to the CPU 341 in the ASIC 310. The FPGA circuit 37 executes fixed circuit operation between it and the internal circuit 35. The first external ROM 302 is integrated on the first semiconductor chip. The second external ROM 301 is integrated on a semiconductor chip different from the second semiconductor chip. The second external ROM 301 may be integrated on the same semiconductor chip with the first semiconductor chip. Also, the ASIC 31 is integrated on the second semiconductor chip and the ASIC 310 is integrated on the third semiconductor chip. In addition, the example that all of the semiconductor chips are implemented together on the printed circuit board 32 is shown as an example of FIG. 28, but, it is clear that all of the semiconductor chips may be implemented as a multi-layer structure via a soldered metal layer.

A semiconductor integrated circuit and a data transfer system according to the tenth embodiment of the present invention, as shown in FIG. 28, is similar to the ninth embodiment shown in FIG. 26, in that the configuration has two coupled ASICs which are each embedded with either an FPGA circuit or a CPU. In the tenth embodiment, the ASIC 31 embedded with the FPGA circuit 37 is also embedded with the decoder circuit 133.

Encrypted data is first output to the ASIC 31 from the first external ROM 302. Next, data decoding is performed in the decoder circuit 133 of the ASIC 31. The decoded data is then written in the FPGA circuit 37 via the configuration circuit 134. After all of the ROM data in the first external ROM 302 has been received, the FPGA circuit 37 shifts to user mode and operation of the ASIC 31 and the ASIC 310 starts.

Operation of the CPU 341 embedded in the ASIC 310 is also started. The CPU 341 specifies an address to request data from the ROM 301 via the address bus line 366. The encrypted data of the second external ROM 301 is first sent out to the ASIC 31 and decoded in the decoder 133 of the same. Next, the decoded data is then sent to the ASIC 310 via the data bus 365. The CPU 341 in the ASIC 310 interprets the received data and performs tasks.

In the case where an FPGA circuit 37 and a CPU 341 are embedded on separate ASICs, this makes it possible to improve data secrecy for both, using a single decoder circuit 133.

(Modified Example of the Tenth Embodiment)

Figure 29:
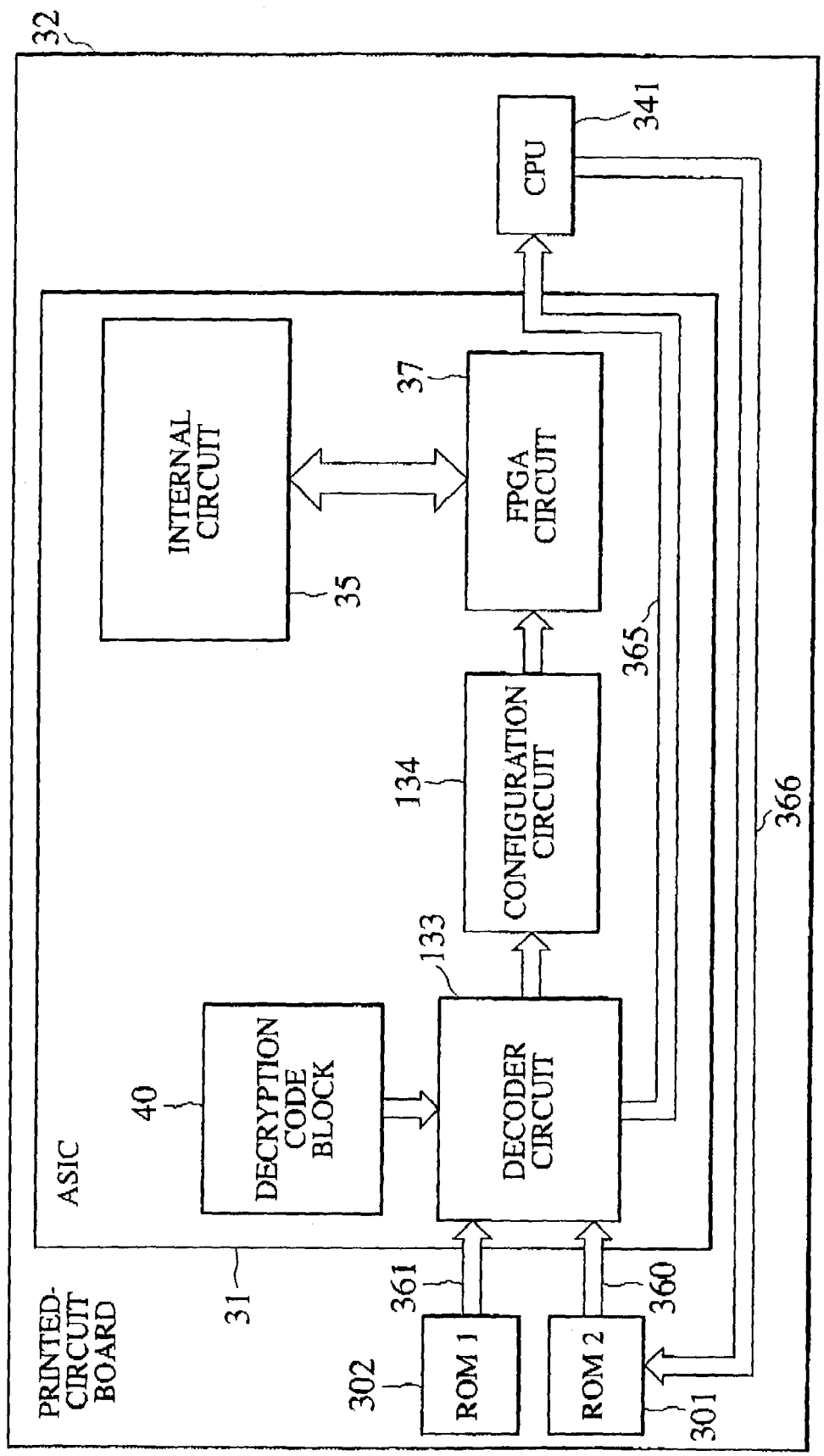
FIG. 29 is a block diagram showing the configuration of an ASIC and an ASIC system according to a modified example of the ninth embodiment of the present invention.

A semiconductor integrated circuit and a data transfer system according to a modified example of the tenth embodiment of the present invention, as shown in FIG. 29, has a configuration where an ASIC 31 embedded with an FPGA circuit 37, and a CPU 341 are serially coupled. This illustrates a working example where an FPGA circuit 37 is loaded on an ASIC 31, and data security for both the ASIC 31 and the externally connected CPU 341 is improved.

As with the operation of the tenth embodiment shown in FIG. 28, after all of the data of the first external ROM 302 is written in the FPGA circuit 37, the FPGA circuit 37 shifts to user mode and operation of the ASIC 31 and the CPU 341 starts. The CPU 341 specifies an address to request data from the ROM 301. The second external ROM 301 sends out the data of the specified address to the ASIC 31. The data received is decoded by the decoder circuit 133 in the ASIC 31 and transferred to the CPU 341. The CPU 341 interprets the received data and performs tasks.

This not only allows software security to be improved for the ASIC 37 loaded with the FPGA circuit 37, hut software data security can also be improved for the externally connected FPGA circuit 340.

(Eleventh Embodiment)

Figure 30:
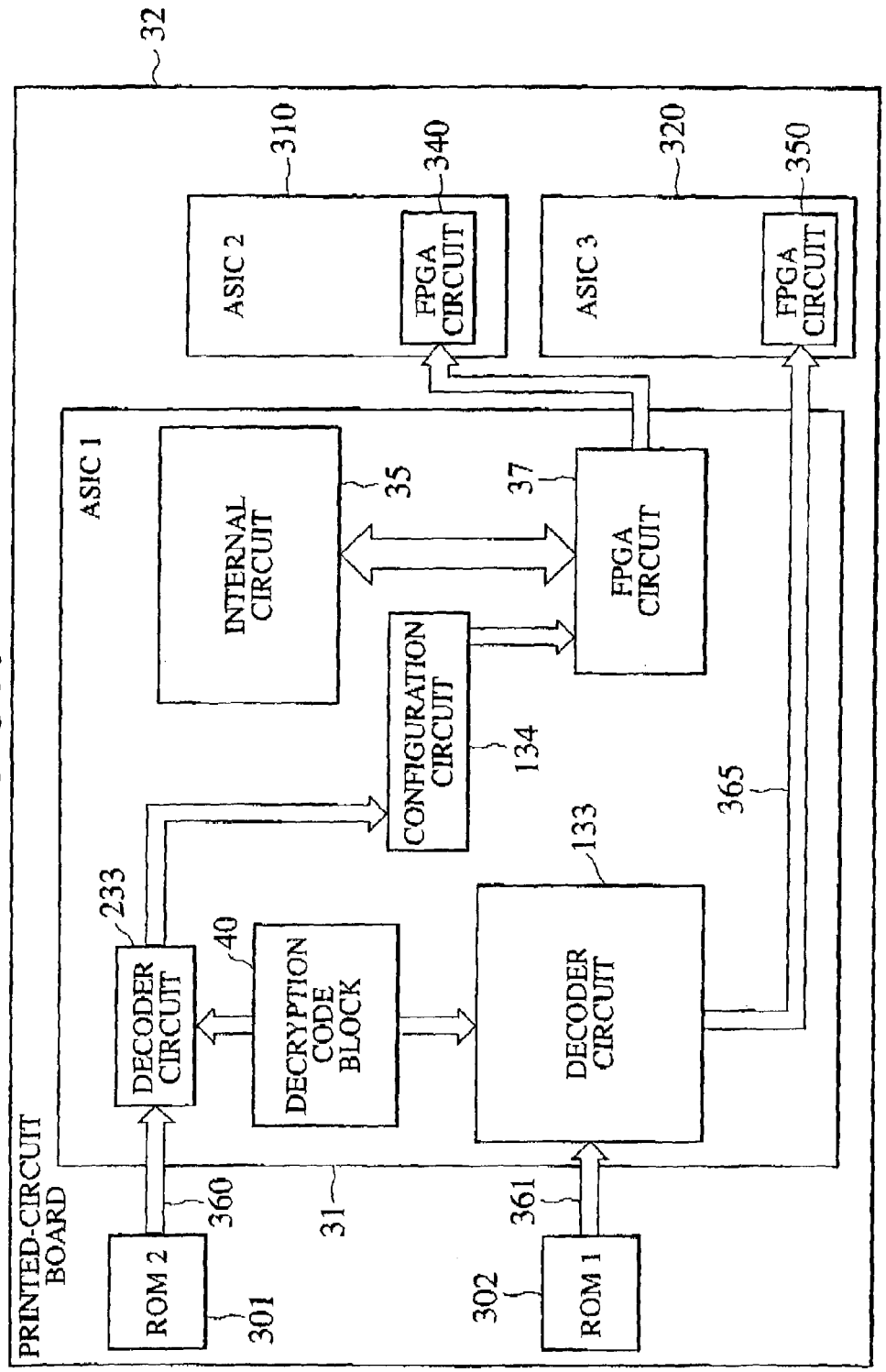
FIG. 30 is a block diagram showing the configuration of an ASIC and an ASIC system according to an eleventh embodiment of the present invention.

A semiconductor integrated circuit and a data transfer system according to the eleventh embodiment of the present invention, as shown in FIG. 30, is a hybrid integrated circuit configured with external ROMs 301 and 302 and ASICs 31, 310, and 320 respectively mounted on a printed circuit board 32. In addition, the ASIC 31 is a monolithic integrated circuit configured with a decoder circuit 133, which is connected to the first external ROM 302 via a bus data line 361; a second decoder circuit 233, which is connected to the second external ROM 301 via a bus data line 360; a decryption code block 40, which is connected to the decoder circuit 133 and the second decoder circuit 233; a configuration circuit 134, which is also connected to the second decoder circuit 233; the FPGA circuit 37, which is connected to the configuration circuit 134; and an internal circuit 35, which is connected to the FPGA circuit 37. A configuration circuit (not shown in the figure) and FPGA circuits 340 and 350 are loaded onto the ASICs 310 and 320. In addition, the FPGA circuit 37 is further connected to an FPGA circuit 340 inside of the ASIC 310. In addition, the decoder circuit 133 is further connected to an FPGA circuit 350 inside of the ASIC 320. In this embodiment, the FPGA circuit 37 executes a fixed circuit operation between the FPGA circuit and the internal circuit 35, and defines the circuit formation of the FPGA circuit 340.

The first external ROM 302 is integrated on the first semiconductor chip. The second external ROM 301 is integrated on a semiconductor chip different from the second semiconductor chip. The second external ROM 301 may be integrated on the same semiconductor chip with the first semiconductor chip. Also, the ASIC 31 is integrated on the second semiconductor chip and the ASIC 310 is integrated on the third semiconductor chip. The ASIC 320 is integrated on the fourth semiconductor chip. In addition, the example that all of the semiconductor chips are implemented together on the printed circuit board 32 is shown in an example of FIG. 30, but, it is clear that all of the semiconductor chips may be implemented as a multi-layer structure via a soldered metal layer.

A semiconductor integrated circuit and a data transfer system according to the eleventh embodiment as shown in FIG. 30 corresponds to an embodiment configured by embedding an FPGA circuit in three ASICs and connecting each of the FPGA circuits. When the power supply for the printed circuit board 32 on which these LSI circuits are mounted is switched on, data stored in the ROM 301 and ROM 302 is imported to the ASIC 31 in parallel. The data stored in the second external ROM 301 is decrypted by the second decoder circuit 233, and written in the FPGA Circuit 37 via the configuration circuit 134, and further written in the FPGA circuit 340 inside the ASIC 310. The data stored in the first external ROM 302 is decrypted by the decoder circuit 133 in the ASIC 31, and written in the FPGA circuit 350 inside the ASIC 320. After all of the data stored in the second external ROM 301 is written in the FPGA circuits 37 and 340, and all of the data stored in the first external ROM 302 is written in the FPGA circuit 350, all the FPGA circuits 37, 340 and 350 shift into user mode, so as to initiate operation of the ASIC 31, the ASIC 310, and the ASIC 320. Due to such operational configuration, even with multiple ASICs each embedded with the FPGA circuit, overall data security enhancement is possible with the single decryption code block 40. Moreover, there is the advantage that configuration time is shortened since configuration for multiple ASICs can be performed with multiple lines at the same time.

(Modified Example of the Eleventh Embodiment)

Figure 31:
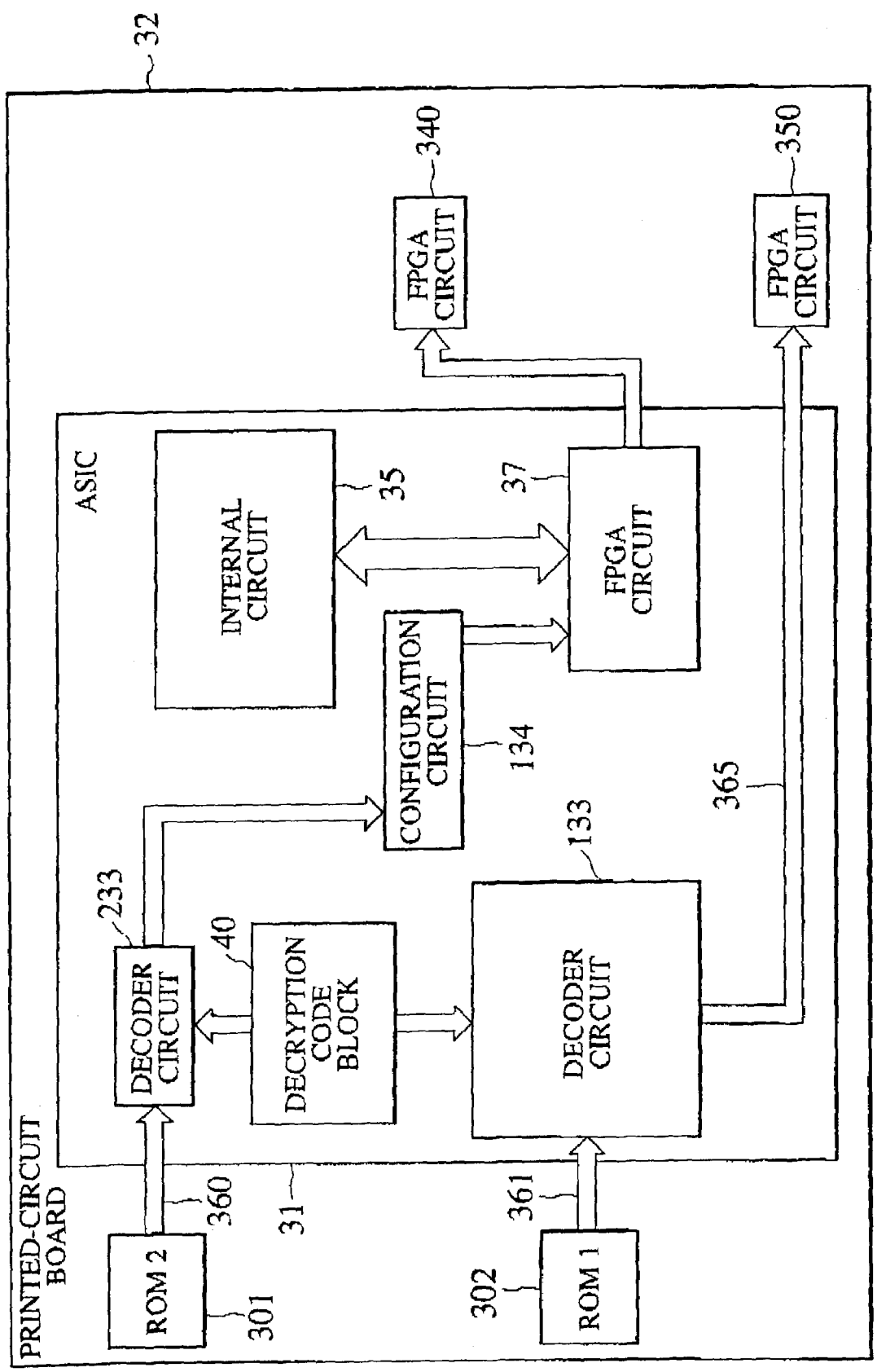
FIG. 31 is a block diagram showing the configuration of an ASIC and an ASIC system according to a modified example of the eleventh embodiment of the present invention.

A semiconductor integrated circuit and a data transfer system according to a modified example of the eleventh embodiment of the present invention, as shown in FIG. 31, is a hybrid integrated circuit configured with an ASIC 31, external ROMs 301 and 302 and external FPGA circuits 340 and 350, respectively mounted on a printed circuit board 32. In addition, the ASIC 31 is a monolithic integrated circuit configured with a decoder circuit 133, which is connected to the first external ROM 302 via a bus data line 361; a second decoder circuit 233, which is connected to the second external ROM 301 via a bus data line 360; a decryption code block 40, which is connected to the decoder circuit 133 and the second decoder circuit 233; a configuration circuit 134, which is also connected to the second decoder circuit 233; the FPGA circuit 37, which is connected to the configuration circuit 134; and an internal circuit 35, which is connected to the FPGA circuit 37, The FPGA circuit 37 is further connected to an FPGA circuit 340. In addition, the decoder circuit 133 is further connected to an FPGA circuit 350. In this embodiment, the FPGA circuit 37 executes a fixed circuit operation between the FPGA circuit and the internal circuit 35, and defines the circuit formation of the FPGA circuit 340.

The first external ROM 302 is integrated on the first semiconductor chip. The second external ROM 301 is integrated on a semiconductor chip different from the second semiconductor chip. The second external ROM 301 may be integrated on the same semiconductor chip with the first semiconductor chip. Also, the ASIC 31 is integrated on the second semiconductor chip and the FPGA circuit 340 is integrated on the third semiconductor chip. The FPGA circuit 350 is integrated on the fourth semiconductor chip. In addition, all of the semiconductor chips are implemented together on the printed circuit board 32 is shown as an example of FIG. 30, but, it is clear that all of the semiconductor chips may be implemented as a multi-layer structure via a soldered metal layer.

The modified example of the eleventh embodiment as shown in FIG. 31 corresponds to an embodiment configured by connecting the FPGA circuit 37 embedded ASIC 31 and two FPGA circuits 340 and 350. The cited elements have almost the same operational conditions, as those in FIG. 30, they are modified such that, as shown in FIG. 30, the FPGA circuits 340 and 350 take the place of the ASICs 310 and 320 embedded with the FPGA circuits 340 and 350, which are externally connected. In this case also, after all of the data stored in the ROMs 301 and 302 is written in the FPGA circuits 37 and 340, or the FPGA circuit 350, the FPGA circuits 37 and 340, or the FPGA 350 shift into the user mode, causing the ASIC 31 to start operation, With such operational configuration, a single ASIC 31 embedded with the FPGA circuit 37 allows an enhancement in the secrecy of all data written in the FPGA including multiple FPGAs that are externally connected, Moreover, there is an advantage in that configuration time is shortened since configuration for multiple ASICs can be performed with multiple lines at the same time.

(Twelfth Embodiment)

Figure 32:
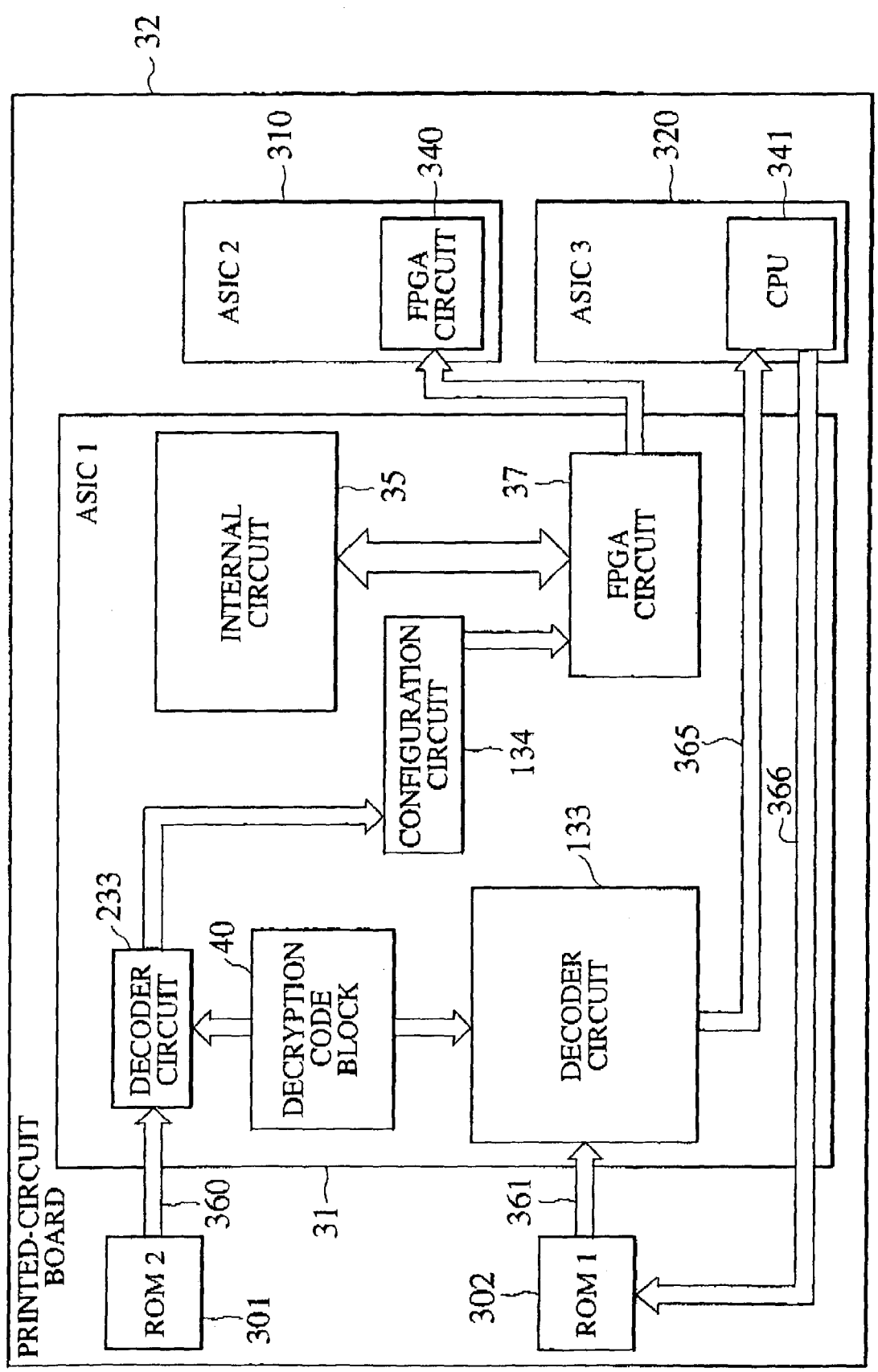
FIG. 32 is a block diagram showing the configuration of an ASIC and an ASIC system according to a twelfth embodiment of the present invention.

A semiconductor integrated circuit and a data transfer system according to the twelfth embodiment of the present invention, as shown in to FIG. 32, is a hybrid integrated circuit configured with external ROMs 301 and 302 and ASICs 31, 310, and 320 respectively mounted on a printed circuit board 32. In addition, the ASIC 31 is a monolithic integrated circuit configured with a first decoder circuit 133, which is connected to the first external ROM 302 via a bus data line 361; a second decoder circuit 233, which is connected to the second external ROM 301 via a bus data line 360; a decryption code block 40, which is connected to the decoder circuit 133 and the second decoder circuit 233; a configuration circuit 134, which is also connected to the second decoder circuit 233; the FPGA circuit 37, which is connected to the configuration circuit 134; and an internal circuit 35, which is connected to the FPGA circuit 37. A configuration Circuit (not shown in the figure) and an FPGA circuit 340 are loaded on the ASIC 310, and a CPU 341 is loaded on the ASIC 320. In addition, the FPGA circuit 37 is further connected to an FPGA circuit 340 inside the ASIC 310. In addition, the first decoder circuit 133 is further connected to CPU 341 inside the ASIC 320. In this embodiment, the FPGA circuit 37 executes a fixed circuit operation between the FPGA circuit and the internal circuit 35, and defines the circuit formation of the FPGA circuit 340.

The first external ROM 302 is integrated on the first semiconductor so chip. The second external ROM 301 is integrated on a semiconductor chip different from the second semiconductor chip. The second external ROM 301 may be integrated on the same semiconductor chip with the first semiconductor chip. Also, the ASIC 31 is integrated on the second semiconductor chip and the ASIC 310 is integrated on the third semiconductor chip. The ASIC 320 is integrated on the fourth semiconductor chip. In addition, while all of the semiconductor chips are implemented together on the printed circuit board 32 is shown as an example of FIG. 32, it is clear that all of the semiconductor chips may be implemented as a multi-layer structure via a soldered metal layer.

The twelfth embodiment as shown in FIG. 32 corresponds to an embodiment configured by embedding an FPGA circuit in two of the three ASICs and a CPU in the other ASIC and connecting each of the ASICs. It can also be viewed as a combination of the eighth embodiment shown in FIG. 22 and the tenth embodiment shown in FIG. 28. When the power supply for the printed circuit board 32 on which these LSI chips are mounted is switched on, all of the data stored in the second external ROM 301 is imported to the ASIC 31 and the FPGA circuits 37 and 340 are converted to user mode. Then, the data stored in the first external ROM 302 is imported to the ASIC 31.

The data stored in the second external ROM 301 is decrypted by the second decoder circuit 233, and written in the FPGA circuit 37 via the configuration circuit 134, and further written in the FPGA circuit 340 inside the ASIC 310. The data stored in the first external ROM 302 is decrypted by the first decoder circuit 133 in the ASIC 31, and sent to the ASIC 320, and then provided to the CPU 341 in the ASIC 320.

After all of the data stored in the second external ROM 301 is written in the FPGA circuits 37 and 340, the ASIC 31, the ASIC 310, and the ASIC 320 start to operate. An address assignment is requested from the CPU 341 for the first external ROM 302, the encrypted software data stored in the first external ROM 302 is written in the CPU 341 in response to the address request. Due to such operational configuration, with multiple ASICs each embedded with the FPGA circuit or the CPU, overall data secrecy enhancement is possible with a single decryption code block 40.

(Modified Example of the Twelfth Embodiment)

Figure 33:
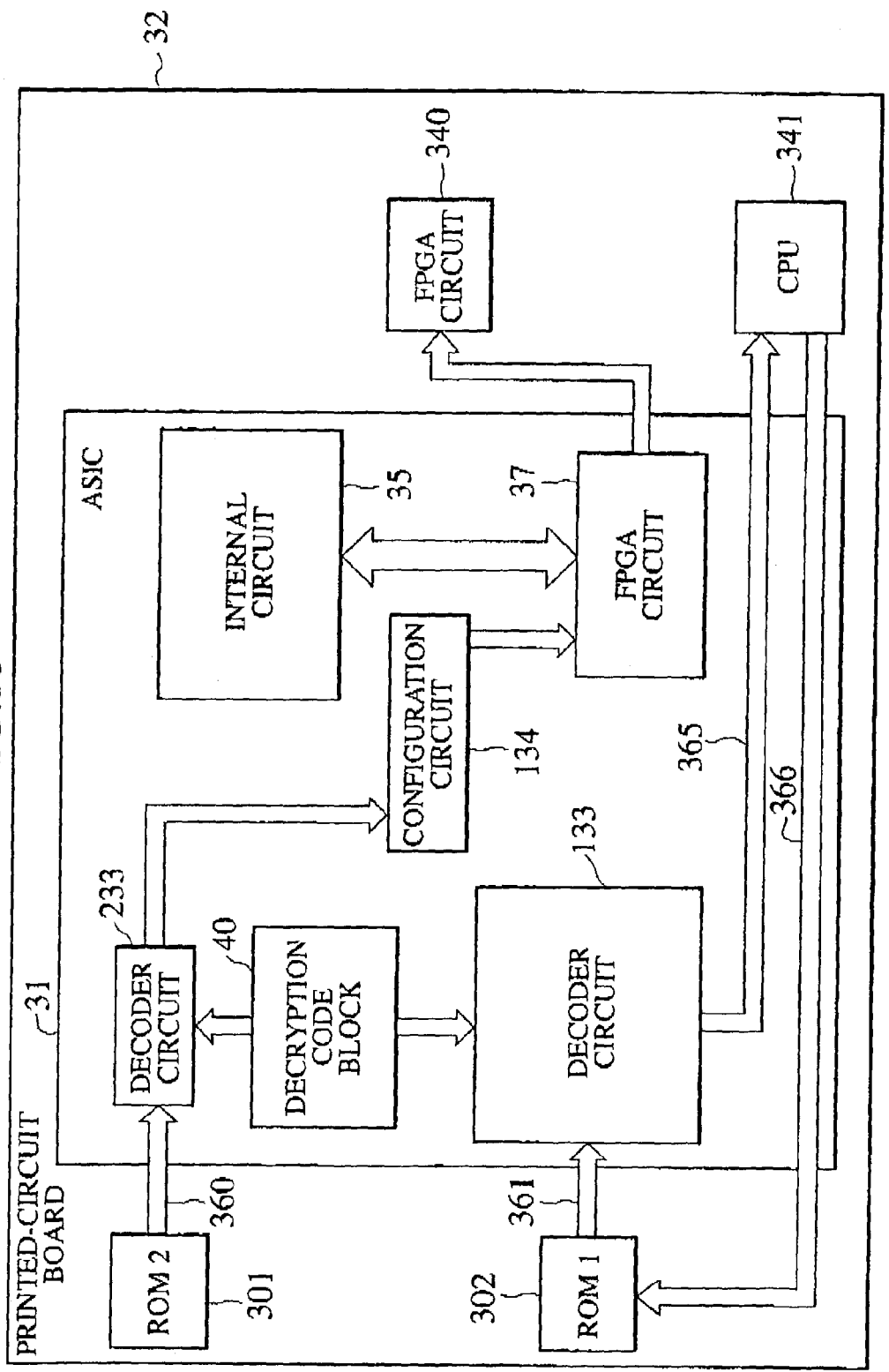
FIG. 33 is a block diagram showing the configuration of an ASIC and an ASIC system according to a modified example of the twelfth embodiment of the present invention.

A semiconductor integrated circuit and a data transfer system according to a modified example of the twelfth embodiment of the present invention, as shown in FIG. 33, is a hybrid integrated circuit configured with an ASIC 31, external ROMs 301 and 302, external FPGA circuit 340, and a CPU 341 respectively mounted on a printed circuit board 32. In addition, the ASIC 31 is a monolithic integrated circuit configured with a first decoder circuit 133, which is connected to the first external ROM 302 via a bus data line 361; a second decoder circuit 233, which is connected to the second external ROM 301 via a bus data line 360; a decryption code block 40, which is connected to the first decoder circuit 133 and the second decoder circuit 233; a configuration circuit 134, which is also connected to the second decoder circuit 233; the FPGA circuit 37, which is connected to the configuration circuit 134; and an internal circuit 35, which is connected to the FPGA circuit 37. The FPGA circuit 37 is further connected to an FPGA circuit 340. In addition, the decoder circuit 133 is further connected to CPU 341. In this embodiment, the FPGA circuit 37 executes fixed Circuit operation between it and the internal circuit 35, and defines the circuit formation of the FPGA circuit 340.

The first external ROM 302 is integrated on the first semiconductor chip. The second external ROM 301 is integrated on a semiconductor chip different from the second semiconductor chip. The second external ROM 301 may be integrated on the same semiconductor chip with the first semiconductor chip. Also, the ASIC 31 is integrated on the second semiconductor chip and the FPGA circuit 340 is integrated on the third semiconductor chip. The CPU 341 is integrated on the fourth semiconductor chip, In addition, while all of the semiconductor chips are implemented together on the printed circuit board 32 is shown as an example of FIG. 33, it is clear that all of the semiconductor chips may be implemented as a multi-layer structure via a soldered metal layer.

The modified example of the twelfth embodiment as shown in FIG. 33 corresponds to an embodiment configured by deploying the CPU 341 and the FPGA circuit 340 external to the ASIC 31 embedded with a single FPGA circuit 37, and connecting each of the CPU 341, the FPGA circuit 340 and the ASIC 31. This can also be seen as a combination of the modified example 2 of the eighth embodiment shown in FIG. 24 and the modified example of the tenth embodiment shown in FIG. 29. When the power supply for the printed circuit board 32 on which these LSI circuits are mounted is switched on, all of the data stored in the second external ROM 301 is imported to the ASIC 31 and the FPGA circuits 37 and 340 are converted to user mode. Then, the data stored in the first external ROM 302 is imported to the ASIC 31. The data stored in the second external ROM 301 is decrypted by the second decoder circuit 233, and written in the FPGA circuit 37 via the configuration circuit 134, and further written in the FPGA circuit 340. The data stored in the first external ROM 302 is decrypted by the first decoder circuit 133 in the ASIC 31, and sent to the CPU 341. After all of the data stored in the second external ROM 301 is written in the FPGA circuits 37 and 340, the ASIC 31 starts to operate. An address assignment is requested from the CPU 341 for the first external ROM 302, the encrypted software data stored in the first external ROM 302 is written in the CPU 341 in response to the address request. Due to such operational configuration, with multiple ASICs each embedded with the FPGA circuit or the CPU, an enhancement in the secrecy or security of all data with a single decryption code block 40 is possible.

(Thirteenth Embodiment)

Figure 34:
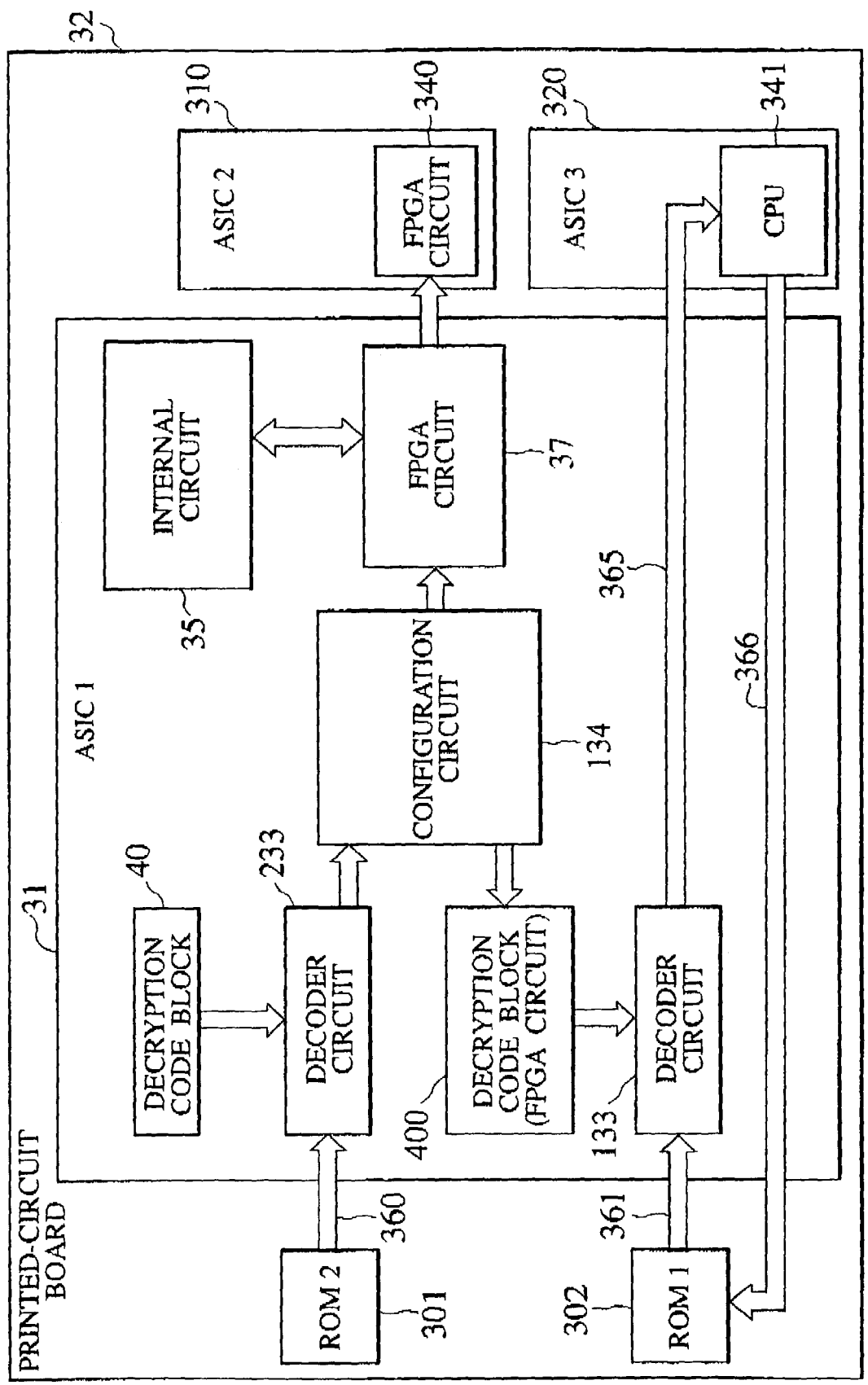
FIG. 34 is a block diagram showing the configuration of an ASIC and an ASIC system according to a thirteenth embodiment of the present invention.

A semiconductor integrated circuit and a data transfer system according to the thirteenth embodiment of the present invention, as shown in FIG. 34, is a hybrid integrated circuit configured with external ROMs 301 and 302 and ASICs 31, 310, and 320 respectively mounted on a printed circuit board 32. The ASIC 31 is a monolithic integrated circuit configured with a second decoder circuit 233, which is connected to the second external ROM 301 via a bus data line 360; a decoder circuit 133, which is connected to the first external ROM 302 via a bus data line 360; a decryption code block 40, which is connected to the second decoder circuit 233; a configuration circuit 134, which is also connected to the second decoder circuit 233; an FPGA circuit 37, which is connected to the configuration circuit 134; a decryption code block 400, which is also connected to the configuration circuit 134; and an internal circuit 35, which is connected to the FPGA circuit 37. FIG. 34 has the significant feature that the decryption code block 400 is configured with an FPGA circuit. The ASIC 310 includes a configuration circuit (not shown in the drawings), an FPGA circuit 340, and the ASIC 320 includes a CPU 341. The FPGA circuit 37 is further connected to an FPGA circuit 340 via the configuration circuit in the ASIC 310. In addition, the decoder circuit 133 is further connected to a CPU 341 in the ASIC 320.

In the ASIC 31, a decryption code used for decoding FPGA circuit information data is embedded in the decryption code block 40, The decryption code used for decoding CPU software data is embedded in the decryption code block 400 configured by the FPGA. Since the FPGA circuit configuring the decryption code block 400 is defined by the configuration circuit 134, the encrypted CPU software data may be altered through ROM 301 programming.

The first external ROM 302 is integrated on the first semiconductor chip. The second external ROM 301 is integrated on a semiconductor chip different from the second semiconductor chip. The second external ROM 301, may be integrated on the same semiconductor chip with the first semiconductor chip. Also, the ASIC 31 is integrated on the second semiconductor chip and the ASIC 310 is integrated on the third semiconductor chip. The ASIC 320 is integrated on the fourth semiconductor chip. In addition, while all of the semiconductor chips are implemented together on the printed circuit board 32 is shown as an example of FIG. 34, it is clear that all of the semiconductor chips may be implemented as a multi-layer structure via a soldered metal layer.

The semiconductor integrated circuit and a data transfer system according to the thirteenth embodiment has substantially the same fundamental configuration and operation as the seventh embodiment of the present invention shown in FIG. 19. The CPU 341 is loaded on the externally connected ASIC 320 and the ASIC 310 loaded with the FPGA circuit 340 is externally connected to the FPGA circuit 37 of the ASIC 31. This makes it possible to improve data secrecy for written data in the plurality of externally connected FPGA circuits 340 and the software data of the CPU 341 using the single ASIC 31 loaded with the FPGA circuit 37. In addition to this advantage, by changing the data of the second external ROM 301, the decryption code for the CPU 34) stored in the second decryption code block 400 can be changed at any time.

(Modified Example of the Thirteenth Embodiment)

Figure 35:
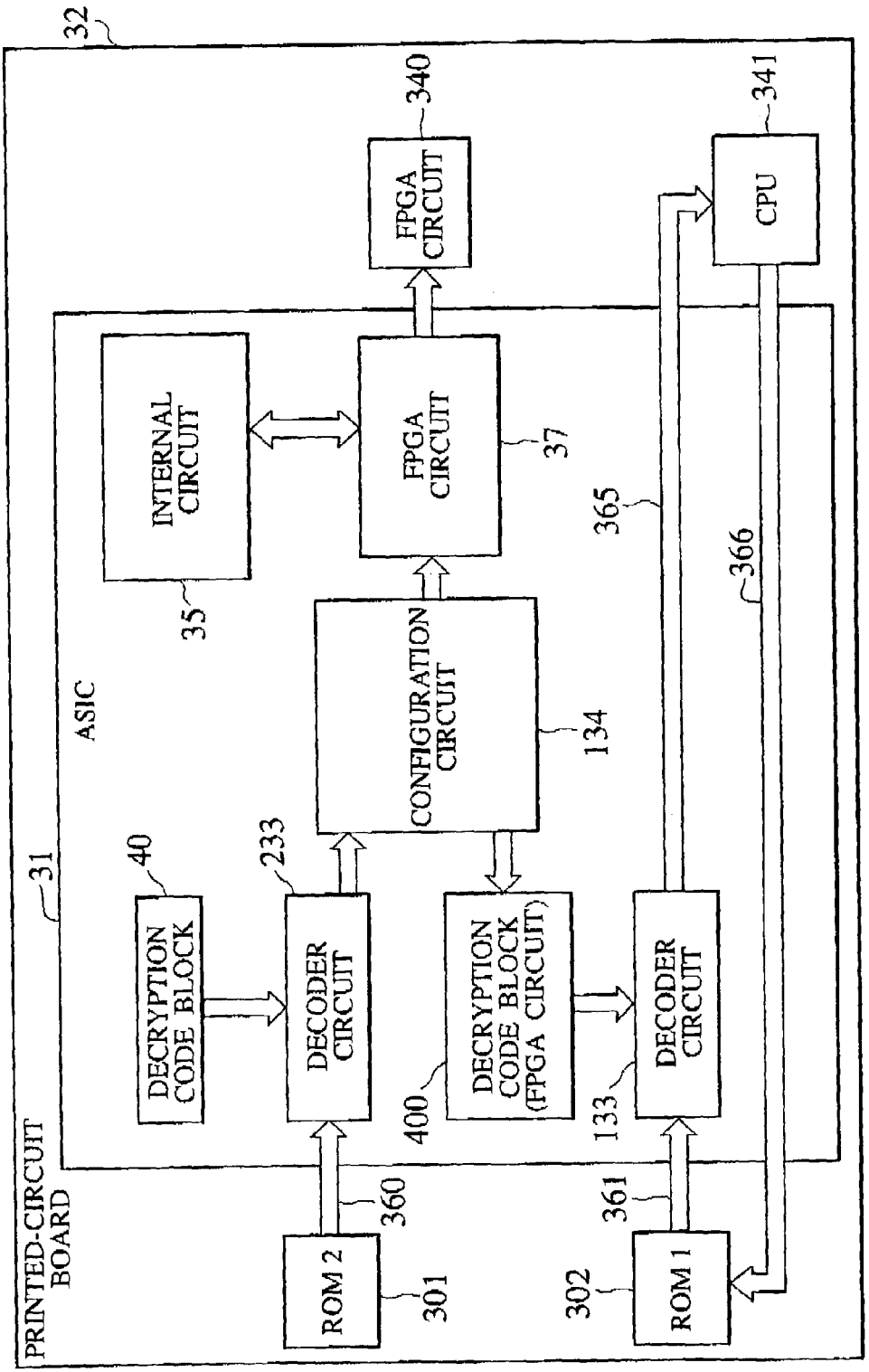
FIG. 35 is a block diagram showing the configuration of an ASIC and an ASIC system according to a modified example of the thirteenth embodiment of the present invention.

A semiconductor integrated circuit and a data transfer system according to a modified example of the thirteenth embodiment of the present invention, as shown in FIG. 35, is a hybrid integrated circuit configured with an ASIC 31, external ROMs 301 and 302, external FPGA circuit 340, and an external CPU 341 respectively mounted on a printed circuit board 32. The ASIC 31 is a monolithic integrated circuit configured with a second decoder circuit 233, which is connected to the second external ROM 301 via a bus data line 360; a decoder circuit 133, which is connected to the first external ROM 302 via a bus data line 360; a decryption code block 40, which is connected to the second decoder circuit 233; a configuration circuit 134, which is also connected to the second decoder circuit 233; an FPGA circuit 37, which is connected to the configuration circuit 1314; a decryption code block 400, which is also connected to the configuration circuit 134; and an internal circuit 35, which is connected to the FPGA circuit 37. As with FIG. 34, the decryption code block 400 is configured with an FPGA circuit. The FPGA circuit 37 is further connected to an FPGA circuit 340. In addition, the decoder circuit 133 is further connected to a CPU 341.

The first external ROM 302 is integrated on the first semiconductor chip. The second external ROM 301 is integrated on a semiconductor chip different from the second semiconductor chip. The second external ROM 301 may be integrated on the same semiconductor chip with the first semiconductor chip, Also, the ASIC 31 is integrated on the second semiconductor chip and the FPGA circuit 340 is integrated on the third semiconductor chip. The CPU 341 is integrated on the fourth semiconductor chip. In addition, while all of the semiconductor chips are implemented together on the printed circuit board 32 is shown as an example of FIG. 35, it is clear that all of the semiconductor chips may be implemented as a multi-layer structure via a soldered metal layer.

With the ASIC 31, a decryption code that is used to decode the FPGA circuit data is implanted in the decryption code block 40. The decryption code that is used to decode data for the CPU is implanted in the decryption code block 400. Since the FPGA circuit that configures the decryption code block 400 is defined by the configuration circuit 134, programming the second external ROM 301 allows a change in the encrypted software program for the CPU.

As apparent from a comparison of FIG. 34 and FIG. 35, the structure and operation of a semiconductor integrated circuit and a data transfer system according to a modified example of the thirteenth embodiment are the same as those of the semiconductor integrated circuit and the data transfer system according to the thirteenth embodiment. With such a configuration, not only does a single ASIC 31 embedded with the FPGA circuit 37 allow an enhancement in the secrecy or security of data to be written in the FPGA circuit 37 embedded in the ASIC 31, but also in the secrecy or security of data for the FPGA circuit 340 and CPU 341, which are all-purpose products connected to the external elements. In addition to this advantage, it is possible to change the decryption code for the CPU 341 at any time by changing the FPGA circuit data stored in the second external ROM 301.

Note that each of the above embodiments can be put into practice in combination with another. When combined, it is possible to provide a semiconductor integration circuit and a semiconductor integration circuit system by loading the CPU and the FPGA and using encrypted data for both the CPU and the FPGA.

(Other Embodiments)

Various modifications will become possible for those skilled in the art after receiving the teachings of the present disclosure without departing from the scope thereof.

Naturally, various embodiments not specifically mentioned in this specification may be thus included in the present invention Accordingly, the technical scope of the present invention as may be defined reasonable from the above description should be viewed as only being limited by the following claims.

What is claimed is:

1. A semiconductor integrated circuit configured for connection to a first external ROM and a second external ROM, comprising:
   a first decryption code block storing a decryption code;
   a first decoder circuit connected to the first decryption code block and decrypting encrypted data stored in the first external ROM, by utilizing the decryption code in the first decryption code block;
   a configuration circuit connected to the first decoder circuit;
   an FPGA circuit connected to the configuration circuit, wherein the circuit structure of the FPGA circuit is determined by the configuration circuit;
   a second decryption code block connected to the configuration circuit and comprising a circuit structure, determined by the configuration circuit, for storing a decryption code;
   a second decoder circuit connected to the second decryption code block, wherein the second decoder circuit decrypts encrypted data stored in the second external ROM by using the decryption code in the second decryption code block;
   a CPU connected to the second decoder circuit, the CPU being operable in response to encrypted data stored in the second external ROM; and
   an internal circuit connected to the FPGA circuit and the CPU, the circuit operation of which is determined by the FPGA circuit and the CPU.

2. The semiconductor integrated circuit of claim 1, wherein the FPGA circuit further comprises:
   internal RAM;
   connection wiring configurations determined by the RAM data; and
   configurable logic blocks, the logic state of the configurable logic blocks determined by the RAM data,
   wherein the logical circuit structure of the FPGA circuit is determined in response to the output data from the configuration circuit.

3. A data transfer system configured for connection to external ROMs, comprising:
   a first external ROM storing encrypted FPGA circuit design information;
   a first decryption code block storing a decryption code;
   a first decoder circuit connected to the first decryption code block, wherein the first decoder circuit decrypts encrypted data from the first external ROM by utilizing the decryption code in the first decryption code block;

a configuration circuit connected to the first decoder circuit;

an FPGA circuit connected to the configuration circuit, the circuit structure of the FPGA circuit being determined by the configuration circuit;

a second external ROM storing encrypted CPU software design information;

a second decryption code block connected to the configuration circuit and comprising a circuit structure, determined by the configuration circuit, for storing a decryption code;

a second decoder circuit connected to the second decryption code block, wherein the second decoder circuit decrypts encrypted data stored in the second external ROM by using the decryption code in the second decryption code block;

a CPU connected to the second decoder circuit, the CPU being operable in response to the CPU software design information stored in the second external ROM; and an internal circuit connected to the FPGA circuit and the CPU, the circuit operation of the internal circuit being determined by the FPGA circuit and the CPU.

4. The data transfer system of claim 3, further comprising
a data bus between the first external ROM and the first decoder circuit, the width of the data bus being the number of data bits of the encrypted FPGA circuit design information transferred between the first external ROM and the first decoder circuit.

5. The data transfer system of claim 3, wherein,
the FPGA circuit is a first FPGA circuit;
the second external ROM is integrated on a first semiconductor chip different from a second integrated semiconductor chip;
the second decoder circuit is integrated on the second integrated semiconductor chip, the second decoder circuit being connected to the second external ROM; and
the second decryption code block is also connected to the second decoder circuit, and the second decryption code block comprising comprises a second FPGA circuit.

6. The data transfer system of claim 3, further comprising:
an ASIC integrated on a semiconductor chip and connected to the FPGA circuit.

7. The data transfer system of claim 3, further comprising:
a first ASIC integrated on a first integrated semiconductor chip external to a second integrated semiconductor chip, the first ASIC being connected in series to the FPGA circuit; and
a second ASIC integrated on a third integrated semiconductor chip external to the second integrated semiconductor chip, the second ASIC being connected to the second integrated semiconductor chip.

8. The data transfer system of claim 3, wherein
the FPGA circuit is a first FPGA circuit, the data transfer system further comprising:
a second FPGA circuit integrated on a first integrated semiconductor chip external to a second integrated semiconductor chip and connected to the first FPGA circuit.

9. The data transfer system of claim 3, wherein
the FPGA circuit is a first FPGA circuit, the data transfer system further comprising:
a second FPGA circuit integrated on a first integrated semiconductor chip external to a second integrated semiconductor chip, the second FPGA circuit being connected in series to the first FPGA; and
an ASIC integrated on a third integrated semiconductor chip external to the second integrated semiconductor chip.

10. The data transfer system of claim 3, wherein
the second external ROM is integrated on a first semiconductor chip different from a second integrated semiconductor chip;
the second decoder circuit is integrated on the second integrated semiconductor chip, the second decoder circuit being connected to the second external ROM;
the data transfer system further comprising:
a first ASIC connected to the FPGA circuit and integrated on a third semiconductor chip different from the second integrated semiconductor chip; and
a second ASIC connected to the second decoder circuit and integrated on a fourth semiconductor chip different from the second integrated semiconductor chip.

11. The data transfer system of claim 3, wherein
the FPGA circuit is a first FPGA circuit;
the second external ROM is integrated on a first semiconductor chip different from a second integrated semiconductor chip;
the data transfer system further comprising:
a second decoder circuit integrated on the second integrated semiconductor chip, the second decoder circuit being connected to the second external ROM;
a second FPGA circuit connected to the first FPGA circuit, the second FPGA circuit being integrated on a third semiconductor chip different from the second integrated semiconductor chip; and
a third FPGA circuit connected to the second decoder circuit and integrated on a fourth semiconductor chip different from the second integrated semiconductor chip.

12. The data transfer system of claim 3, wherein
the second external ROM is integrated on a first semiconductor chip different from a second integrated semiconductor chip;
the second decoder circuit is integrated on the second integrated semiconductor chip, the second decoder circuit being connected to the second external ROM;
the data transfer system further comprising:
a first ASIC connected to the FPGA circuit and integrated on a third semiconductor chip different from the second integrated semiconductor chip; and
a second ASIC connected to the second decoder circuit and integrated on a fourth semiconductor chip different from the second integrated semiconductor chip.

13. The data transfer system of claim 3, wherein
the FPGA circuit is a first FPGA circuit,
the second external ROM is integrated on a first semiconductor chip different from a second integrated semiconductor chip;
the second decoder circuit is integrated on the second integrated semiconductor chip, the second decoder circuit being connected to the second external ROM;
the data transfer system further comprising:
a second FPGA circuit connected to the first FPGA circuit the second FPGA being integrated on a third semiconductor chip different from the second integrated semiconductor chip; and
the CPU being integrated on a fourth semiconductor chip different from the second integrated semiconductor chip.

14. The data transfer system of claim 3, wherein
the FPGA circuit is a first FPGA circuit,
the second external ROM is integrated on a first semiconductor chip different from a second integrated semiconductor chip;
the second decoder circuit is integrated on the second integrated semiconductor chip and connected to the second external ROM;
the second decryption code block is integrated on the second integrated semiconductor chip, the second decryption code block being connected to the configuration circuit and the second decoder circuit, the second decryption code block comprising a second FPGA circuit;
the data transfer system further comprising:
a first ASIC connected to the first FPGA circuit, the first ASIC being integrated on a third semiconductor chip different from the second integrated semiconductor chip; and
a second ASIC connected to the second decoder circuit and integrated on a fourth semiconductor chip different from the second integrated semiconductor chip.

15. The data transfer system of claim 3, wherein
the FPGA circuit is a first FPGA circuit,
second external ROM is integrated on a first semiconductor chip different from a second integrated semiconductor chip;
the second decoder circuit is integrated on the second integrated semiconductor chip and connected to the second external ROM;
the second decryption code block is integrated on the second integrated semiconductor chip, the second decryption code block being connected to the configuration circuit and the second decoder circuit, the second decryption code block comprising a second FPGA circuit;
the data transfer system further comprising:
a third FPGA circuit connected to the first FPGA circuit, the second third FPGA circuit being integrated on a third semiconductor chip different from the second integrated semiconductor chip; and
the CPU integrated on a fourth semiconductor chip different from the second integrated semiconductor chip.

* * * * *

UNITED STATES PATENT AND TRADEMARK OFFICE
CERTIFICATE OF CORRECTION

PATENT NO. : 7,127,616 B2  Page 1 of 1
APPLICATION NO. : 10/391562
DATED : October 24, 2006
INVENTOR(S) : Kaneko It is certified that error appears in the above-identified patent and that said Letters Patent is hereby corrected as shown below:

Claim 5, column 35, line 43, delete "comprising".

Claim 15, column 38, line 17, delete "second".

Signed and Sealed this

Thirtieth Day of January, 2007

JON W. DUDAS
*Director of the United States Patent and Trademark Office*